(12) United States Patent
Sasaki

(10) Patent No.: US 6,373,491 B1
(45) Date of Patent: Apr. 16, 2002

(54) IMAGE PROCESSING DEVICE, IMAGE PROCESSING METHOD AND PROGRAM DISTRIBUTION MEDIUM AND DATA DISTRIBUTION MEDIUM FOR PROCESSING IMAGES

(75) Inventor: Nobuo Sasaki, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/286,866

(22) Filed: Apr. 6, 1999

(30) Foreign Application Priority Data

Apr. 9, 1998 (JP) .......................................... P10-097065

(51) Int. Cl.[7] .............................................. G06T 11/20
(52) U.S. Cl. .................................................. 345/443
(58) Field of Search .................................. 345/419, 428, 345/429, 441–443, 523, 951, 955

(56) References Cited

U.S. PATENT DOCUMENTS

| | | | | |
|---|---|---|---|---|
| 5,381,519 A | * | 1/1995 | Brown et al. ................ | 395/132 |
| 5,594,852 A | * | 1/1997 | Tankelevich ................ | 395/141 |
| 5,694,331 A | * | 12/1997 | Yamamoto et al. .......... | 364/514 |
| 5,731,820 A | * | 3/1998 | Broekhuijsen .............. | 345/442 |
| 6,108,011 A | * | 8/2000 | Fowler ........................ | 234/441 |

FOREIGN PATENT DOCUMENTS

| | | |
|---|---|---|
| JP | 63-104183 | 5/1988 |
| JP | 63-217405 | 9/1988 |
| JP | 01-112307 | 5/1989 |
| JP | 01-112308 | 5/1989 |
| JP | 01-116808 | 5/1989 |
| JP | 01-120674 | 5/1989 |
| JP | 01-120675 | 5/1989 |
| JP | 9-305793 | 11/1997 |
| JP | 11-149567 | 6/1999 |

\* cited by examiner

Primary Examiner—Almis R. Jankus
Assistant Examiner—T. F. Cunningham
(74) Attorney, Agent, or Firm—Rosenman & Colin LLP

(57) ABSTRACT

An image processing device and method for processing an image defined by a combination of unit graphic forms or polygons are provided with an interpolated line completion unit which determines an interpolated line which is the line that interpolates a space between two vertices from an interpolation vector used to determine a line interpolating a space between a given vertex and another vertex among vertices of the unit graphic forms and from the coordinates of those vertices. An interpolated point computation unit is provided which determines as vertices of sub-unit graphic forms or subpolygons into which the polygons are to be split by the processing image device, interpolated points which are the points on the interpolated line. The interpolated line is a Bezier curve. The device further has an input unit which is operated when input is given thereinto, a geometry processing unit which reads data concerning the image from a recording medium and performs geometry processing and a conversion unit which converts sub-unit graphic forms or subpolygons into the subpolygons in the coordinate system of a two-dimensional output device.

24 Claims, 42 Drawing Sheets

FIG. 26A

1 REFERENCE DATA
1 #2 ... #i ... #I
2 POLYGON DATA #1
3 POLYGON DATA #2
4 POLYGON DATA #i
5 POLYGON DATA #I

FIG. 26B

6 COORDINATES OF VERTICES
1 $(px_1, py_1, pz_1)$
2 $(px_2, py_2, pz_2)$
3 $(px_3, py_3, pz_3)$
...

7 NORMAL VECTORS
1 $(nx_1, ny_1, nz_1)$
2 $(nx_2, ny_2, nz_2)$
3 $(nx_3, ny_3, nz_3)$

9 OTHER DATA

FIG. 26C

10 NUMBER OF VERTICES
11 REFERENCE DATA FOR VERTEX #1
12 REFERENCE DATA FOR VERTEX #2
13 REFERENCE DATA FOR VERTEX #i

FIG. 26D

14 INDEX OF COORDINATES
15 INDEX OF INTERPOLATION VECTOR A
16 INDEX OF INTERPOLATION VECTOR B
17 INDEX OF CURVED SURFACE INTERPOLATION NORMAL VECTOR

SPECIFICATION OF POLYGONS AND NORMALS OF A CUBE

IMAGE PROCESSING DEVICE, IMAGE PROCESSING METHOD AND PROGRAM DISTRIBUTION MEDIUM AND DATA DISTRIBUTION MEDIUM FOR PROCESSING IMAGES

BACKGROUND OF THE INVENTION

1. Field of the Invention

This invention relates to an image processing device, image processing method, a program distribution medium, and a data distribution medium more specifically, this invention relates to an image processing device and image processing method, a program distribution medium, and a data distribution medium, by which, for example, an image of detailed shape can be generated from rough shapes.

2. Description of the Prior Art

The higher degree of integration and higher speeds achieved in processors and memories have made possible what was previously difficult, namely the generation of three-dimensional images in real time, making it possible to display three-dimensional images (three-dimensional graphics) with a sense of presence for example on video game machines. If a three-dimensional image is to be displayed, in many cases the three-dimensional image is broken up into multiple polygons (unit graphic forms), and the three-dimensional image as a whole is drawn by drawing, each of these polygons. Thus it can be said that a three-dimensional image that is drawn in this way is defined as a combination of polygons.

Three-dimensional images are produced by composing three-dimensional shapes with, for example, wire frames. However, to compose a wire frame the producer must set detailed parameters concerning three-dimensional shapes, which has been troublesome. That is, as a three-dimensional shape becomes more complex, the wire frame parameters must also be set in detail, which has been troublesome.

SUMMARY OF THE INVENTION

It is an object of the present invention to make it possible to generate an image of detailed shape from rough shapes.

To attain the above and other objects the image processing device of the present invention comprises an interpolated line computation means for determining an interpolated line that is the line which interpolates between two vertices from the interpolation vector and vertex coordinates used for determining the line that interpolates a space between a given point and another point in the vertices of a unit graphic form, and an interpolated point computation means for determining, as the vertices of sub-unit graphic forms, interpolated points which are points on the interpolated line.

An image processing method of the present invention comprises an interpolated line computation step of determining the interpolated line which interpolates between two vertices from the coordinates of the vertices and an interpolation vector used for determining the line which interpolates between one vertex and another in the vertices of a unit graphic form, and an interpolated point computation step of determining, as the vertices of sub-unit graphic forms, interpolated points that are points on an interpolated line.

A program distribution medium of the present invention provides a computer program that has an interpolated line computation step that determines the interpolated line that interpolates between two vertices from the coordinates of the vertices and an interpolation vector used for determining the line that interpolates between one vertex and another in the vertices of a unit graphic form, and an interpolated point computation step that determines, as the vertices of sub-unit graphic forms, interpolated points that are points on an interpolated line.

According to an embodiment, an image processing device of the present invention comprises an operation means that is operated when a unit graphic form is input, and an interpolation vector generation means for generating an interpolation vector used for determining the interpolated line that is the line that interpolates between a given vertex and another vertex in the vertices of a unit graphic form that is input by the operation means being operated.

An image processing method of the present invention comprises an interpolation vector generation step of generating an interpolation vector used for determining an interpolated line that is the line that interpolates between a given vertex and another vertex in the vertices of a unit graphic form that is input by the operation means which the latter is being operated.

A program distribution medium according to the present invention provides a computer program that has an interpolation vector generation step that generates an interpolation vector used for determining the interpolated line that is the line that interpolates between a given vertex and another vertex in the vertices of a unit graphic form that is input by the operation means which the latter is being operated.

In a data distribution medium of this invention, if a unit graphic form is input, interpolation vectors are generated, used for determining an interpolated line which is the line that interpolates a space between a given vertex and another vertex in the vertices of the unit graphic form, and the data distribution medium provides as data concerning the image, at least the coordinates of the vertices thus obtained and the interpolation vectors at the vertices.

In an embodiment, an image processing device comprises a provision device which includes an operation means that is operated when a unit graphic form is input, and an interpolation vector generation means that generates interpolation vectors used for determining an interpolated line that is the line that interpolates between a given vertex and another vertex in the vertices of the unit graphic forms input by the operated operation means, and a client device which has an interpolated line computation means for determining the interpolated lines from the coordinates of the vertices of the unit graphic forms and from the interpolation vectors, and an interpolated point computation means that determines, as the vertices of sub-unit graphic forms, interpolated points that arc points on the interpolated lines.

In the image processing device of the present invention, the interpolated line computation means determines the interpolated line that is the line that interpolates between two vertices from the interpolation vector used for determining the line that interpolates the space between a given vertex and another vertex in the vertices of a unit graphic form and from the coordinates of the vertices, and the interpolated point computation means determines, as the vertices of sub-unit graphic forms, interpolated points that are points on an interpolated line.

In the image processing method of the present invention, the interpolated line that is the line that interpolates between two vertices is determined from the coordinates of the vertices and the interpolation vector used for determining the line that interpolates between a given vertex and another vertex in the vertices of a unit graphic form, and interpolated points that are points on an interpolated line are determined as the vertices of sub-unit graphic forms.

In the program distribution medium of the present invention, a computer program is provided, which determines the interpolated line that is the line that interpolates between two vertices from the coordinates of the vertices and the interpolation vector used for determining the line that interpolates between a given vertex and another vertex in the vertices of a unit graphic form, and determines, as the vertices of sub-unit graphic forms, interpolated points that are points on an interpolated line.

In an embodiment of the image processing device, the operation means is operated when a unit graphic form is input, and the interpolation vector generation means generates the interpolation vector that is used to determine the interpolated line that is the line that interpolates between a given vertex and another vertex in the vertices of the unit graphic form input by the operated operation means.

According to yet another embodiment, in the image processing method of this invention the interpolation vector is generated that is used to determine the interpolated line that is the line that interpolates between a given vertex and another vertex in the vertices of the unit graphic form input by the operation means when the latter is being operated.

In the program distribution medium of the present invention, a computer program may be provided which generates an interpolation vector used for determining the interpolated line that is the line that interpolates between a given vertex and another vertex in the vertices of a unit graphic form that is input by the operation means being operated.

In the data distribution medium of the present invention, if a unit graphic form is input, by generating the interpolation vector used for determining an interpolated line that is the line which interpolates between a given vertex and another vertex in the vertices of the unit graphic form, there are provided as data concerning the image, at least the coordinates of the vertices thus obtained and the interpolation vectors at the vertices.

In yet another embodiment of the image processing device, the operation means is operated when a unit graphic form is input, and the interpolation vector generation means generates interpolation vectors used for determining the interpolated line that is the line that interpolates between a given vertex and another vertex in the vertices of the unit graphic form input by the operated operation means. The interpolated line computation means determines the interpolated lines from the coordinates of the vertices of the unit graphic forms and from the interpolation vectors, and the interpolated point computation means determines, as the vertices of sub-unit graphic forms, interpolated points that are points on the interpolated lines.

BRIEF EXPLANATION OF THE DRAWINGS

FIGS. 26(A)–26(D) diagrammatically show the format of the splitting polygon data;

DETAILED DESCRIPTION OF THE PREFERRED EMBODIMENTS

Figure 1:
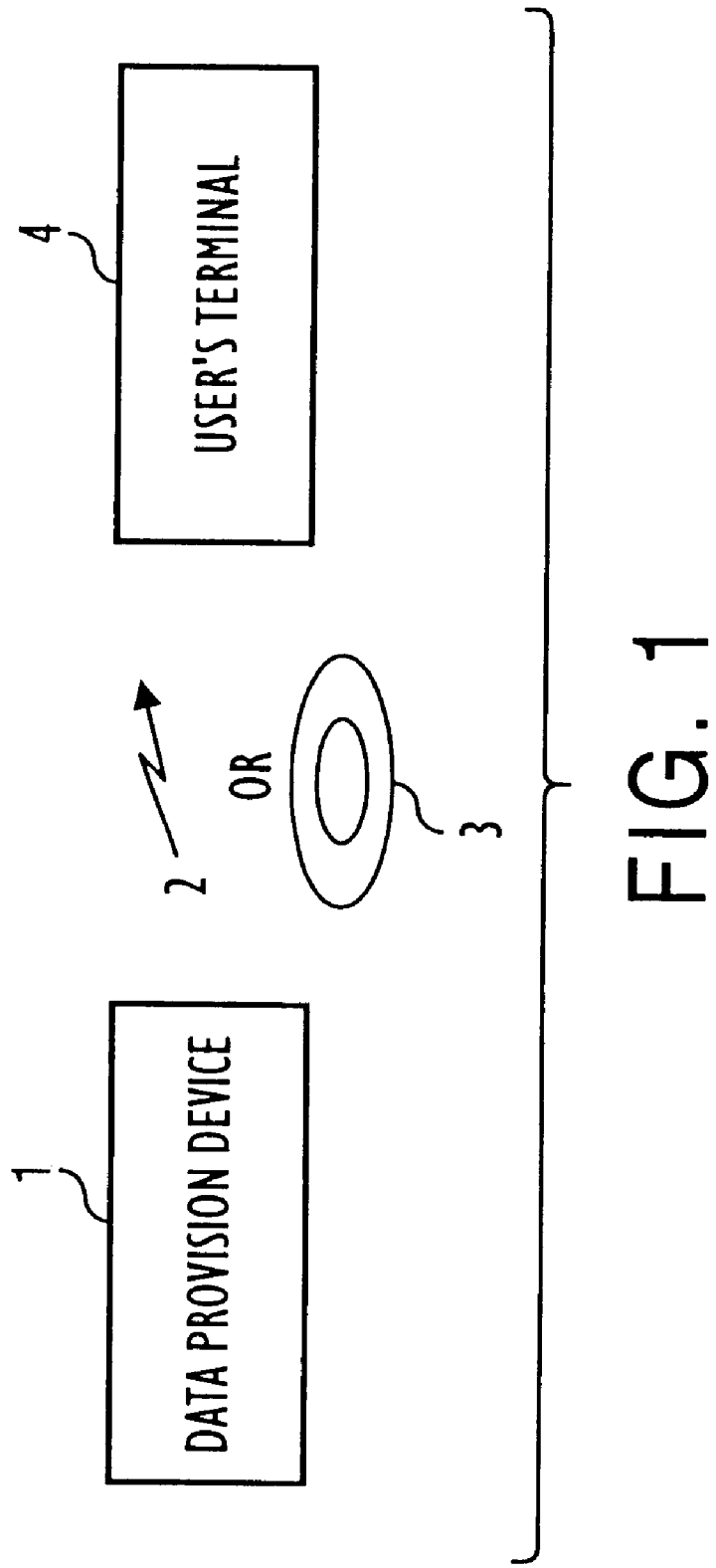
FIG. 1 is a diagram that shows an example of the configuration of an embodiment of a data provision system to which the present invention applies.

The symbols designating various parts of the present inventions are as follows:

1 is a data provision device, 2 is a transmission medium, 3 is a recording medium, 4 is a user terminal, 11 is an input unit, 12 is a data processing unit, 12A is a memory, 13 is a splitting database, 14 is a splitting processing unit, 15 is a rendering unit, 16 is display unit, 17 is a texture database, 18 is a transmission/recording device, 21 is a reception/playback device, 22 is a splitting database, 23 denotes a geometry processing unit, 24 designates a splitting processing unit, 25 is a rendering unit, 26 is a display unit, 27 is a texture database, 28 is a main unit, 101 is a main bus, 102 is a sub bus, 111 is a main CPU, 112 is a main memory, 113 is a main DMAC, 114 is MDEC, 115 is GPU, 116 is a bus controller, 117 is GTE, 118 is a graphic memory, 119 is a cache memory, 121 is a sub CPU, 122 is a sub memory, 123 is sub DMAC, 124 is ROM, 125 is SPU, 126 is ATM communication unit, 127 is an auxiliary memory device, 128 is an input device interface, 129 is a sound memory, 141 is a frame buffer, 142 is an Z buffer, 143 is a texture memory. Referring now to the drawings in detail FIG. 1 shows an example of a data provision system to which this invention applies ("system" means an aggregate in which multiple devices are collected together logically, regardless of whether the constituent devices are in the same housing).

In this data provision system, three-dimensional image data generated on the side of a data provision device 1 is provided to a user terminal 4.

That is, data for three-dimensional images, such as data about polygons that constitute a three-dimensional shape, is generated by the producer on data provision device 1, and it is provided to user terminal 4 by being transmitted via a transmission medium (transmission route) 2, for example, via Internet, satellite circuit, ground wave, cable television (CATV) network, public switched telephone network (PSTN), or integrated service digital network (ISDN). Or, alternatively, data for three-dimensional images generated by data provision device 1 is provided to user terminal 4 by being recorded on recording medium 3, for example, on optical disk, optomagnetic disk, magnetic disk, magnetic tape, or phase-change disk.

At user terminal 4, the data provided from data provision device 1 as described above is processed, and a three-dimensional image is displayed.

Figure 2:
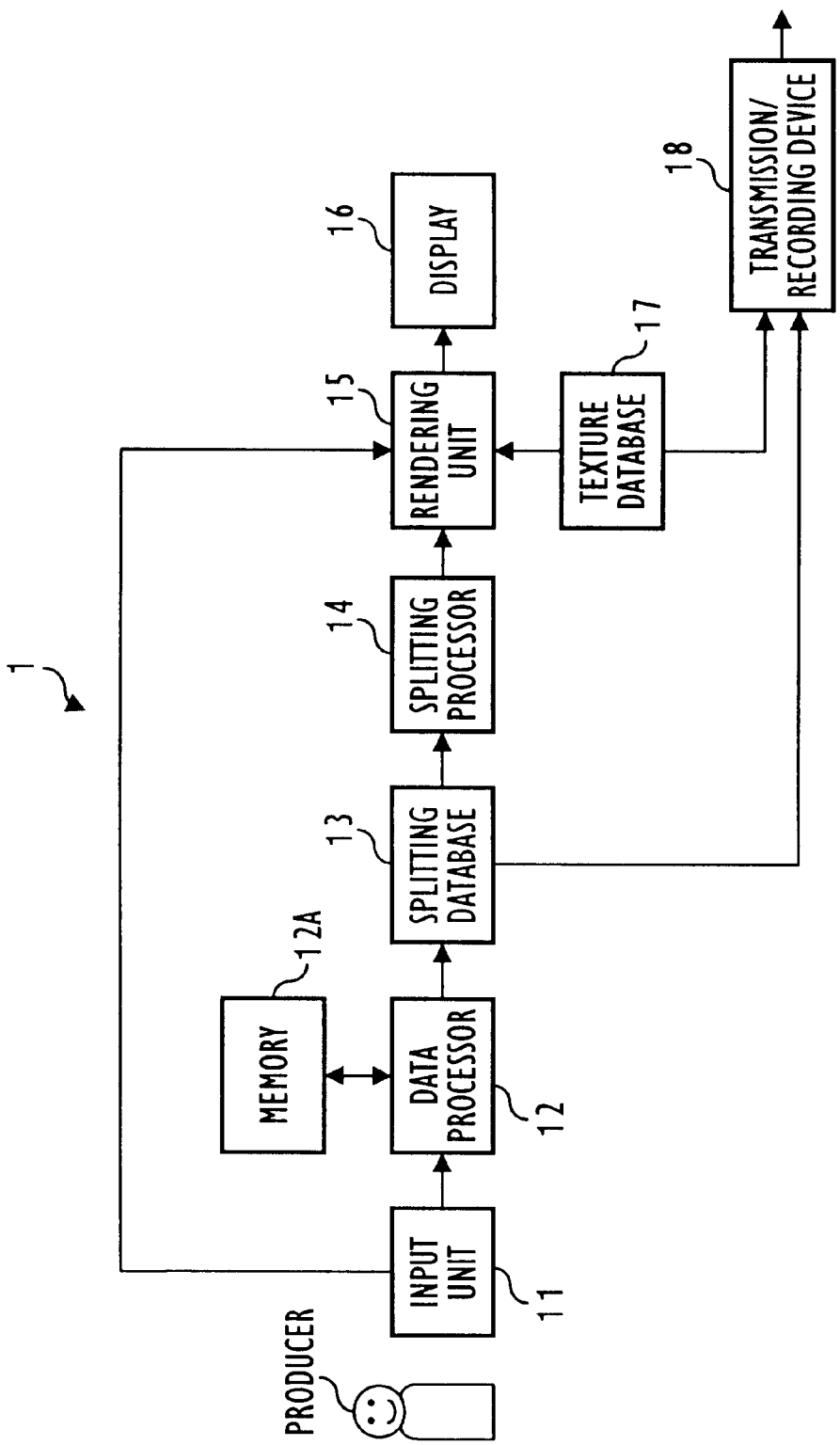
FIG. 2 is a block diagram of an embodiment of the data provision device of the system of FIG. 1.

FIG. 2 shows an example of the configuration of data provision device 1 of FIG. 1.

Input unit 11, which is a keyboard, mouse, tablet, or similar device, is operated when data for producing the polygons that constitute a three-dimensional shape is to be input, when the texture to be mapped onto the polygons is to be specified, and when necessary commands, etc. are to be input. Here, data for producing the polygons that constitute the three-dimensional shape that is input by input unit 11 being operated is supplied to data processing unit 12, the specification of the texture to be mapped onto the polygons is supplied to rendering unit 15, and commands are supplied to the necessary block.

Data processing unit 12 generates the coordinates of the vertices on the polygons in three-dimensional space, as well as the below-described interpolation vector at each vertex, by processing, using memory 12A if necessary, the data for producing the polygons that is supplied from input unit 11, and supplies them to splitting database 13. Here the coordinates of the vertices of the polygons and the interpolation vectors are used for splitting processing of the polygons, which is described below, so in the following, for convenience, these are both referred to as splitting polygon data.

Memory 12A temporarily stores the data needed for processing by data processing unit 12. Splitting database 13 temporarily stores the splitting polygon data from data processing unit 12.

Splitting processing unit 14 reads the splitting polygon data that is stored in splitting database 13, performs splitting processing (fine splitting processing), which is discussed below, splits rough polygons into multiple fine polygons (hereafter referred to, for convenience, as subpolygons), and supplies them to rendering unit 15.

Rendering unit 15 performs rendering processing on the subpolygons from splitting processing unit 14. That is, rendering unit 15 performs on the subpolygons brightness calculations, etc. for shading, and converts the coordinate system of the polygons in thee-dimensional space into the coordinate system (screen coordinate system) of display unit 16 as a two-dimensional output device that displays three-dimensional images. Also, using the texture data stored in texture database 17, rendering unit 15 carries out calculation of the texture address for texture mapping, determines the final RGB values (the brightness values of the R (red) component, G (green) component, and B (blue) component) of each pixel that comprises display unit 16, and outputs them to display unit 16. The textures for texture mapping are specified by, for example, input unit 11 being operated.

Display unit 16, which is for example a cathode ray tube (CRT) or liquid crystal display, displays the pixels that correspond to the RGB values from rendering unit 15. Texture database 17 stores data on textures to be used for texture mapping. Transmission/recording device 18 reads the splitting polygon data stored in splitting database 13, reads the texture data stored in texture database 17, and transmits it via transmission medium 2 or records it in recording medium 3.

Figure 3:
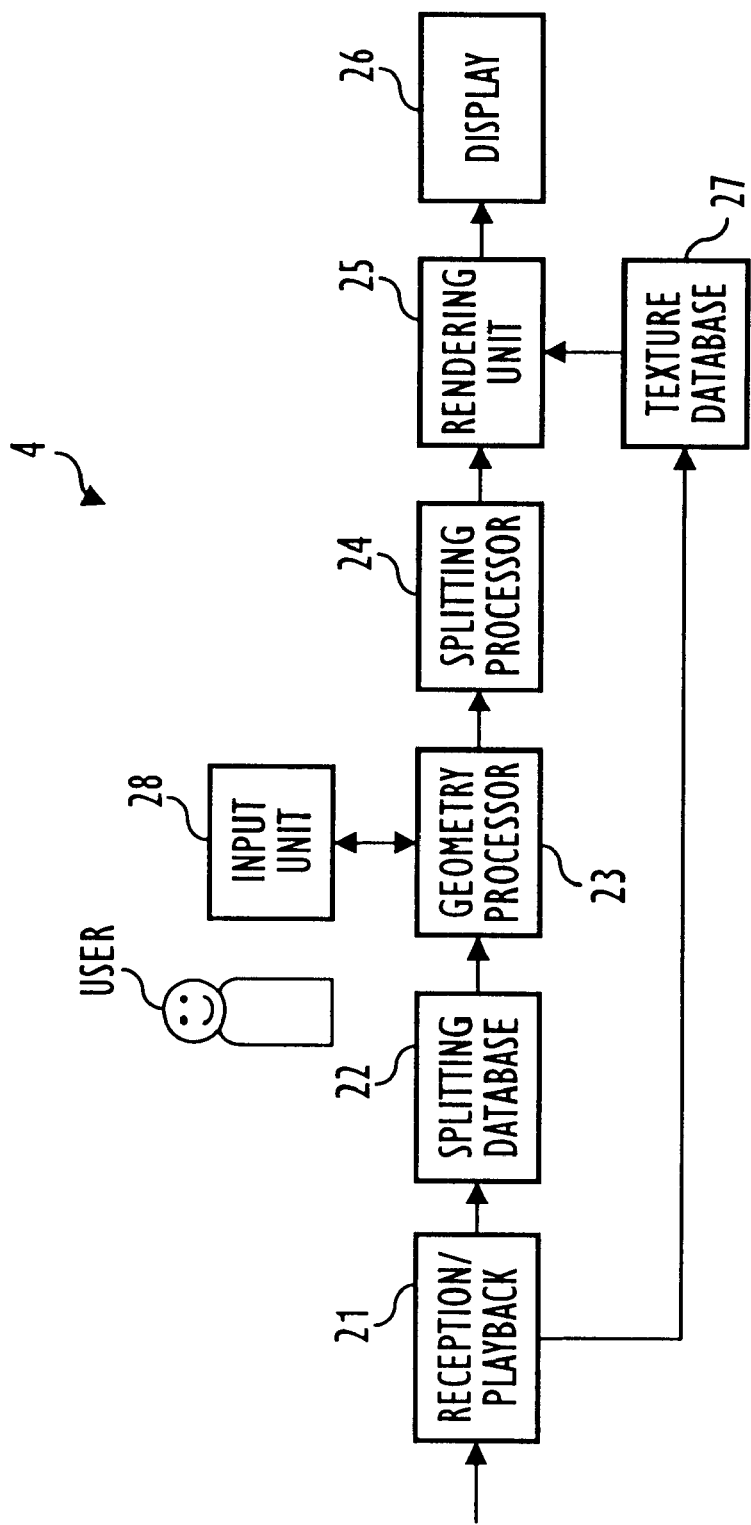
FIG. 3 is a block diagram of an embodiment of the user terminal of the system of FIG. 1.

Next, FIG. 3 shows an example of the configuration of user terminal 4 of FIG. 1.

The user terminal includes a reception/playback device 21 which receives data that is transmitted via transmission medium 2 or plays back the data that is recorded in recording medium 3, and among this it supplies the splitting polygon data to a splitting database 22 and the texture data to a texture database 27.

Splitting database 22 temporarily records the splitting polygon data from reception/playback device 21. A geometry processing unit 23 reads the splitting polygon data stored in splitting database 22, does geometry processing on the input from input unit 28, that is, performs coordinate conversion, clipping, etc., and supplies it to a splitting processing unit 24.

Splitting processing unit 24, or rendering unit 25, to which its output is supplied, carries out the same processing as in the case of splitting processing unit 14 or rendering unit 15, respectively, which forms part of data provision device 1 in FIG. 2. A display unit 26 is constituted in the same way as display unit 16, which forms part of data provision device 1 in FIG. 2, and it displays a three-dimensional image that corresponds to the RGB values from rendering unit 25.

Texture database 27 stores the texture data from reception/playback device 21. This texture data is used for the texture mapping done by rendering unit 25.

Input unit 28 is for example a keyboard, mouse, joystick, buttons, etc. and is operated by the user when a prescribed input (for example, in particular, information about the viewpoint) is to be input.

Next, the processing in data provision device 1 of FIG. 2 will be described and in user terminal 4 of FIG. 3. However, first the polygon splitting processing done in splitting processing unit 14 will be described, which forms part of data provision device 1 of FIG. 2, and in splitting processing unit 24, which forms part of user terminal (client terminal) 4 of FIG. 3.

If a three-dimensional shape in a three-dimensional image is represented by polygons, the three-dimensional shape can be reproduced with greater fidelity by using finer polygons. However, if fine polygons are used, the number of polygons that represent the three-dimensional shape increases, so one must set all the data for these many polygons. which is troublesome; in addition, the quantity of data becomes greater.

On the other hand, if a three-dimensional shape is represented by a small number of polygons, a small quantity of data to be set suffices, but the reproduced three-dimensional shape then becomes coarse, which degrades the quality of the three-dimensional image.

In the polygon splitting that is generally done, a number of fine polygons that make up a three-dimensional shape are assembled to form a large polygon, and the large polygon and the original fine polygons are selected as necessary, so the data that must be set when constituting a three-dimensional shape is no different from the case in which the three-dimensional shape is constituted by fine polygons.

In the polygon splitting that is done in splitting processing units 14 and 24 (called hereinafter fine splitting processing to distinguish it from conventional polygon splitting), from the beginning a rough polygon is split into detailed (fine) polygons so as to give a smooth three-dimensional shape, and even if detailed data about the three-dimensional shape to be realized is not given in this way, a delicate three-dimensional shape can be obtained by simply giving, so to speak, rough data.

That is, splitting processing units 14 and 24 are given., as splitting polygon data, at least the interpolation vectors, and the coordinates of the vertices, for determining the line that interpolates between a given vertex and another vertex in the vertices of the polygon, and in fine splitting processing, interpolated lines that are the lines that interpolate between two vertices are determined from the interpolation vectors and the coordinates of the vertices, and interpolated points that are points on a given interpolated line are determined as the vertices of subpolygons into which the original polygon is split.

Here, as data for a three-dimensional image composed of polygons, generally the coordinates of the vertices of a polygon are given for specifying the shape of the polygon. For shading, the normal vector at each vertex of the polygons of a curved surface that makes up part of a three-dimensional shape to be realized by polygons is also given as data for the three-dimensional image.

In fine splitting processing, the normal vectors at the vertices of the polygons are used as interpolation vectors, and the interpolated lines that interpolate between two vertices are determined.

Figure 4:
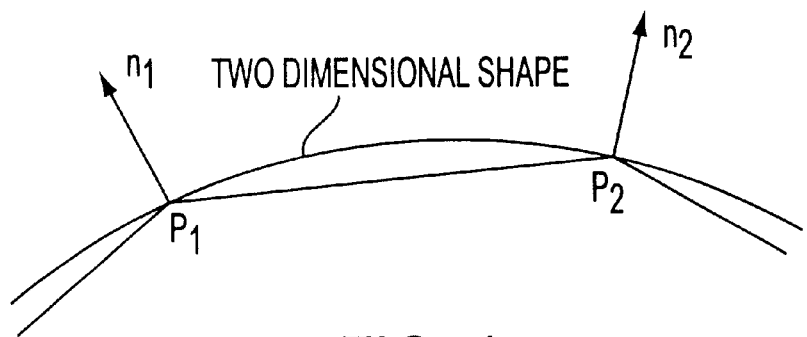
FIG. 4 is a diagram showing polygons and normal vectors, for explaining the computation method for interpolated lines according to the invention.

That is, in order now to simplify the explanation, given, as shown in FIG. 4, two vertices $P_1$ and $P_2$ of a polygon that makes up part of a two-dimensional shape, and normal vectors $n_1$ and $n_2$ at vertices $P_1$ and $P_2$, respectively, we describe the method for calculating the interpolated line that interpolates between vertices $P_1$ and $P_2$ in this case.

In this embodiment, it is taken to be ideal for the interpolated line to be equal to the arc of a circle or ellipse that passes through the two vertices that the interpolated line interpolates, and such an interpolated line is to be determined. Here, all smooth curves can be approximated by a succession of minute arcs (including arcs of both circles and ellipses), so here one adopts as interpolated lines curves that are represented by functions that can approximate an arc.

Figure 5:
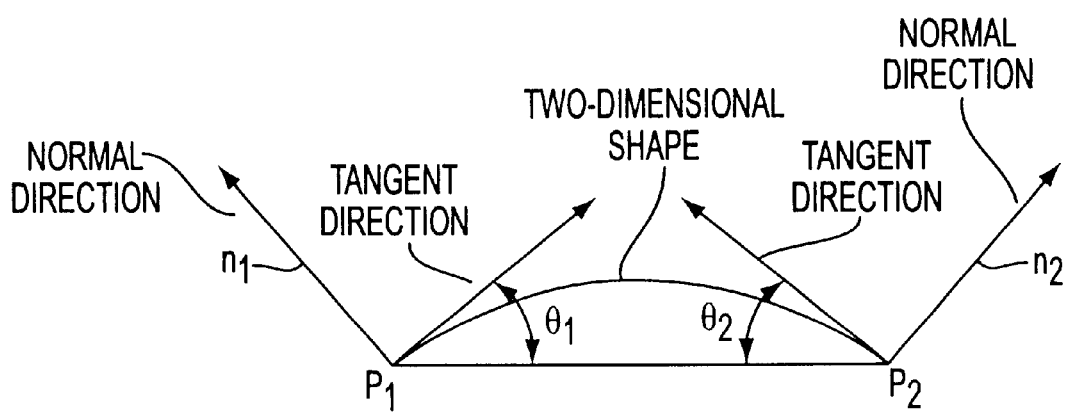
FIG. 5 is a diagram that shows an interpolated line if angles $\theta_1$ and $\theta_2$ between a line segment forms with the tangent vectors are equal.

As shown in FIG. 5, given normal vectors at vertices $P_1$ and $P_2$ of a two-dimensional shape that passes through vertices $P_1$ and $P_2$ (since normal vectors $n_1$ and $n_2$ are perpendicular to the two-dimensional shape, tangent vectors can be determined from these normal vectors $n_1$ and $n_2$), the angle that line segment $P_1P_2$ joining vertices $P_1$ and $P_2$ forms with the tangent vector at vertex $P_1$ or $P_2$, is denoted by $\theta_1$ or $\theta_2$, respectively. In this case, if $\theta_1$ and $\theta_2$ are equal, the arc of a circle that passes through both vertices $P_1$ and $P_2$ can be taken as the interpolated line.

The curve that is taken as the interpolated line is selected with the relationship between $\theta_1$ and $\theta_2$ as a condition: for example, if $\theta_1$ and $\theta_2$ are equal, for example an arc of a circle that passes through both vertices $P_1$ and $P_2$ is taken as the interpolated line; if $\theta_1$ and $\theta_2$ differ by a small amount, for example an arc of an ellipse that passes through both vertices $P_1$ and $P_2$ is taken as the interpolated line; and if $\theta_1$ and $\theta_2$ differ by a large amount, for example a spline curve that passes through both vertices $P_1$ and $P_2$ is taken as the interpolated line. Thus sometimes the interpolated line does not vary continuously when the relationship between $\theta_1$ and $\theta_2$ varies.

Thus here, for example, a Bezier curve is adopted uniformly as the interpolated line regardless of the relationship between $\theta_1$ and $\theta_2$ (strictly speaking, there should be an acute accent over the "e" following the "B" in "Bezier"). The order of the Bezier curve is set to, for example, 3, so that arbitrary $\theta_1$ and $\theta_2$ can be given.

A third-order Bezier curve is specified by four control points, two of which coincide with the starting point and ending point of the Bezier curve. The other two control points lie on the tangent at the starting point and ending point of the Bezier curve, respectively.

Meanwhile, because the tangent vector at vertex $P_1$ or $P_2$ is determined based on normal vector $n_1$ or $n_2$, respectively, the tangent direction of the Bezier curve that passes through vertex $P_1$ or $P_2$ is specified by giving normal vector $n_1$ or $n_2$. And the starting point or ending point of the Bezier curve that is the interpolated line is given by vertex $P_1$ or $P_2$ (or $P_2$ or $P_1$), respectively. Therefore the third-order Bezier curve as the interpolated line that interpolates between vertices $P_1$ and $P_2$ is specified uniquely if one determines a control point in the direction of the tangent vector at vertex $P_1$ or $P_2$, respectively.

Figure 6:
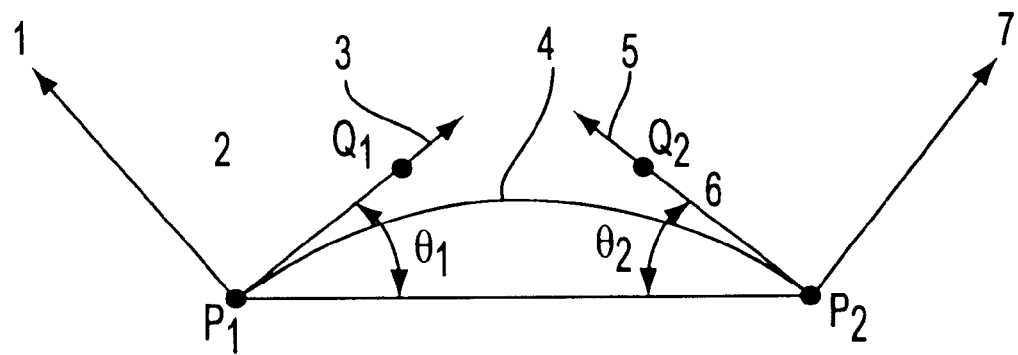
FIG. 6 is a diagram for explaining how control edge lengths $L_1$ and $L_2$ are determined in the method of the present invention.

In FIG. 6, 1 is normal direction, 2 is length $L_1$, 3 is tangent vector, 4 is an interpolated line (Bezier curve), 5 is tangent vector, 6 is length $L_2$, 7 is normal direction. In the situation shown in FIG. 6: $Q_1$ is a control point in the direction of the tangent vector at vertex $P_1$, $Q_2$ is a control point in the direction of the tangent vector at vertex $P_2$, and the length $L_1$ of line segment $P_1Q_1$ and the length $L_2$ of line segment $P_2Q_2$ are determined (in the following, for convenience, $L_1$ and $L_2$ are reflected to as control edge lengths).

First, the third-order Bezier curve B that serves as the interpolated line is expressed by the following equation using parameter t (0#t#1) and (the coordinates of) the four control points $P_1$, $P_2$, $Q_1$, $Q_2$.

$$B = (1-t)^3 P_1 + 3(1-t)^2 t Q_1 + 3(1-t)t^2 Q_2 + t^3 P_2 \qquad (1)$$

Figure 7:
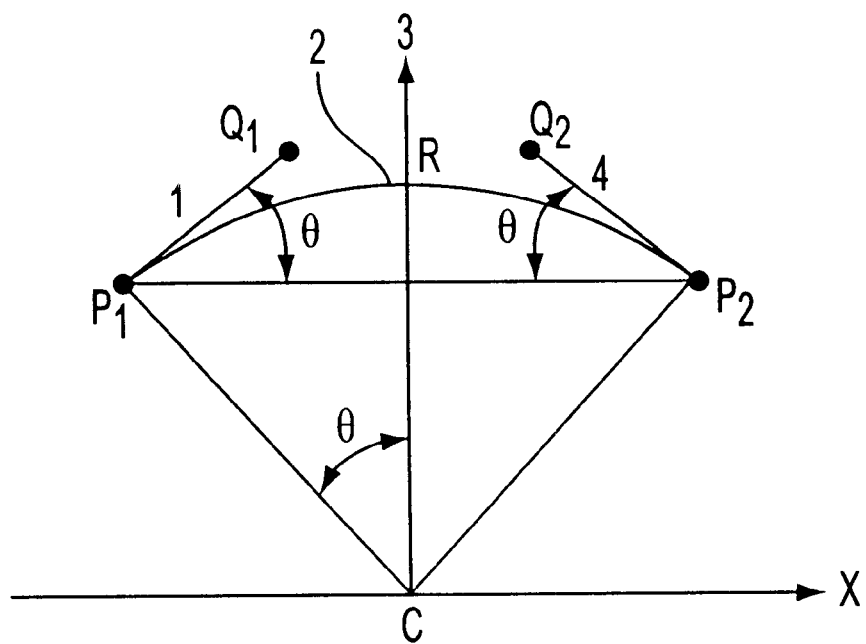
FIG. 7 is a diagram for explaining how control edge lengths $L_1$ and $L_2$ are determined.

Now if in FIG. 6 we set $\theta_1 = \theta_2 = \theta$, then since as stated above it is ideal here that the interpolated line be an arc of a circle, the situation shown in FIG. 7 results if FIG. 6 is rewritten so that, for example, the origin is taken as the center C of the circle and line segment $P_1P_2$ is parallel to the x-axis. In FIG. 7, 1 is length $L_1$, 2 is interpolated line, 3 is Y-axis, 4 is length $L_2$, R represents the intersection point of the y-axis and the arc of the circle that is the interpolated line, and this intersection point R can be determined by setting t=0.5 in equation (1). Here, line segment RC is the radius of the arc of the circle that is the interpolated line, and in this case, because center C lies at the origin, the radius of the circle is R.

If the interpolated line is an arc of a circle, control edge lengths $L_1$ and $L_2$ will be equal, so setting this to L ($=L_1=L_2$), from FIG. 7 the following equations holds true.

$P_{1y} = P_{2y} = R \cos\theta$, $Q_{1y} = Q_{2y} = P_{1y} + L \sin\theta$ ... (2) where $P_{1y}$, $Q_{1y}$ are the y-coordinates of control points $P_1$, $Q_1$, and $P_{2y}$, $Q_{2y}$ are the y-coordinates of control points $P_2$, $Q_2$, respectively.

Also, intersection point R is expressed by the following equation by setting t to 0.5 in equation (1) and substituting the $P_{1y}$, $P_{2y}$, $Q_{1y}$, $Q_{2y}$ of equation (2) for $P_1$, $P_2$, $Q_1$, $Q_2$.

$$R = R \cos\theta/4 + \tfrac{3}{4}(R \cos\theta + L \sin\theta) \qquad (3)$$

As shown by the following equation, the length L' (=L/(2 R (2 R sin $\theta$)) of the control edge when the length of chord $P_1P_2$ is normalized to 1 can be determined by solving equations (2) and (3) for control edge length L and dividing it by the length (2 R sin $\theta$) of chord $P_1P_2$.

$$L' = 2/(3(1+\cos\theta)) \qquad (4)$$

After control edge length L' is determined from equation (4), by using this control edge length L' and vertex $P_1$ or $P_2$, control point $Q_1$ or $Q_2$, respectively, can be determined, and therefore the Bezier curve is specified as the interpolated line.

In the foregoing, $\theta_1$ and $\theta_2$ are equal, but even if $\theta_1$ and $\theta_2$ are different, by performing a transformation to expand/contract one axis, control points $Q_1$ and $Q_2$ can be determined in the same way as if $\theta_1$ and $\theta_2$ are equal.

Figure 8A:
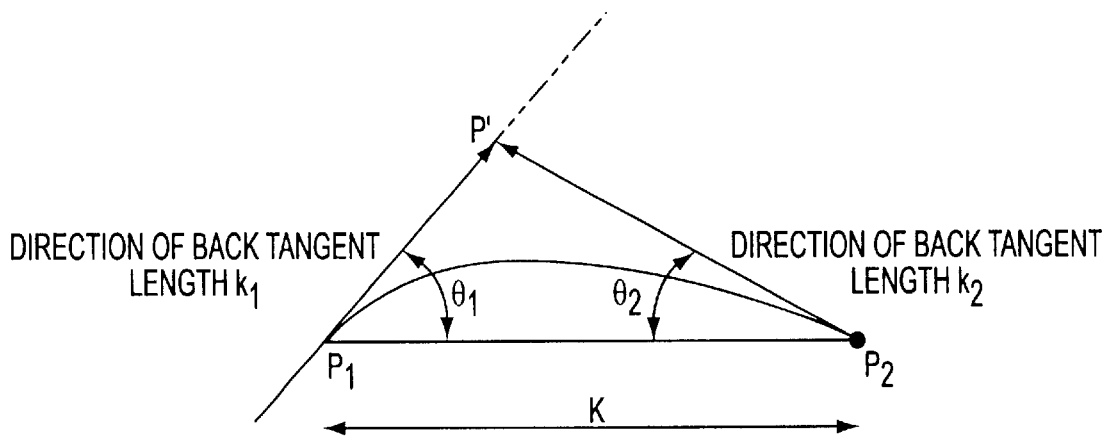
FIGS. 8(A)–8(C) show diagrams for explaining how an interpolated line is determined if angles $\theta_1$ and $\theta_2$ are different from each other.

That is, if $\theta_1$ and $\theta_2$ are different, as shown in FIG. 8(A), the triangle formed by vertices $P_1$ and $P_2$ and intersection point P' where the tangents at vertex $P_1$ or $P_2$ intersect with each other will be a scalene triangle (whereas in the case in FIG. 7 it is an isosceles triangle), and here the length of side $P_1P'$ or $P_2P'$ of this scalene triangle are denoted by $k_1$ or $k_2$, respectively. Also, the length of side $P_1P_2$ is denoted by K.

In this case, the following equations hold true.

$$k_1 \sin\theta_1 = k_2 \sin\theta_2, \quad k_1 \cos\theta_1 + k_2 \cos\theta_2 = K \qquad (5)$$

Also, K can be determined from the coordinates of vertices $P_1$ and $P_2$.

Solving equations (5) for $k_1$ and $k_2$, we get the following equations.

$$k_1 = K \sin\theta_2/(\sin\theta_2 \cos\theta_1 + \cos\theta_2 \sin\theta_1)$$

$$k_2 = K \sin\theta_1/(\sin\theta_2 \cos\theta_1 + \cos\theta_2 \sin\theta_1) \qquad (6)$$

Figure 8B:
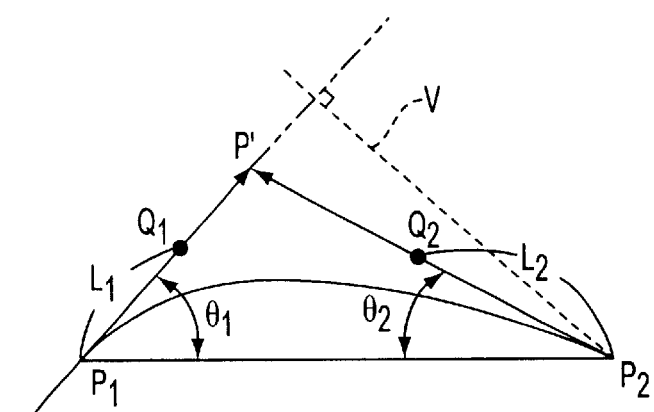
Figure 8C:
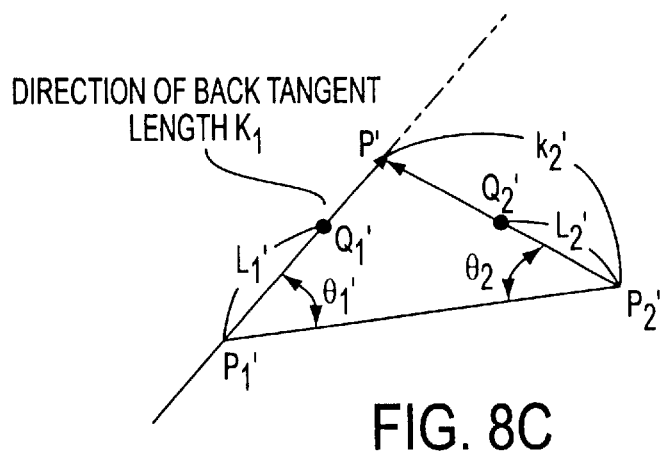

Meanwhile, if for example as shown in FIG. 8(B), denoting by V the perpendicular dropped from point $P_2$ to straight line $P_1P'$, if point $P_2$ is moved along perpendicular V so as to deform triangle $P_1P_2P'$ into triangle $P_1P_2'P'$ (expansion transformation or contraction transformation) as shown in FIG. 8(C), then the ratio of control edge length $L_2$ from control point $P_2$ to $Q_2$ in triangle $P_1P_2P'$ before the deformation to control edge length $L_2'$ from control point $P_2'$ to $Q_2'$ in triangle $P_1P_2'P'$ after the deformation will be equal to the ratio of length $k_2$ of side $P_2P'$ in triangle $P_1P_2P'$ before the deformation to length $k_2'$ of side $P_2'P'$ in triangle $P_1P_2'P'$ after the deformation, and as a result, the following equation holds true.

$$k_2 : k_2' = L_2 : L_2' \qquad (7)$$

Therefore if triangle $P_1P_2'P'$ after the deformation is made into an isosceles triangle in which the length of side $P_1P'$ and the length of side $P_2'P'$ are equal (but in order to make triangle $P_1P_2'P'$, after a deformation by an expansion/contraction transformation of one axis, into an isosceles triangle, $\theta_1$ and $\theta_2$ must be formed on the same side of chord $P_1P_2$), then control edge length $L_2'$ can be determined by equation (4), and control edge length $L_2$ can be determined from equations (6) and (7). That is, control edge length $L_2$ can be determined by the following equation.

$$L_2 = K \times k_2 \times 2 \times \cos\theta' \times 2/(3(1+\cos\theta')) \qquad (8)$$

Similarly, control edge length $L_1$ can be determined by the following equation.

$$L_1 = K \times k_1 \times 2 \times \cos\theta' \times 2/(3(1+\cos\theta')) \qquad (9)$$

The θ' in equations (8) and (9) denotes the angle formed between side $P_1P_2$ and side $P_2'P'$ in triangle $P_1P_2'P'$ after the deformation ($\theta_2'$ in FIG. 8(C)) (or the angle formed by side $P_1P_2$ and side $P_1P'$ ($\theta_1'$ in FIG. 8(C)) ($\theta_1=\theta_2$).

After control edge length $L_1$ or $L_2$ has been determined as described above, control point $Q_1$ or $Q_2$ can be determined from vertex $P_1$ or $P_2$, respectively, and thereby the Bezier curve is specified as the interpolation line.

Although θ' can be accurately determined by expressing the contraction transformation with a numerical expression, in this embodiment, in order to reduce the increase in the amount of calculation, cos θ' is approximated by s in the following equation.

$$\cos \theta's = (\cos \theta_1 + \cos \theta_2)/2 \quad (10)$$

In this case, control edge lengths $L_1$ and $L_2$ are determined according to the following equations.

$$L_1 = K \times k_1 \times 2 \times s \times 2/(3(1+s))$$
$$L_2 = K \times k_2 \times 2 \times s \times 2/(3(1+s)) \quad (11)$$

Next, referring to the flowchart in FIG. 9, the method will be described for calculating control points $Q_1$ and $Q_2$ (control point computation processing) for specifying the Bezier curve that is the interpolated line.

In computing control points $Q_1$ and $Q_2$, first, in step S1, length $k_1$ or $k_2$ of side $P_1P'$ or $P_2P'$ of triangle $P_1P_2P'$ in FIG. 8(A) is determined according to equation (6), then one proceeds to step S2. In step S2, the approximate value s of the cosine of base angle θ' ($=\theta_1'=\theta_2'$) when triangle $P_1P_2P'$ is deformed, by performing an expansion/contraction transformation, to isosceles $P_1P_2'P'$ as shown in FIG. 8(C) is determined according to equation (10), then one proceeds to step S3. In step S3, equations (11) are calculated to determine control edge lengths $L_1$ and $L_2$, thereby determining control points $Q_1$ and $Q_2$.

Figure 10A:
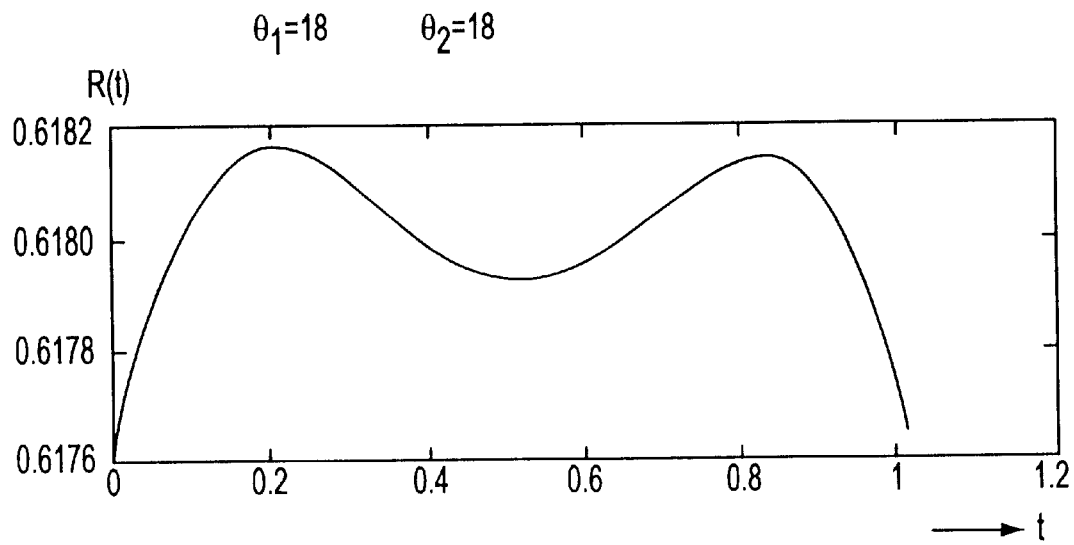
FIGS. 10(A) and 10(B) show diagrams of simulation results in which an interpolated line is determined.
Figure 10B:
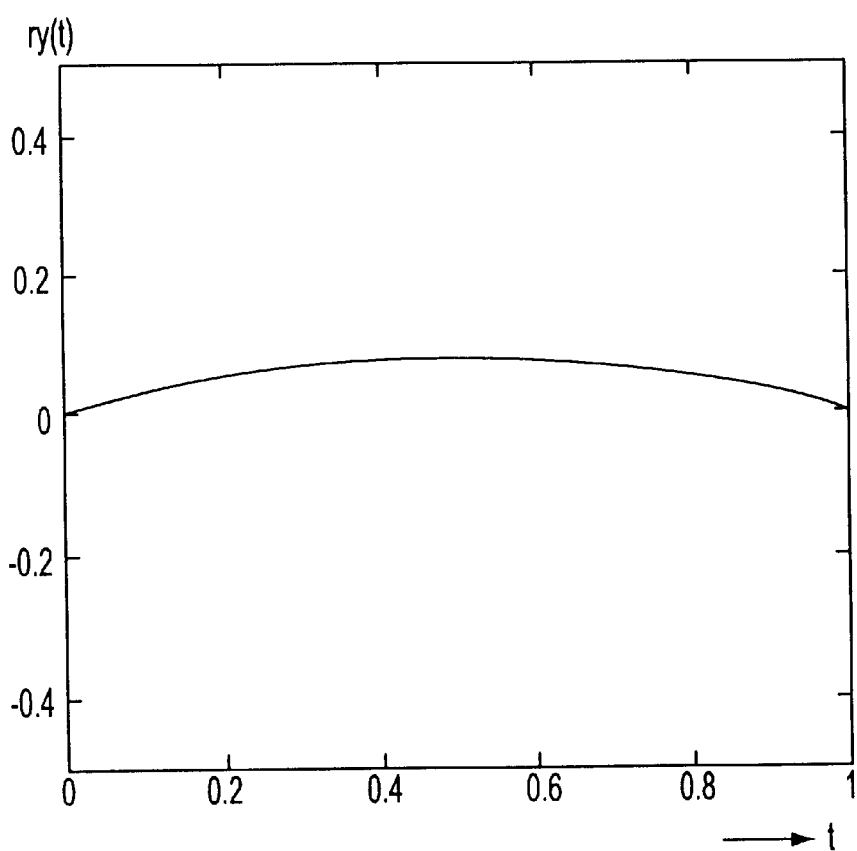
Figure 11A:
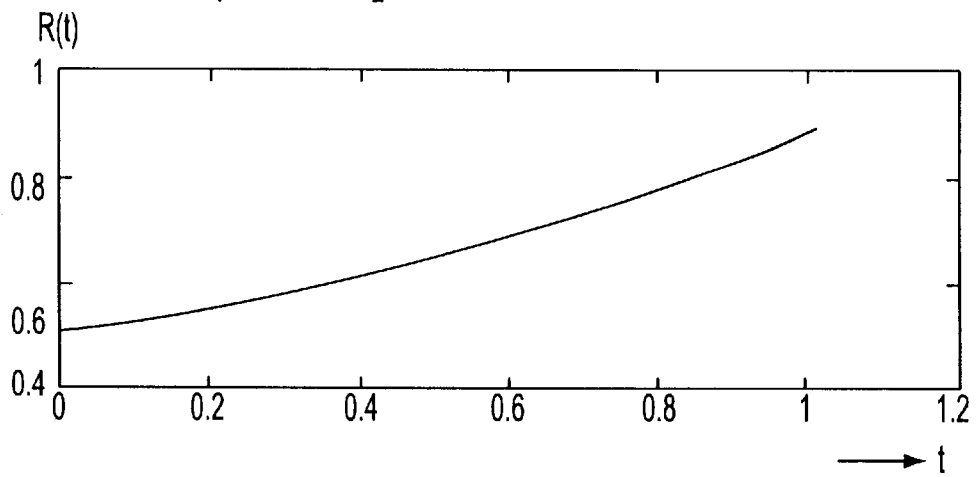
FIGS. 11(A) and 11(B) show diagrams of simulation results in which an interpolated line is determined.
Figure 11B:
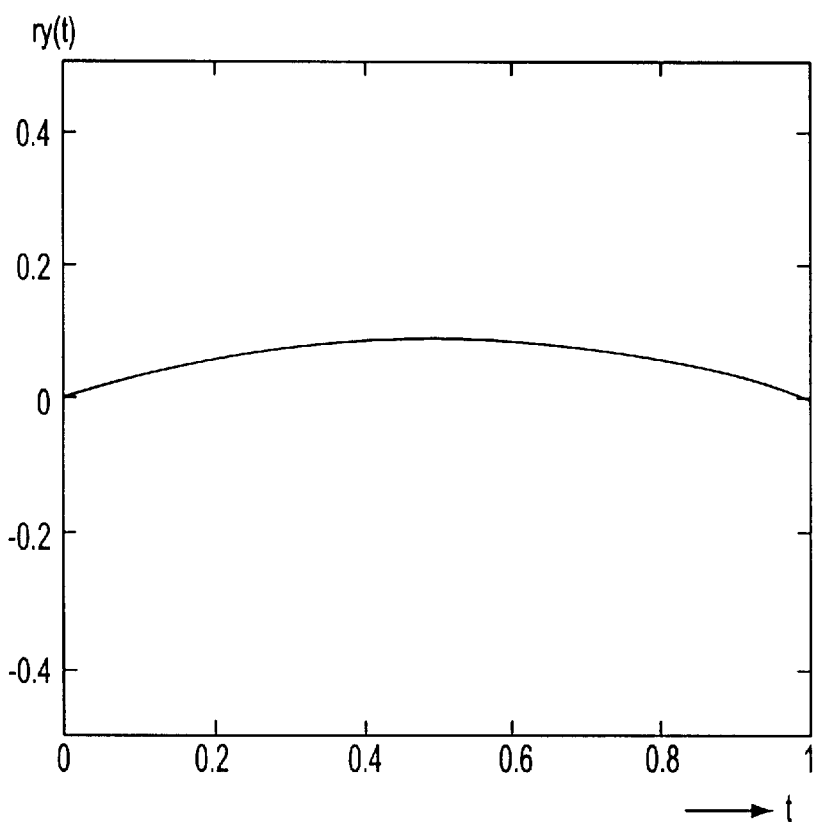
Figure 12A:
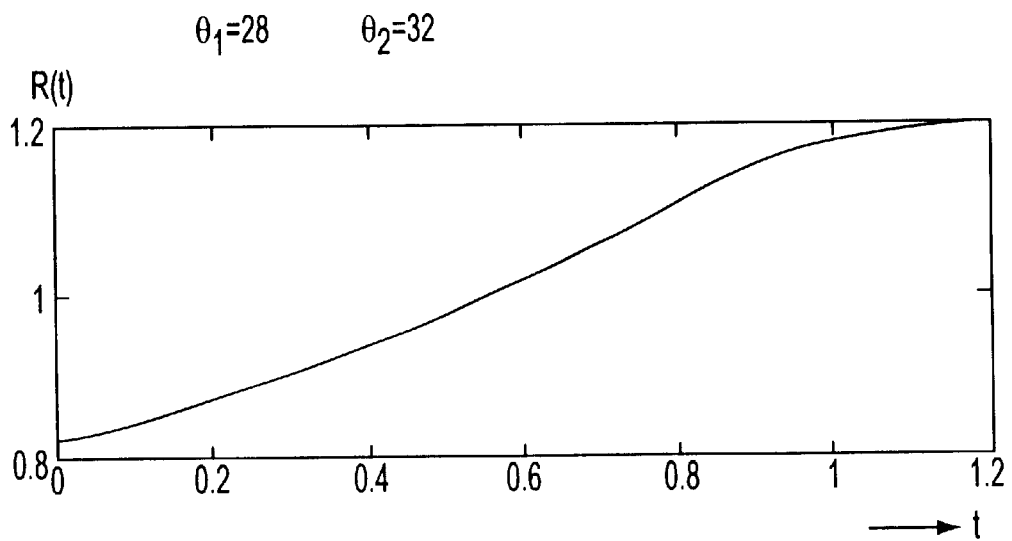
FIGS. 12(A) and 12(B) are diagrams showing simulation results in which an interpolated line is determined.
Figure 12B:
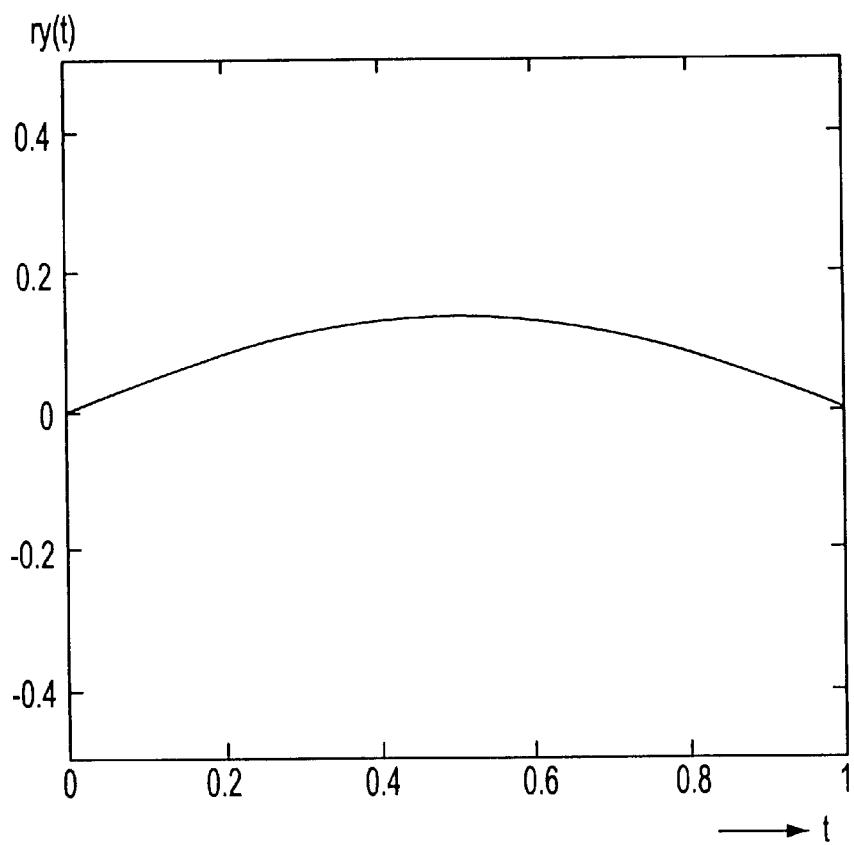
Figure 13A:
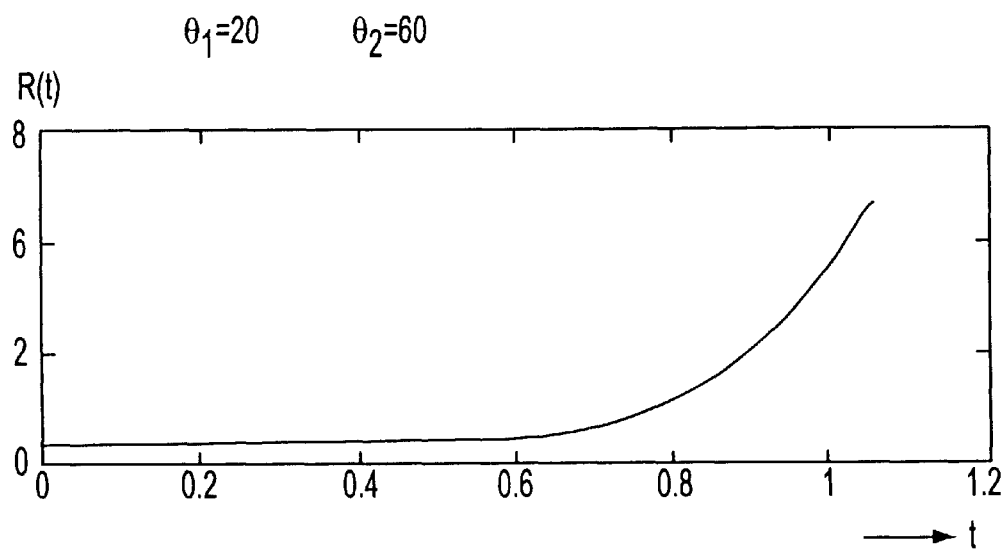
FIGS. 13(A) and 13(B) are diagrams which show simulation results in which an interpolated line is determined.
Figure 13B:
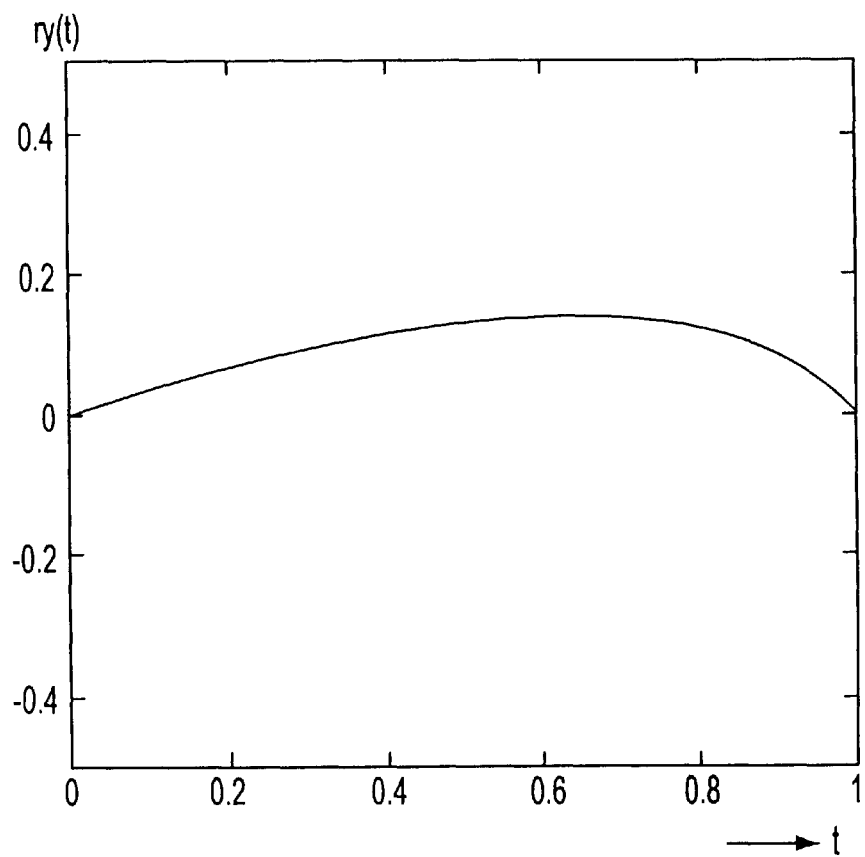

FIGS. 10 through 13 show the results of simulations in which K=1 is set, control points $Q_1$ and $Q_2$ are determined, and the interpolated line is determined that is the Bezier curve specified by these control points $Q_1$ and $Q_2$. In FIGS. 10 through 13, (A) shows the radius of curvature of the interpolated line, and (B) shows the shape of the interpolated line. Also, FIG. 10 shows the case where $\theta_1=\theta_2=18$ degrees, FIG. 11 shows the case where $\theta_1=18$ degrees and $\theta_1=22$ degrees, FIG. 12 shows the case where $\theta_1=28$ degrees and $\theta_1=32$ degrees, and FIG. 13 shows the case where $\theta_1=20$ degrees and $\theta_2=60$ degrees.

Figure 14:
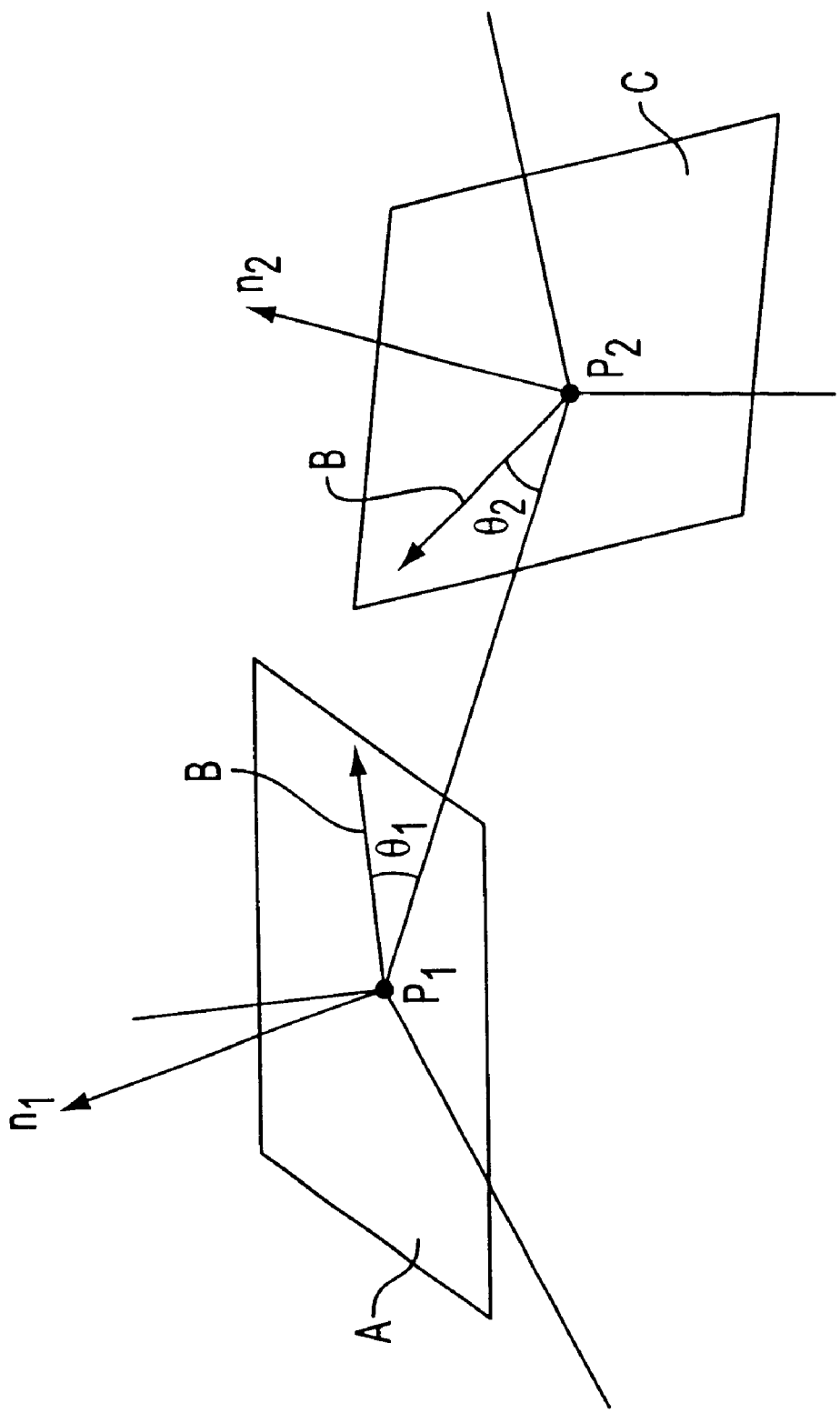
FIG. 14 is a diagram for explaining how an interpolated line is determined for a polygon that comprises a three-dimensional shape.

The foregoing concerns a polygon that is part of a two-dimensional shape, but for a polygon that is part of a three-dimensional shape, the normal vectors $n_1$ or $n_2$ at its two vertices $P_1$ or $P_2$ are in general in mutually twisted positions. As shown in FIG. 14, the angle formed by line segment $P_1P_2$ and the projection (orthogonal projection) of this line segment $P_1P_2$ onto the plane A which is perpendicular to normal vector $n_1$ and includes vertex $P_1$ is adopted as the $\theta_1$ in equations (6) and (10). That is, the unit vector in the direction of the projection of line segment $P_1P_2$ onto the plane including vertex $P_1$ that is perpendicular to normal vector $n_1$ is taken as the tangent vector B of the three-dimensional shape at vertex $P_1$, and the angle formed by this tangent vector and line segment $P_1P_2$ is taken as the $\theta_1$ in equations (6) and (10).

Similarly, the angle formed by line segment $P_1P_2$ and the projection of this line segment $P_1P_2$ onto the plane C including vertex $P_2$ that is perpendicular to normal vector $n_2$ is taken as the $\theta_2$ in equations (6) and (10).

In the following, as explained in FIG. 9, by determining control points $Q_1$ and $Q_2$, the Bezier curve can be determined as the interpolated line that interpolates between vertices $P_1$ and $P_2$. In this case, the Bezier curve as the interpolated line is generally a curve that is spatially twisted, but because the bulge is near to that of a circle or ellipse, ultimately it interpolates smoothly between vertices $P_1$ and $P_2$.

After the interpolated line is determined as described above, in fine splitting processing, as stated above, interpolated points on a given interpolated line are determined as vertices of subpolygons into which the original polygon is split, and these interpolated points can be determined by inputting an appropriate value for parameter t in equation (1), which expresses the Bezier curve as the interpolated line.

The interval between vertices $P_1$ and $P_2$ can be split into M parts by setting M−1 interpolated points between them, and if this is done, then it suffices to calculate equation (1) with parameter t set to, for example, i/M (i=1, 2, ..., M−1).

Next the case, as shown for example in FIG. 15, will be described in which four vertices $P_1$ through $P_4$ are shown, and fine splitting processing is done on quadrilateral polygon $P_1P_2P_4P_3$ that is part of a three-dimensional shape and in which line segments $P_1P_2$ and $P_3P_4$ lie opposite each other, and line segments $P_1P_3$ and $P_2P_4$ lie opposite each other.

Figure 9:
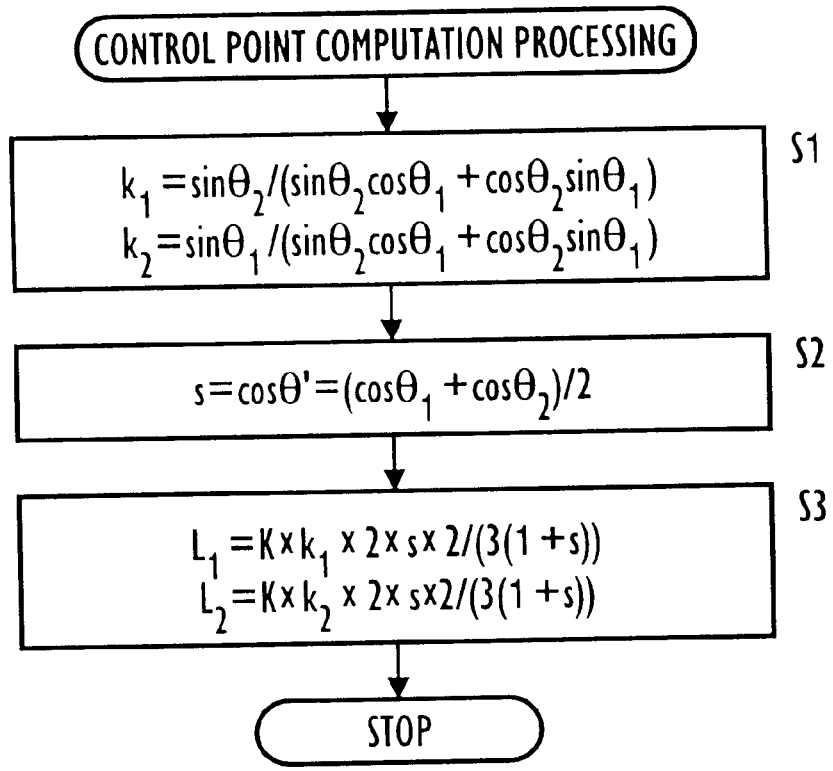
FIG. 9 is a flowchart for explaining control point computation processing.

Assuming now that the interval between vertices $P_1$ and $P_2$ is split into, for example, two parts (in this case, the interval between vertices $P_3$ and $P_4$, which lies opposite line segment $P_1P_2$, is also split into two parts), as explained in FIG. 9, interpolated line $B_{12}$ (interpolated line 1), which interpolates between vertices $P_1$ and $P_2$, is determined, and interpolated line $B_{34}$ (interpolated line 2), which interpolates between vertices $P_3$ and $P_4$, is determined. And interpolated point $P_{12}$ or $P_{34}$ can be determined on interpolated line $B_{12}$ or $B_{34}$ by computing equation (1) with parameter t set to, for example, 0.5.

In this way, quadrilateral polygon $P_1P_2P_4P_3$ is split into two subpolygons, the quadrilateral polygons $P_1P_{12}P_{34}P_3$ and $P_{12}P_2P_4P_{34}$.

And if the interval between vertices $P_1$ and $P_3$ and the interval between vertices $P_2$ and $P_4$ are each split into two parts, then, likewise as explained in FIG. 9, interpolated line $B_{13}$ (interpolated line 3), which interpolates between vertices $P_1$ and $P_3$, is determined, and interpolated line $B_{24}$ (interpolated line 4), which interpolates between vertices $P_2$ and $P_4$, is determined. And interpolated point $P_{13}$ or $P_{24}$ can be determined on interpolated line $B_{13}$ or $B_{24}$ by computing equation (1) with parameter t set to, for example, 0.5.

And in this case, interpolated line $B_{1234}$ (interpolated line 5), which interpolates between interpolated points $P_{12}$ and $P_{34}$, which were previously determined as the vertices of subpolygons, is also determined as explained in FIG. 9. And interpolated point $P_{1324}$ can be determined on interpolated line $B_{1234}$ by computing equation (1) with parameter t set to, for example, 0.5.

In this way, quadrilateral polygon $P_1P_2P_4P_3$ is split into four subpolygons, the quadrilateral polygons $P_1P_{12}P_{1234}P_{13}$, $P_{12}P_2P_{24}, P_{1234}$, $P_{1234}P_{24}P_4P_{34}$, and $P_{13}P_{1234}P_{34}P_3$.

Here quadrilateral polygon $P_1P_2P_4P_3$ is split into 2×2 (horizontal×vertical) subpolygons, but if quadrilateral polygon $P_1P_2P_4P_3$ is to be split into M×N subpolygons, it suffices to split the interval between vertices $P_1$ and $P_2$ and the interval between $P_3$ and $P_4$ each into M parts, split the interval between vertices $P_1$ and $P_3$ and the interval between $P_2$ and $P_4$ each into N parts, and split into N parts the interval between corresponding members of the M−1 interpolated points that split the interval between vertices $P_1$ and $P_2$ into M parts and the M [sic; should be M−1] interpolated points that split the interval between vertices $P_3$ and $P_4$ into M parts. But quadrilateral polygon $P_1P_2P_4P_3$ can also be split into many subpolygons by repeating a process in which quadrilateral polygon $P_1P_2P_4P_3$ is split by fine splitting processing into two subpolygons $P_1P_{12}P_{34}P_3$ and $P_{12}P_2P_4P_{34}$, and these two subpolygons $P_1P_{12}P_{34}P_3$ and $P_{12}P_2P_4P_{34}$ are each split by fine splitting processing into two further subpolygons.

Figure 15:
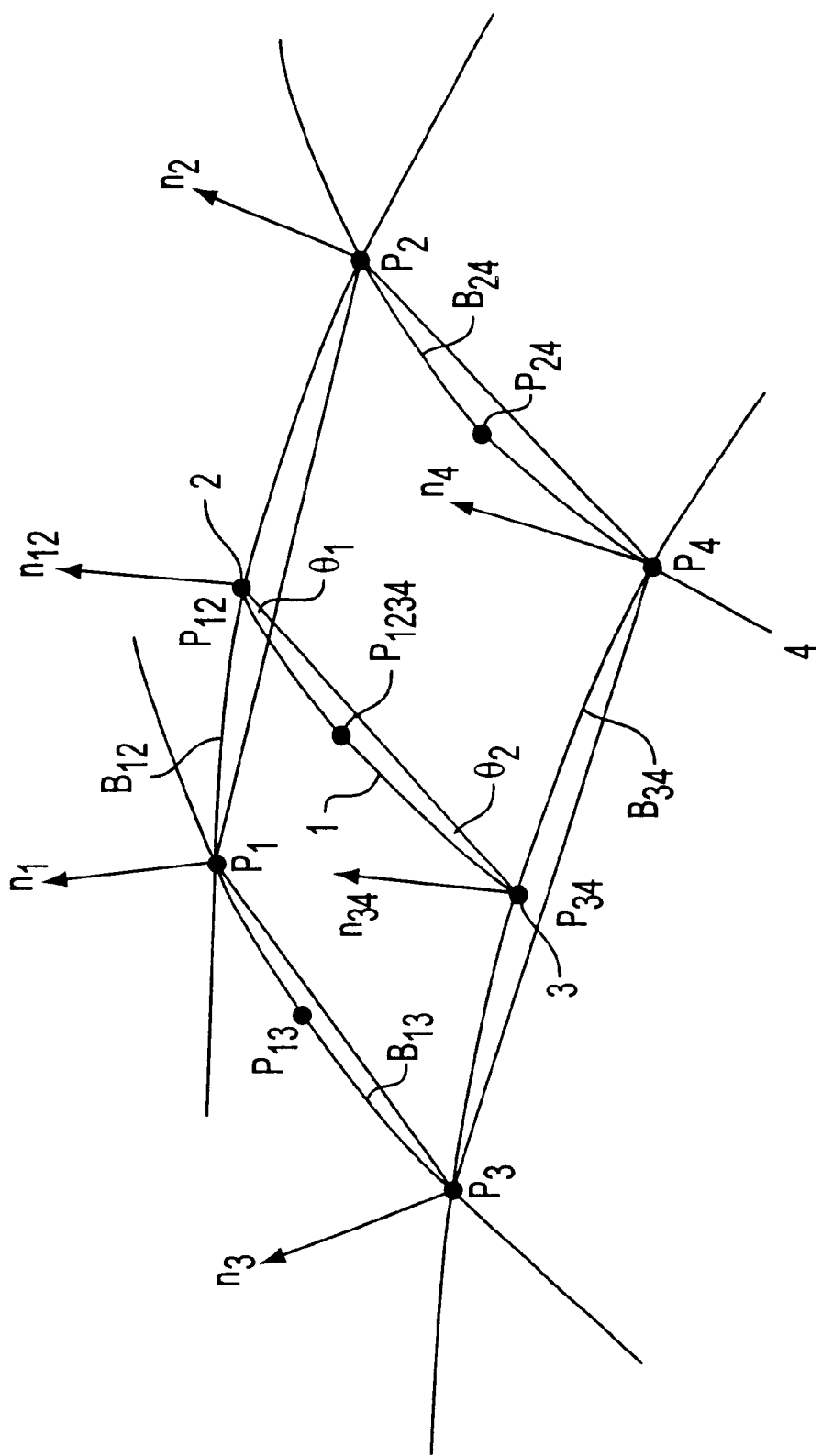
FIG. 15 is a diagram for explaining fine splitting processing.

In fine processing, since the interpolated line that interpolates between two vertices is determined using the coordinates and normal vectors of the two vertices, in determining interpolated line $B_{1234}$ that interpolates between interpolated points $P_{12}$ and $P_{34}$, for example in the case illustrated in FIG. 15, it is necessary to have normal vectors $n_{12}$ or $n_{34}$ at interpolated points $P_{12}$ or $P_{34}$, respectively. And even if an interpolated point with another interpolated point is an interpolated point that cannot be determined (in the case of FIG. 15, interpolated points $P_{13}$, $P_{24}$, $P_{1234}$), because the interpolated point is the vertex of a subpolygon, a normal vector is needed to do shading in rendering processing.

A normal vector at a vertex of a subpolygon (except a vertex of the original polygon) is determined here for example as follows.

Figure 16:
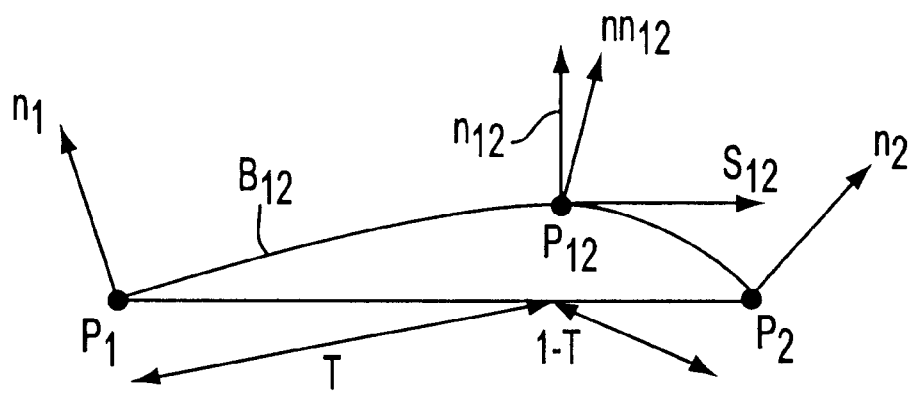
FIG. 16 is a diagram for explaining how a normal vector at a vertex of a subpolygon is determined.

Namely, taking the example of interpolated point $P_{12}$ that splits the interval between vertices $P_1$ and $P_2$, its normal vector $n_{12}$ is determined, as shown in FIG. 16, by linear interpolation using normal vector $n_1$ at vertex $P_1$ and normal vector $n_2$ at vertex $P_2$.

Specifically, if parameter t that is substituted in equation (1) when interpolated point $P_{12}$ on interpolated line $B_{12}$ is to be determined is set to T, then unit vector $nn_{12}$, which corresponds to the sum of $(1-T)$ times normal vector $n_1$ plus $TT$ times normal vector $n_2$ is determined according to the following equation.

$$nn_{12} = ((1-T)n_1 + Tn_2)/|(1-T)n_1 + Tn_2| \quad (12)$$

where $|x|$ represents the norm of vector x.

The vector $nn_{12}$ obtained by equation (12) is equal to the normal vector determined in Phong shading.

Vector $nn_{12}$ may be adopted without modification as normal vector $n_{12}$ at interpolated point $P_{12}$, but because vector $nn_{12}$ is obtained by linear interpolation using normal vectors $n_1$ and $n_2$, it is difficult to say that it faithfully reflects the shape of interpolated line $B_{12}$. So here we correct vector $nn_{12}$ as follows, and adopt the corrected vector as normal vector $n_{12}$ at interpolated point $P_{12}$.

That is, first we determine tangent vector $s_{12}$ of interpolated line $B_{12}$ at interpolated point $P_{12}$. Here tangent vector $s_{12}$ can be determined from equation (1).

Then we determine the vector product $nn_{12}'$ of vector $nn_{12}$ and tangent vector $s_{12}$ according to the following equation.

$$nn_{12}' = nn_{12} \times s_{12} \quad (13)$$

Then we determine the vector product of tangent vector $s_{12}$ and vector $nn_{12}'$ and set this to normal vector $n_{12}$ at interpolated point $P_{12}$ as shown in the following equation.

$$n_{12} = s_{12} \times nn_{12}' \quad (14)$$

Here the "×" in equations (13) and (14) represents a vector product.

Because normal vector $n_{12}$ determined as described above faithfully expresses the shape of interpolated line $B_{12}$, which is a Bezier curve, by using this in shading (highlight calculation, etc.), we can obtain an image whose brightness distribution accurately reflects the shape of interpolated line $B_{12}$.

As described above, with fine splitting processing the normal vector is used as an interpolation vector, the interpolated line that interpolates between two vertices is determined from the normal vectors and the coordinates of the vertices, and an interpolated point on a given interpolated line is determined as the vertex of a subpolygon into which the original polygon is split, so one can compose a delicate three-dimensional shape from polygons of rough shape.

And because the locality of the interpolation is preserved here, that is, because for example in FIG. 15 each normal vector of an interpolated point that splits the interval between vertices $P_1$ and $P_2$ is determined from normal vector $n_1$ at vertex $P_1$ and normal vector $n_2$ at vertex $P_2$, the subpolygons obtained by splitting quadrilateral polygon $P_1P_2P_4P_3$ and the subpolygons obtained by splitting another polygon that abuts quadrilateral polygon $P_1P_2P_4P_3$ at its side $P_1P_2$ are connected continuously, and thus a smooth three-dimensional shape can be obtained.

In the case described above, a quadrilateral polygon has been considered. However, fine splitting processing can also be done on a polygon that has a different number of sides than four. For example, if done on a triangular polygon, fine splitting processing can be done on a triangular polygon in the same way as on a quadrilateral polygon by thinking of one of the pairs of vertices $P_1$ and $P_2$, $P_3$ and $P_4$, $P_1$ and $P_3$, or $P_2$ and $P_4$ that make up the aforesaid quadrilateral polygon $P_1P_2P_4P_3$ as being the same vertex.

Here, texture coordinates at the vertices of the subpolygons are required for doing texture mapping on the subpolygons that result from fine splitting processing, but these can be determined in the same way that, for example, normal vector $nn_{12}$ at interpolated point $P_{12}$ is determined, as explained in FIG. 16. That is, although it was not stated above, the data on the three-dimensional image that is generated in data provision device 1 includes, besides splitting polygon data and texture data, the texture coordinates at each vertex of the original polygons; for example, the texture coordinates at interpolated point $p_{12}$, which splits the interval between vertices $P_1$ and $P_2$, can be determined by adding (linearly interpolating) the texture coordinates at vertex $P_1$ and the texture coordinates at vertex $P_2$ in accordance with the ratio 1-t:t corresponding to parameter t substituted in equation (1) for determining interpolated point $P_{12}$.

If the shape of the interpolated line $B_{12}$ between vertices $P_1$ and $P_2$ is biased (for example, if the radius of curvature of the part near one or the other of vertex $P_1$ or $P_2$ is large, and the radius of curvature of the part near the other is small), there will arise distortion in the texture if texture mapping is done using the texture coordinates determined by linear interpolation as described above. That is, if parameter t substituted in equation (1) for determining interpolated point $P_{12}$ assumes, among the values it may assume, for example its midpoint value 0.5, but because of the shape of interpolated line $B_{12}$ is biased, interpolated point $P_{12}$ is set in a position where its distance along interpolated line $B_{12}$ is very close to, say, vertex $P_1$ between vertex $P_1$ or $P_2$, then texture distortion will arise if texture mapping is done using the texture coordinates determined by linear interpolation.

In cases where such texture distortion is a problem, it suffices to do curvilinear integration along interpolated line $B_{12}$, determine the distance along interpolated line $B_{12}$ from vertex $P_1$ or $P_2$, respectively, to interpolated point $P_{12}$, and, according to this distance correct the ratio that is used when the texture coordinates at interpolated point $P_{12}$ are determined by linear interpolation. That is, it suffices to make a correction whereby the ratio that is used when the texture coordinates at interpolated point $P_{12}$ are determined by linear interpolation is made to approach (or set equal to) the ratio between the distance along interpolated line $B_{12}$ from vertex $P_1$ to interpolated point $P_{12}$ and the distance along interpolated line $B_{12}$ from vertex $P_2$ to interpolated point $P_{12}$.

Next, in many cases a smooth three-dimensional shape can be realized by doing fine splitting processing using the normal vectors at the vertices as the interpolation vectors, but depending on the three-dimensional shape to be realized, it is sometimes inadvisable to use only the normal vectors at the vertices as the interpolation vectors.

That is, there are for example cases where, with a circular cylinder or other body of revolution made by rotating a plane shape about an axis of rotation, or a similar three-dimensional shape, there is a large discrepancy between the direction of the orthogonal projection of the line segment that joins a given vertex a of a polygon that is part of the three-dimensional shape and another vertex b (where vertex b is a vertex that is adjacent to vertex a) onto the plane that is perpendicular to the normal vector at vertex a, and the tangent direction (hereafter called, for convenience, the frame line direction) at vertex a of the curve (hereafter called, for convenience, the frame line) that joins vertices a and b along the three-dimensional shape to be realized; in such a case, if fine splitting processing is done as described above, then the interpolated line that joins vertices a and b will, so to speak, be in a bent state, and if texture mapping is done, the texture will appear unnatural.

Figure 17B:
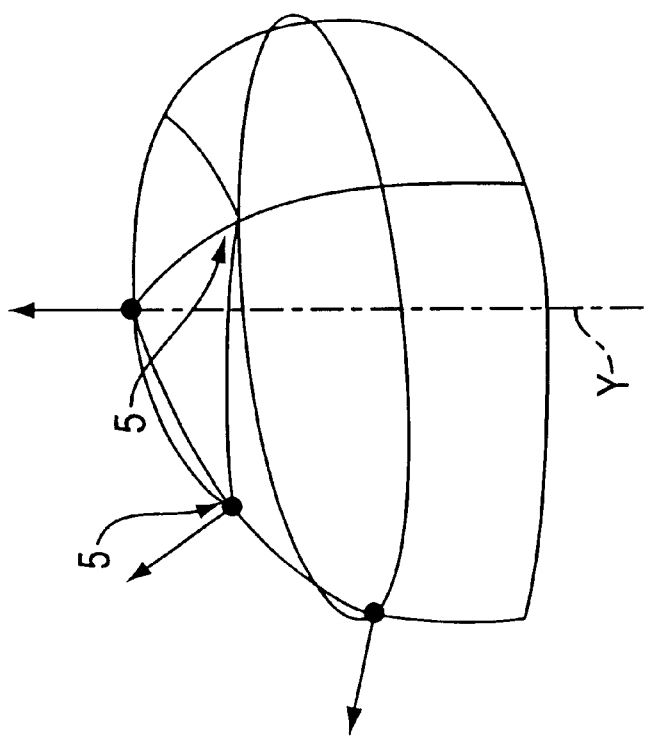
FIGS. 17(A) and 17(B) are diagrams for explaining the difficulties in fine splitting processing if only normal vectors at vertices are used as interpolation vectors.
Figure 17A:
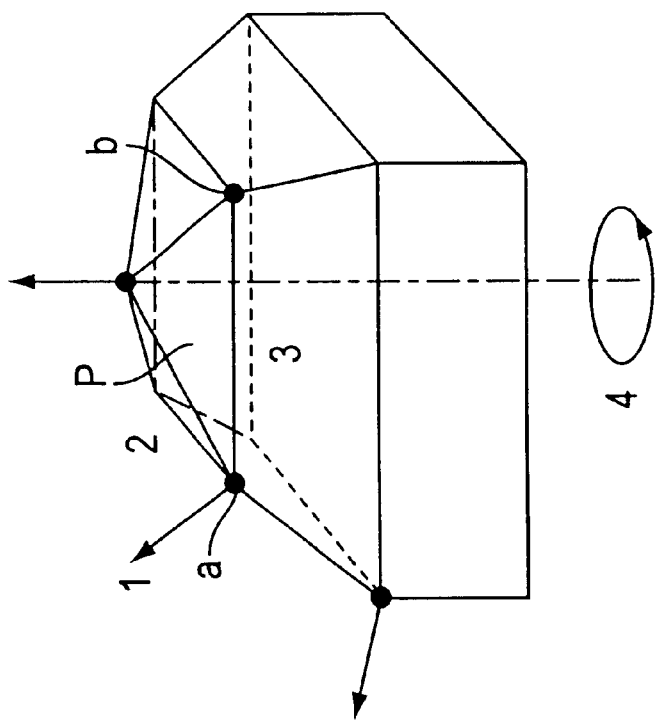

Specifically, consider a case in which a three-dimensional shape, as shown for example in FIG. 17(A), is composed of rough polygons, and the three-dimensional shape resulting from rotating this about axis of rotation Y is to be realized. Normal vector A at vertex a, which is the intersection point of sides 1 and 2 of polygon p that is part of the three-dimensional shape of FIG. 17(A), is a vector in an obliquely upward direction, which is a direction that is roughly perpendicular to polygon p. In this case, there is a large discrepancy between the frame line direction at vertex a and the direction of the orthogonal projection of line segment ab (side 1) that joins this vertex a and another vertex b of polygon p onto the plane that is perpendicular to the normal vector at vertex a. That is, in this case, because normal vector A is a vector in an obliquely upward direction, the direction of the orthogonal projection of line segment ab (side 1) onto the plane that is perpendicular to the normal vector has a tilt with respect to the plane that is perpendicular to axis of rotation Y. On the other hand, the frame line direction at vertex a is the tangent direction, at vertex a, of the circle that is the locus of vertex a if polygon p is rotated about axis of rotation Y, so it is parallel to the plane that is perpendicular to axis of rotation Y.

In this case, if fine splitting processing is done on polygon p, then the interpolated line that interpolates between vertices a and b will be bent as shown in FIG. 17(B), and it will be difficult to compose a smooth three-dimensional shape.

Also, if there is no need to perform fine splitting processing on the polygons and make the three-dimensional shape that is composed by the subpolygons thus obtained into a specified shape and the above-mentioned bending of the interpolated line causes no problems, then it suffices to use only the normal vectors at the vertices as interpolation vectors. But if the above-mentioned bending of the interpolated line causes problems or if it is necessary to make the three-dimensional shape composed by the subpolygons into a specified shape, then it may be impossible to realize the specified shape by using only the normal vectors at the vertices as the interpolation vectors.

Figure 18:
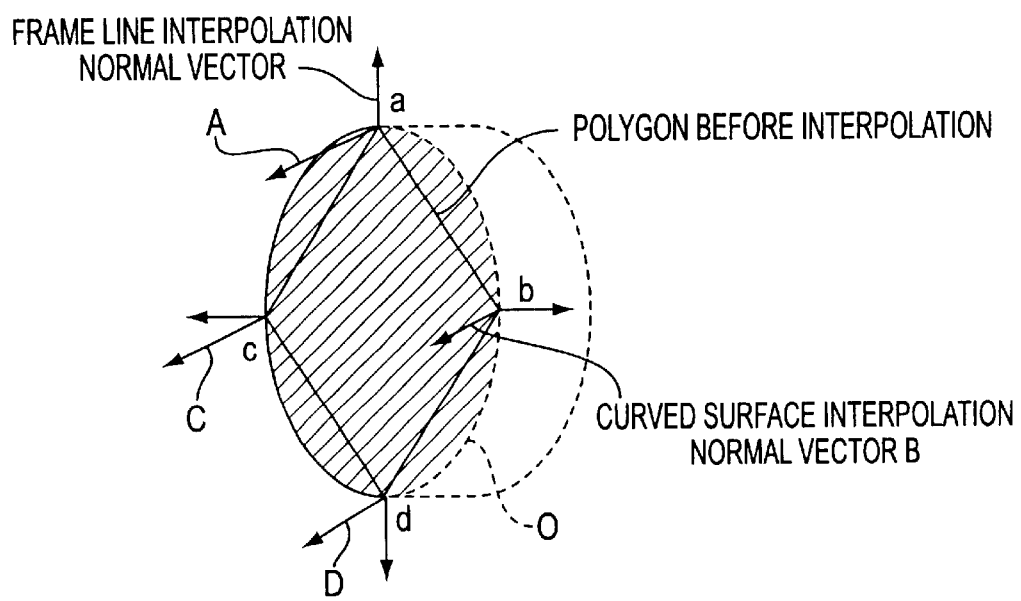
FIG. 18 is a diagram for explaining the difficulties in fine splitting processing if only normal vectors at vertices are used as interpolation vectors.

That is, if, for example, as shown in FIG. 18, fine splitting processing is to be done on quadrilateral polygon abdc, thereby composing circle O, which is the base of a circular cylinder as indicated by the dotted line in this diagram, then it will be necessary to split quadrilateral polygon abdc into subpolygons so as to compose circle O, which will be the base of the circular cylinder. But in this case, denoting normal vectors A through D at vertices a through d, respectively, vectors are given that are perpendicular to circle O that forms the base, so if fine splitting processing is done using such normal vectors A through D, quadrilateral polygon abdc will be split in a direction parallel to side ab (cd) or side ac (bd). That is, splitting will not be done on the subpolygons that are to compose circle O.

This is due to the same reason explained with FIG. 17. Namely, in FIG. 18, the direction of the orthogonal projection of the line segment that joins a vertex a with another vertex b onto the plane that is perpendicular to normal vector A at vertex a coincides with the direction of line segment ab. On the other hand, the curve along the three-dimensional shape to be realized that joins vertices a and b, that is, the frame line, is an arc ab that is part of circle O, and the tangent direction of this arc ab at vertex a, that is, the frame line direction, is the direction of the tangent of circle O at vertex a. Therefore the direction of the orthogonal projection of line segment ab onto the plane that is perpendicular to normal vector A at vertex a of quadrilateral polygon abdc that composes the circular cylinder differs greatly from the frame line direction at vertex a, so quadrilateral polygon abdc is not split into subpolygons so as to compose circle O. That is, with fine splitting processing, the interpolated line that interpolates between vertices a and b is formed in such a way that it touches the orthogonal projection of line segment ab onto the plane that is perpendicular to normal vector A at vertex a and touches the orthogonal projection of line segment ab onto the plane that is perpendicular to normal vector B at vertex b, while the frame line, which is the curve that joins vertices a and b along the circular cylinder to be realized, is arc ab, so the interpolated line and the frame line are different, and quadrilateral polygon abdc is not split into subpolygons so as to compose circle O (the circumference of the circle), which is the frame line (one only does splitting so that sides ab, cd, ac, bd are each taken without modification as an interpolated line).

As interpolation vectors at a given vertex not only the normal vector at that vertex has been adopted but also a vector (the interpolated line direction vector) that expresses the direction (the frame line direction) of the frame line that passes through that vector. If fine splitting processing is done using the vector that expresses the frame line direction as an interpolation vector, the interpolated line is formed in such a way that it coincides with the frame line (because this is something that constitutes an interpolated line such that the vector that expresses the frame line direction coincides with the frame line if it is used in the fine splitting processing), and the polygons are split into subpolygons to compose the three-dimensional shape to be realized.

As vectors that express the frame line direction at a vertex, there are, for example, the tangent vector at the vertex (corresponding to the slope of a curve in a two-dimensional plane) and the normal vector of the frame line at the vertex (the definition of the normal vector of a frame line is discussed below), but here we adopt the normal vector of the frame line.

If fine splitting processing is done using the normal vectors (the normal-direction vectors of the three-dimensional shape to be realized) at the vertices that are given for shading, the normal vector faces the normal direction of the curved surface that is the three-dimensional shape to be realized, so the polygons are split into subpolygons so as to compose the curved surface that is the three-dimensional shape to be realized. That is, if fine splitting processing is done using as interpolation vectors the normal vectors at the vertices that are given for shading, splitting into subpolygons is done so as, so to speak, to interpolate the curved surface that is the three-dimensional shape to be realized. Thus in the following, for convenience, these normal vectors are referred to as curved surface interpolation normal vectors.

On the other hand, if fine splitting processing of polygons is done using the normal vectors of the frame lines, then the sides that make up a polygon are split into subpolygons that have sides that, so to speak, interpolate the frame lines, that is, the curves (curves included in curved surfaces) that constitute the curved surface that is the three-dimensional shape to be realized. In following, for convenience, these normal vectors are referred to as frame line interpolation normal vectors.

If for example the circular cylinder indicated by the dotted line in FIG. 18 is composed with subpolygons obtained by fine splitting processing, the curved surface interpolation normal vectors at vertices a through d of quadrilateral polygon abdc are normal vectors A through D, respectively, and the frame line interpolation normal vectors at vertices a through d are unit vectors in the direction of straight lines extending from the center of circle O toward vertices a through d.

If not just curve interpolation normal vectors but also frame line interpolation normal vectors are adopted as interpolation vectors, then frame line interpolation normal vectors are used when determining interpolated points (for example, interpolated points $P_{12}$, $P_{23}$, $P_{24}$ in FIG. 15) that interpolate between adjacent vertices in the original polygon that is the object of fine splitting processing, and curved surface interpolation normal vectors are used when determining, so to speak, internal interpolated points in the original polygon (for example, interpolated point $P_{1234}$ in FIG. 15).

If such fine splitting processing is done on, for example, quadrilateral polygon abdc in FIG. 18, then frame line interpolation normal vectors are used as interpolation vectors for each of the intervals between vertices a and b, between vertices b and d, between vertices d and c, and between vertices c and a, and interpolated points are determined as described above. As a result, interpolated points are formed on arcs ab, bd, dc, and ca. In the interior of quadrilateral polygon abdc, curved surface interpolation normal vectors are used as interpolation vectors, and interpolated points are determined as described above. As a result, interpolated points are formed in the plane that includes circle O. As a result, quadrilateral polygon abdc is split into subpolygons so as to constitute circle O.

Figure 19A:
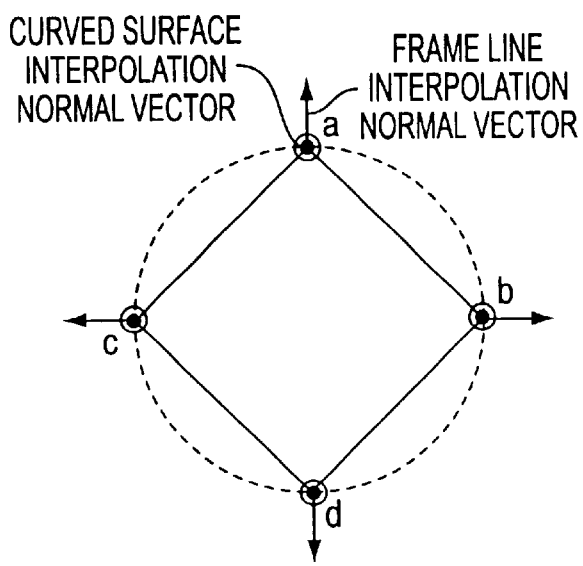
FIGS. 19(A)–19(D) are diagrams for explaining fine splitting processing if both curved surface interpolation normal vectors and frame line interpolation normal vectors are adopted as interpolation vectors.
Figure 19B:
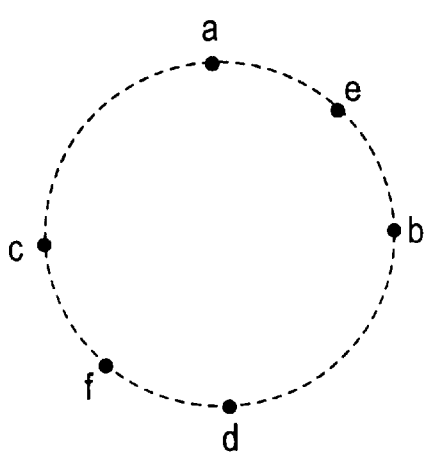
Figure 19C:
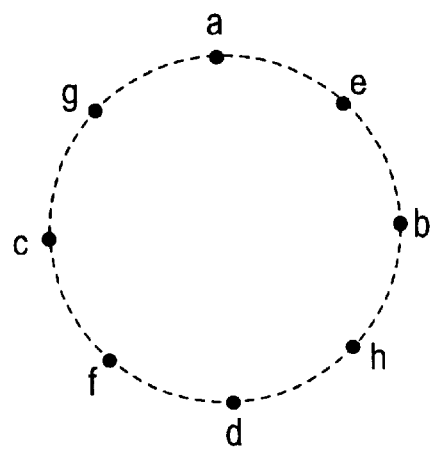

That is, if for example fine splitting processing is done so as to generate four subpolygons by splitting quadrilateral polygon abdc into two parts in each of the directions of sides ab (cd) and ac (bd), then when, as shown in FIG. 19(A), each of vertices a through d is given a frame line interpolation normal vector in the direction from the center of circle O toward vertex a through d, respectively, and each is given a curved surface interpolation normal vector in a direction perpendicular to circle O (in FIG. 19(A), in the direction flying out perpendicularly from the surface of the diagram), then first, for the interval between vertices a and b or the interval between vertices c and d, the frame line interpolation vectors are used as interpolation vectors, and arc ab or cd, respectively, is determined as the interpolated line, and interpolated point e or f is set on the respective interpolated line, as shown in FIG. 19(B). Likewise for the interval between vertices a and c or the interval between vertices b and d, the frame line interpolation vectors are used as interpolation vectors, and arc ac or bd, respectively, is determined as the interpolated line, and interpolated point g or h is set on the respective interpolated line, as shown in FIG. 19(C).

Figure 19D:
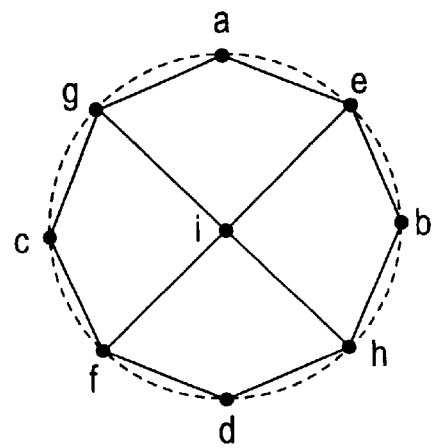

Also, for example for the interval between interpolated points e and f (or the interval between interpolated points g and h), line segment ef is determined as an interpolated line using curve interpolation normal vectors as interpolation vectors, and interpolated point i is set on this interpolated line as shown in FIG. 19(D). As a result, as shown in FIG. 19(D), quadrilateral polygon abdc is split into quadrilateral polygons aeig, ebhi, hdfi, fcgi as four subpolygons to comprise circle O.

By the above-described fine splitting processing, a polygon is split into detailed (fine) polygons so as to give a smooth three-dimensional shape, so even if detailed data about the three-dimensional shape to be realized is not given by data provision device 1, a delicate three-dimensional shape can be composed and presented to the user just by giving rough data concerning the shape. Also, on the side of user terminal 4, a delicate three-dimensional shape can be reproduced from sparse data.

Next, the processing of data provision device 1 of FIG. 2 will be described.

When input unit 11 is operated by the producer so as to compose a three-dimensional shape, splitting polygon data generation processing that generates the splitting polygon data used for fine splitting processing is performed by data provision device 1.

Figure 20:
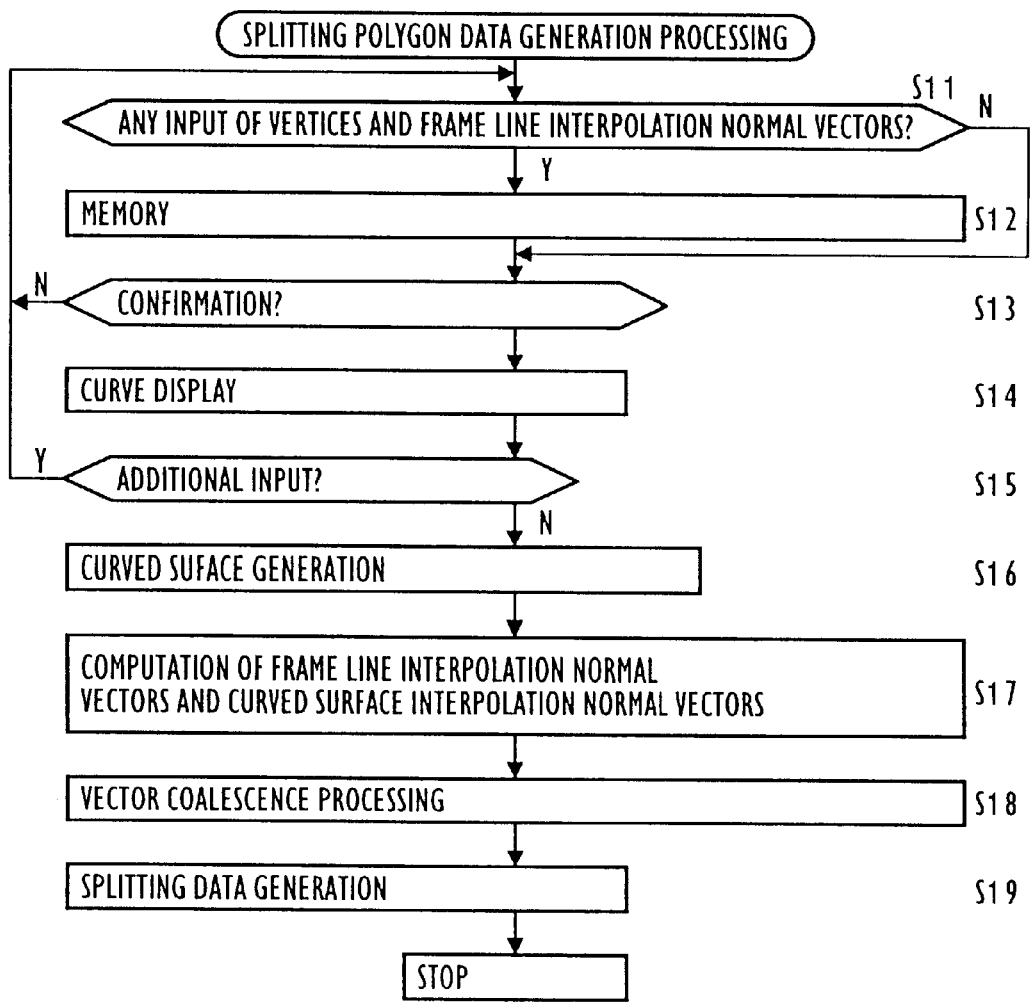
FIG. 20 is a flowchart for explaining splitting polygon data generation processing.

Referring to the flowchart in FIG. 20, we describe the splitting polygon data generation processing.

In splitting polygon data generation processing, first, in step S11, data processing unit 12 decides whether the coordinates (coordinates in three-dimensional space) of the vertices of the polygons that comprise the three-dimensional shape and the normal vectors of the frame lines at the vertices (as stated below, these will be used as the frame line interpolation vectors) have been input from input unit 11.

In step S11, if it is decided that the coordinates of the vertices and the normal vectors of the frame lines at the vertices have not been input, one skips step S12 and proceeds to step S13.

If in step S11 it is decided that the coordinates of the vertices and the normal vectors of the frame lines at the vertices have been input, that is, if the coordinates of the vertices and the normal vectors of the frame lines at the vertices have been input by the producer operating input unit 11, then one proceeds to step S12, the coordinates of the vertices and the normal vectors of the frame lines at the vertices that have been input are temporarily stored in memory 12A, and one proceeds to step S13.

In step S13, data processing unit 12 decides whether input unit 11 has been operated so as to confirm the stored content of memory 12A as splitting polygon data (hereafter called, for convenience, confirmation operation). If in step S13 it is decided that confirmation operation has not been done by input unit 11, one returns to step S11 and thereafter repeats the same processing If in step S13 it is decided that confirmation operation has been done by input unit 11, one proceeds to S14, and data processing unit 12 reads the stored content of memory 12A and supplies it to, and stores it in, splitting database 13. Also, data processing unit 12 for example goes through the vertices in the order in which they were input and determines, based on the stored content of memory 12A, third-order Bezier curves in which the angle formed with the normal vector of the frame line at each vertex is 90 degrees, and supplies this, via splitting database 13, splitting processing unit 14, and rendering unit 15, to display unit 16 and causes it to be displayed.

Figure 21:
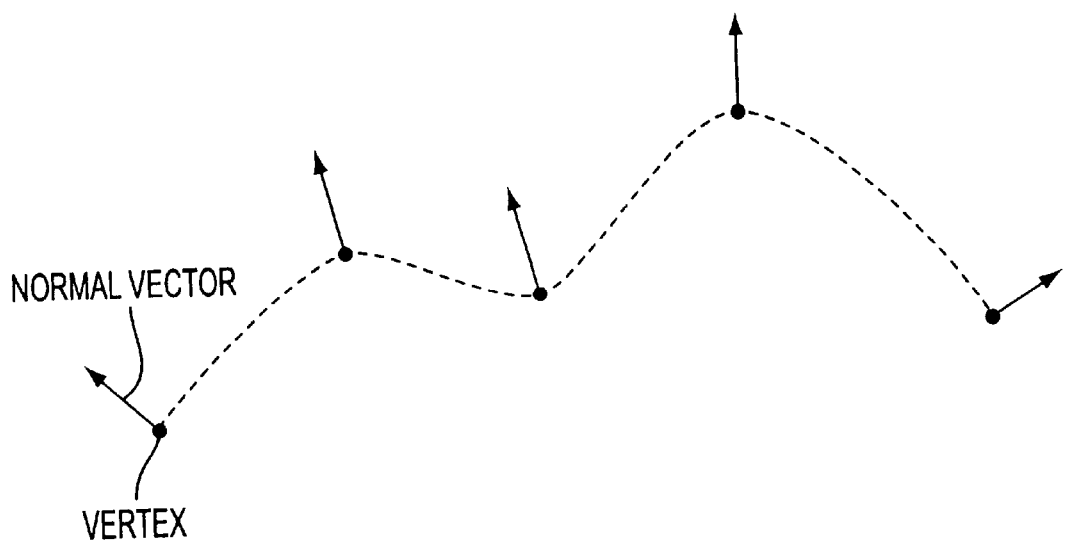
FIG. 21 is a diagram for explaining the processing of step S14 in FIG. 20.

In this way, as shown in FIG. 21, Bezier curves (indicated in the diagram by the dotted line) as the frame lines that constitute the three-dimensional shape arc displayed on display unit 16.

Thereafter, one proceeds to step S15, where data processing unit 12 decides whether input unit 11 has been operated so as to add any input of coordinates of the vertices and normal vectors of the frame lines at the vertices (hereafter called, for convenience, additional operation). If in step S15 it is decided that additional operation has been done by input unit 11, the stored content of memory 12A is cleared, one returns to step S11, and thereafter, by repeating the processing of steps S11 through S15, Bezier curves as the frame lines that constitute the three-dimensional shape arc drawn one after another.

Figure 22A:
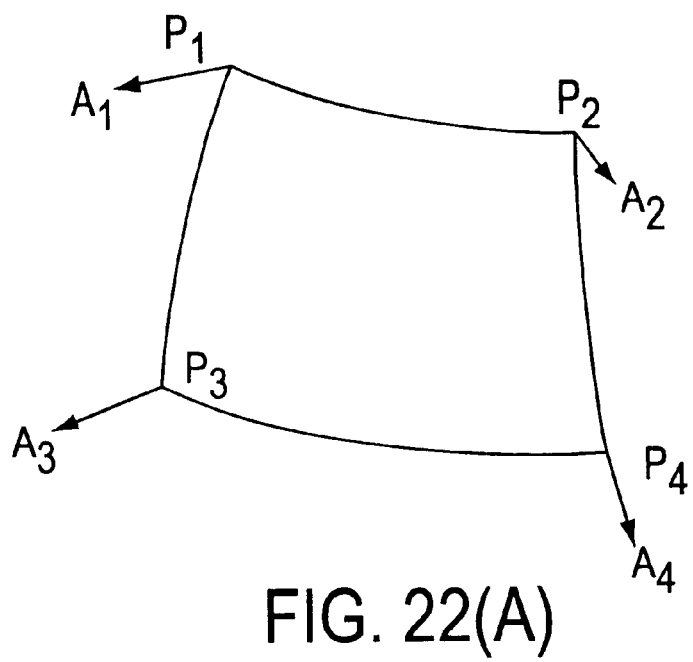
FIGS. 22(A) and 22(B) are diagrams that show how Bezier curves as frame lines that constitute a three-dimensional shape are drawn in sequence.

That is, for example, as shown in FIG. 22(A), the producer inputs the coordinates of vertex $P_1$ and normal vector (frame line interpolation normal vector) $A_1$ of the frame line at this vertex $P_1$, as well as the coordinates of vertex $P_2$ and normal vector $A_2$ of the frame line at this vertex $P_2$, and if confirmation operation is done by input unit 11, data processing unit 12 determines Bezier curve $P_1P_2$ as a frame line that comprises the three-dimensional shape, and causes display unit 16 to display it. Also, the producer does additional operation on input unit 11 and, for example, as shown in FIG. 22(A), inputs the coordinates of vertex $P_3$ and normal vector $A_3$ of the frame line at this vertex $P_3$, as well as the coordinates of vertex $P_4$ and normal vector $A_4$ of the frame line at this vertex $P_4$, and if confirmation operation is done on input unit 11, data processing unit 12 determines Bezier curve $P_3P_4$ as a frame line that comprises the three-dimensional shape, and causes display unit 16 to display it.

Figure 22B:
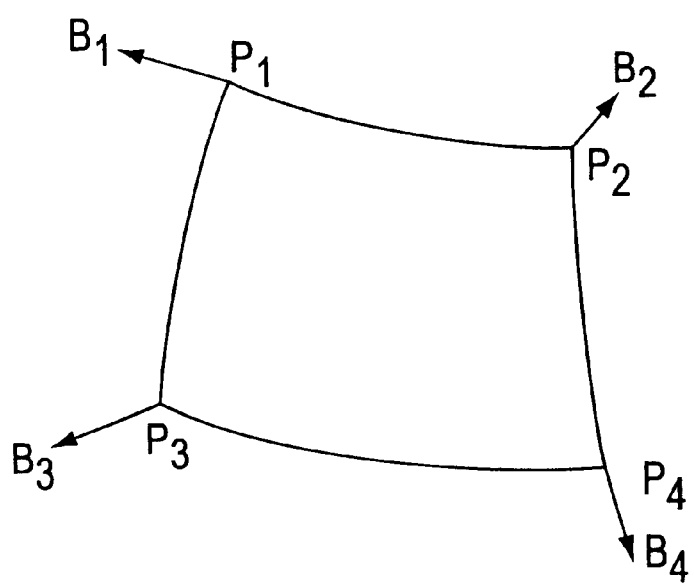

Thereafter, the producer does additional operation on input unit 11, and, for example, as shown in FIG. 22(B), inputs the coordinates of vertex $P_1$ and normal vector (frame line interpolation normal vector) $B_1$ of the frame line at this vertex $P_1$, as well as the coordinates of vertex $P_3$ and normal vector $B_3$ of the frame line at this vertex $P_3$, and if confirmation operation is done by input unit 11, data processing unit 12 determines Bezier curve $P_1P_3$ as a frame line that comprises the three-dimensional shape, and causes display unit 16 to display it. Also, the producer does additional operation on input unit 11 and, for example, as shown in FIG. 22(B), inputs the coordinates of vertex $P_2$ and normal vector $B_2$ of the frame line at this vertex $P_2$, as well as the coordinates of vertex $P_4$ and normal vector $B_4$ of the frame line at this vertex $P_4$, and if confirmation operation is done on input unit 11, data processing unit 12 determines Bezier curve $P_2P_4$ as a frame line that comprises the three-dimensional shape, and causes display unit 16 to display it.

Here, in FIGS. 22(A)–22(B) there are shown for example two vectors $A_1$ and $B_1$ as normal vectors of the frame line of vertex $P_1$. However, vector $A_1$ or $B_1$ is perpendicular to curve $P_1P_2$ or $P_1P_3$, respectively. Similarly, vector $A_2$ or $B_2$ is perpendicular to curve $P_1P_2$ or $P_2P_4$, vector $A_3$ or $B_3$ is perpendicular to curve $P_1P_3$ or $P_3P_4$, and vector $A_4$ or $B_4$ is perpendicular to curve $P_3P_4$ or $P_3P_4$, respectively.

Also, given two vertices $P_1$ and $P_2$ and normal vector $A_1$ or $A_2$ of the frame line at such vertex $P_1$ or $P_2$, data processing unit 12 goes through these two vertices $P_1$ and $P_2$ and determines third-order Bezier curves, as frame lines comprising the three-dimensional shape, in which the angle formed with normal vector $A_1$ or $A_2$, respectively, is 90 degrees; this is determined, for example, in the following way.

Figure 23:
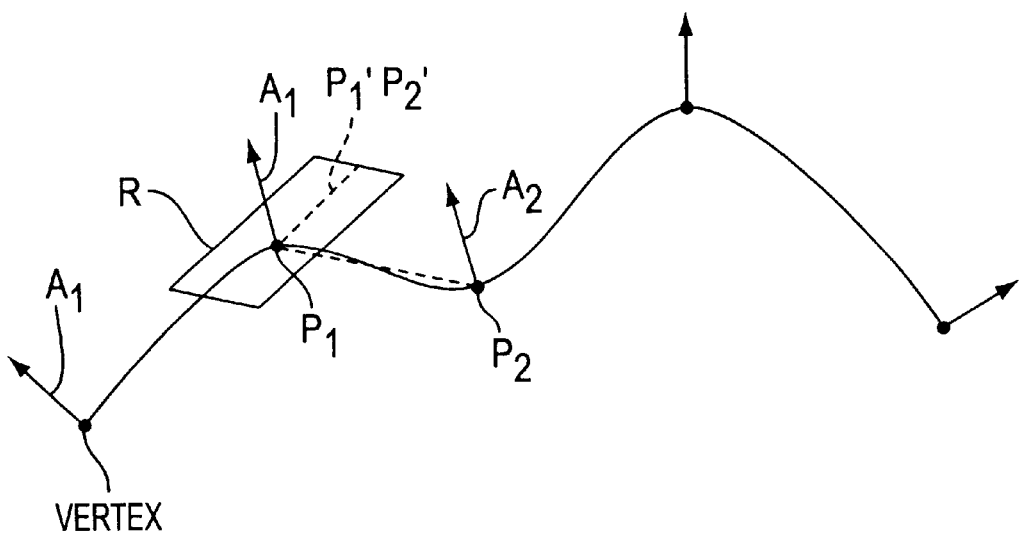
FIG. 23 is a diagram for explaining frame line interpolation normal vectors (normal vectors of frame lines)

Namely, as shown in FIG. 23, data processing unit 12 determines line segment $P_1'P_2'$, which is the projection (orthogonal projection) of line segment $P_1P_2$ onto plane R, which includes vertex $P_1$ and is perpendicular to normal vector $A_1$. In the same way, data processing unit 12 determines line segment $P_1''P_2''$ (not shown), which is the projection of line segment $P_1P_2$ onto the plane that includes vertex $P_2$ and is perpendicular to normal vector $A_2$. With the data processing unit 12, control points $Q_1$ and $Q_2$ are determined, as explained in FIG. 9, from the coordinates of vertices $P_1$ and $P_2$ and from the angle formed by line segment $P_1P_2$ and line segment $P_1'P_2'$ and the angle formed by line segment $P_1P_2$ and line segment $P_1''P_2''$, and the third-order Bezier curve specified by these control points $Q_1$ and $Q_2$ as well as control point $P_1$ and $P_2$ is determined as a frame line that composes the three-dimensional shape.

The Bezier curve as the frame line that is thus determined coincides with the interpolated line that is obtained if fine splitting processing is done by taking as interpolation vectors the normal vector of the frame line at vertex $P_1$ and the normal vector of the frame line at vertex $P_2$.

Figure 24:
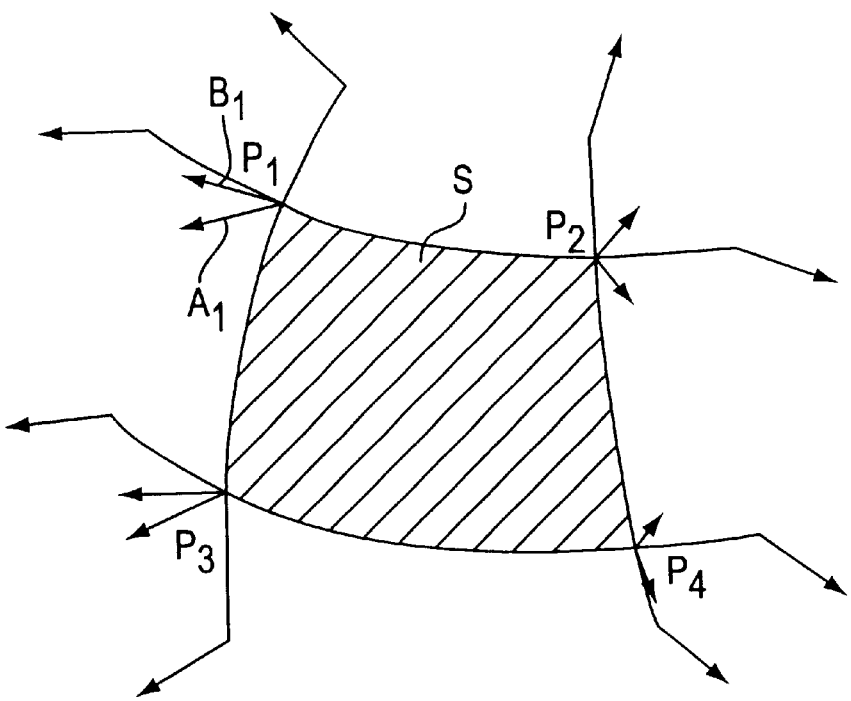
FIG. 24 is a diagram for explaining the processing of step S16 in FIG. 20.

Returning to FIG. 20, in step S15, if it is decided that input unit 11 was operated not with additional operation but so as to end the input of the coordinates of vertices and the normal vectors of the frame lines at the vertices, one proceeds to step S16, and with data processing unit 12 the curved surface formed by the frame lines determined thus far (the curved surface that constitutes the three-dimensional shape) is determined. That is, if, for example, frame lines $P_1P_2$, $P_3P_4$, $P_1P_3$, $P_2P_4$ are determined as described in FIG. 22, then in step S16 curved surface S is determined, which is surrounded by frame lines $P_1P_2$, $P_3P_4$, $P_1P_3$, $P_2P_4$ as shown in FIG. 24.

Then one proceeds to step S17, and data processing unit 12 computes the frame line interpolation normal vector and curved surface interpolation normal vector for each vertex stored in splitting database 13. That is, data processing unit 12 takes the normal vector of the frame line at each vertex stored in splitting database 13, as is, as the frame line interpolation vector for each respective vector. Therefore the frame line interpolation normal vector at a given vertex (as well as the normal vector of the frame line at the vertex), from what was explained in FIG. 23, becomes the normal-direction vector in the specified plane in the case where the Bezier curve as a frame line (the Bezier curve determined as explained in FIG. 23) is touched by the line that is the projection of the line segment that joins the vertex and another vertex onto a specified plane that includes the vertex.

Also, in step S17, data processing unit 12 determines the normal vectors of the curved surface determined in step S16 at each vertex stored in splitting database 13, sets them to the curved surface interpolation normal vectors at the corresponding vertices, and supplies them to, and stores them in, splitting database 13. The curved surface interpolation normal vectors coincide with the normal vectors used in the case when shading of the polygons is done.

Figure 25A:
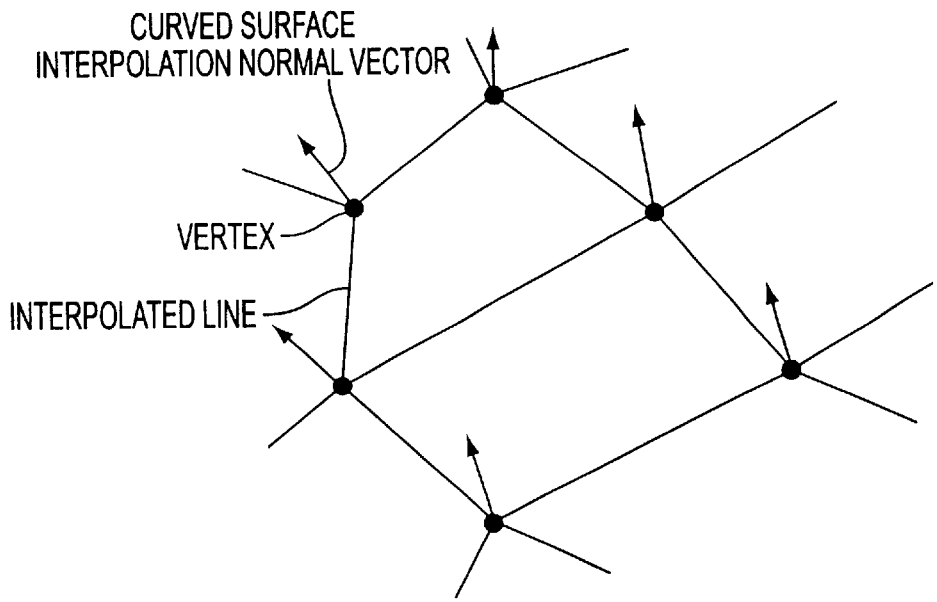
FIGS. 25(A) and 25(B) are diagrams that show interpolated lines obtained using frame line interpolation normal vectors and interpolated lines obtained using curved surface interpolation normal vectors.
Figure 25B:
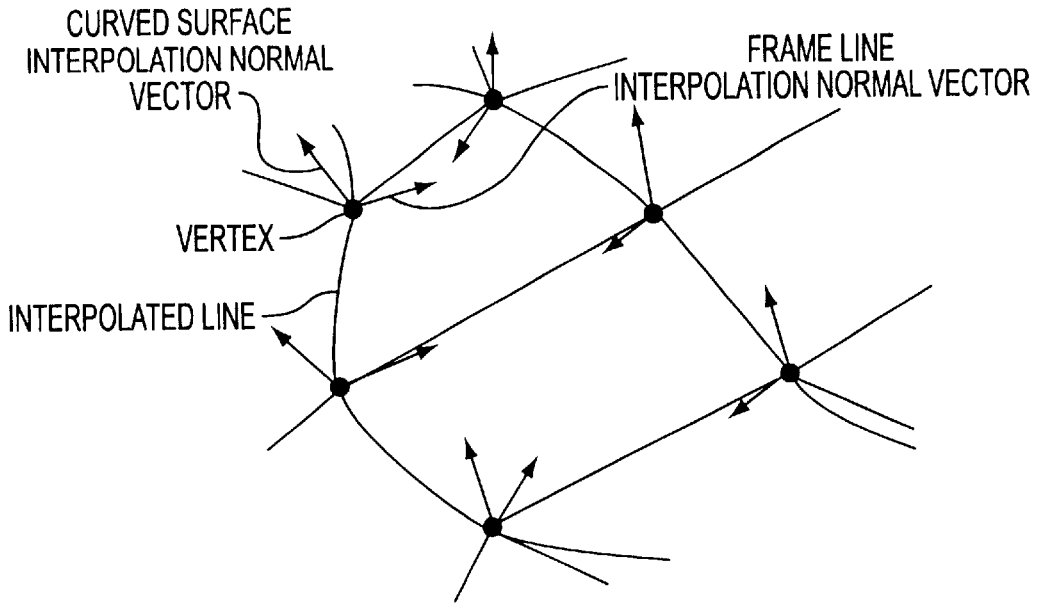

Here, if in fine splitting processing the interpolated lines between vertices are determined using only the curved surface interpolation normal vectors among the frame line interpolation normal vectors and curved surface interpolation normal vectors, then, for example, as shown in FIG. 25(A), the interpolated line will sometimes not coincide with the curved surface (frame line) determined in step S14 and will be bent. On the other hand, if the interpolated lines between vertices are determined using the frame line interpolation normal vectors, then, for example, as shown in FIG. 25(B), a smooth interpolated line will be obtained that coincides with the curved surface (frame line) determined in step S14.

In step S17, when data processing unit 12 determines the frame line interpolation normal vectors and curved surface interpolation normal vectors, one proceeds to step S18, and vector coalescence processing is done.

That is, if there is a large discrepancy between the direction of the orthogonal projection of the line segment that joins one vertex with another vertex adjacent to it onto the plane that passes through the one vertex and is perpendicular to the curved surface interpolation normal vector, and the direction of the tangent at the one vertex of the curved surface (frame line) along the three-dimensional shape to be realized (the frame line direction), then, as stated above, the interpolated line will be bent, and the size of this discrepancy is reflected in the difference between the frame line interpolation normal vector and the curved surface interpolation normal vector.

On the other hand, the size of the aforesaid discrepancy is often zero (including cases in which it is almost zero) (where the size of the discrepancy is large is, for example, a case in which, as stated above, a circular cylinder or other body of revolution made by rotating a plane shape about an axis of rotation, or a similar three-dimensional shape, is to be realized); in this case, the frame line interpolation normal vector and the curved surface interpolation normal vector coincide (roughly coincide). It is redundant to separate the frame line interpolation normal vector and the curved surface interpolation normal vector that thus coincide and separately make them into splitting polygon data.

In order to reduce the volume of data in the splitting polygon data, in step S18 the frame line interpolation normal vector and the curved surface interpolation normal vector at the same vertex are compared, and if they coincide (roughly coincide), then vector coalescence processing is done, in which the frame line interpolation normal vector and the curved surface interpolation normal vector are combined into a single vector. Here, if the frame line interpolation normal vector and the curved surface interpolation normal vector coincide completely, then in step S18, for example, one or the other vector is selected, and this is made the result of the vector coalescence processing. And if the frame line interpolation normal vector and the curved surface interpolation normal vector coincide roughly, then in step S18, for example, their average value is determined, and this is made the result of the vector coalescence processing. The result of the vector coalescence processing is written in instead of the frame line interpolation normal vector and the curved surface interpolation normal vector that are stored in splitting database 13 and arc the object of this vector coalescence processing. If the frame line interpolation normal vector and the curved surface interpolation normal vector at the same vector do not coincide, they are kept in the state in which they are stored in splitting database 13.

Once data processing unit 12, in step S18, performs vector coalescence processing on all the vertices stored in splitting database 13, one proceeds to S19, in which the splitting polygon data is composed based on the content stored in splitting database 13, and splitting polygon data generation processing is terminated.

FIG. 26 shows the format of the splitting polygon data composed in step S19.

Splitting polygon data consists of, for example, I reference data items #1 through #I, followed by I polygon data items #1 through #I arranged in sequence, as shown in FIG. 26(A).

Here, polygon data item #i (i=1, 2, . . . , I) is generated, for example in the splitting polygon data generation processing of FIG. 20, every time a curved surface such as that shown in FIG. 24 is made, for the quadrilateral polygons $P_1P_2P_4P_3$ that make up this curved surface S. Therefore FIG. 26(A) shows the splitting polygon data for the case in which a three-dimensional shape consists of I polygons.

As shown in FIG. 26(B), polygon data item #i consists of the coordinates $(px_1,py_1,pz_1)$, $px_2,py_2,pz_2)$, $(px_3,py_3,pz_3)$, . . . of the vertices that constitute its polygon #i, the normal vectors $(nx_1,ny_1,nz_1)$, $(nx_2,ny_2,nz_2)$, $(nx_3,ny_3,nz_3)$ that are frame line interpolation normal vectors or curved surface interpolation normal vectors at each vertex, and other data. Attached to the vertex coordinates and normal vectors arranged in polygon data item #i are indexes for specifying them. And in the embodiment of FIG. 26(B), sequential numbers are actually attached to the vertex coordinates and normal vectors as indexes, but for the indexes it is also possible to allocate sequential numbers to the vertex coordinates and normal vectors in the sequence in which they are arranged, without writing the index into polygon data item #i.

Reference data item #i, which is data that is used when polygon data item #i is referenced, consists for example of the number of vertices as the number of vertices that constitute polygon #i and reference data on each vertex, as shown in FIG. 26(C). Therefore if polygon #i has J vertices, J reference data items concerning vertices will be laid out. As shown in FIG. 26(D), reference data on vertex #j (j=1, 2, . . . , J) consists of the index of the coordinates of vertex #j, the indexes of frame line interpolation normal vectors A and B at the vertex, and the index of the curved surface interpolation normal vector at the vertex, arranged sequentially.

If, for example, 1 is laid out as the index of the coordinates of vertex #j, then the coordinates $(px_1,py_1,pz_1)$ to which index "1" is assigned in polygon data item #i, which corresponds to reference data item #i, will be the coordinates of vertex #j.

For example if, say, 1 is laid out as the index of frame line interpolation normal vector A, then the normal vector $(nx_1, ny_1,nz_1)$ to which index "1" is assigned in polygon data item #i, which corresponds to reference data item #i, will be frame line interpolation normal vector A at vertex #j.

And for example if, say, 2 is laid out as the index of frame line interpolation normal vector B, then the normal vector $(nx_2,ny_2,nz_2)$ to which index "2" is assigned in polygon data item #i, which corresponds to reference data item #i, will be frame line interpolation normal vector B at vertex #j.

And for example if, say, 3 is laid out as the index of the curved surface interpolation normal vector, then the normal vector $(nx_3,ny_3,nz_3)$ to which index "3" is assigned in polygon data item #i, which corresponds to reference data item #i, will be the curved surface interpolation normal vector at vertex #J.

The reason why there arc two frame line interpolation normal vectors, vectors A and B, at one vertex #j, is as follows. For example at each vertex $P_1$ through $P_4$ of quadrilateral polygon $P_1P_2P_4P_3$ that comprises curved surface S shown in FIG. 24, which are generated in the aforementioned splitting polygon data generation processing, two curves (frame lines) of different direction intersect, but the normal vectors for these two curves are given as curved surface interpolation normal vectors.

In the foregoing case, frame line interpolation normal vectors A, B and the curved surface interpolation normal vector are each given a different index, but in a case where in step S18 in FIG. 20 frame line interpolation normal vectors A, B and the curved surface interpolation normal vector coincide and are coalesced into a single vector, each of the frame line interpolation normal vectors A, B and the curved surface interpolation normal vector is given an index allocated to their single coalesced vector. That is, if for example frame line interpolation normal vectors A, B and the curved surface interpolation normal vector are each represented by $(nx_1, ny_1, nz_1)$, then the index of each of the frame line interpolation normal vectors A, B and of the curved surface interpolation normal vector is set to 1, which is the index allocated to normal vector $(nx_1, ny_1, nz_1)$ (in this case, normal vector $(nx_1, ny_1, nz_1)$ is the result of vector coalescence processing (in step S18 in FIG. 20) on frame line interpolation normal vectors A, B and on the curved surface interpolation normal vector). Also, in this case, only vector $(nx_1, ny_1, nz_1)$ is mapped to polygon data item #i as a normal vector.

In the splitting polygon data generation processing in FIG. 20, the producer causes the coordinates of the vertices and the normal vectors of the frame line at the vertices to be input, and then the three-dimensional shape is defined by determining the curves that will be the frame lines and causing the curves to intersect, but a three-dimensional shape can also be composed in the following way.

First, one takes actual measurements for the three-dimensional shape to be realized, determines the coordinates of each vertex in three-dimensional space and the normal vectors of the three-dimensional shape at each vertex, that is, determines the curved surface interpolation normal vectors, and has these input into data processing unit 12 by the producer. Data processing unit 12 is made to determine and display the curves that will be the frame lines, taking the curved interpolation normal vectors to be the frame line interpolation normal vectors A, B for each of the two frame lines that intersect at a given vertex. Then, for the displayed frame lines that are bent (distorted), one has the producer correct frame line interpolation normal vectors A, B that are equal to the curve interpolation normal vector in such a way that the frame lines become smooth. In this case, one may dispense with the processing of steps S17 and S18 in FIG. 20.

Next, splitting polygon data generation processing (FIG. 20) is done by data provision device 1, and when splitting polygon data as shown in FIG. 26 has been stored in splitting database 13, the splitting polygon data is read from splitting database 13 in splitting processing unit 14, and fine splitting processing is done.

Figure 27:
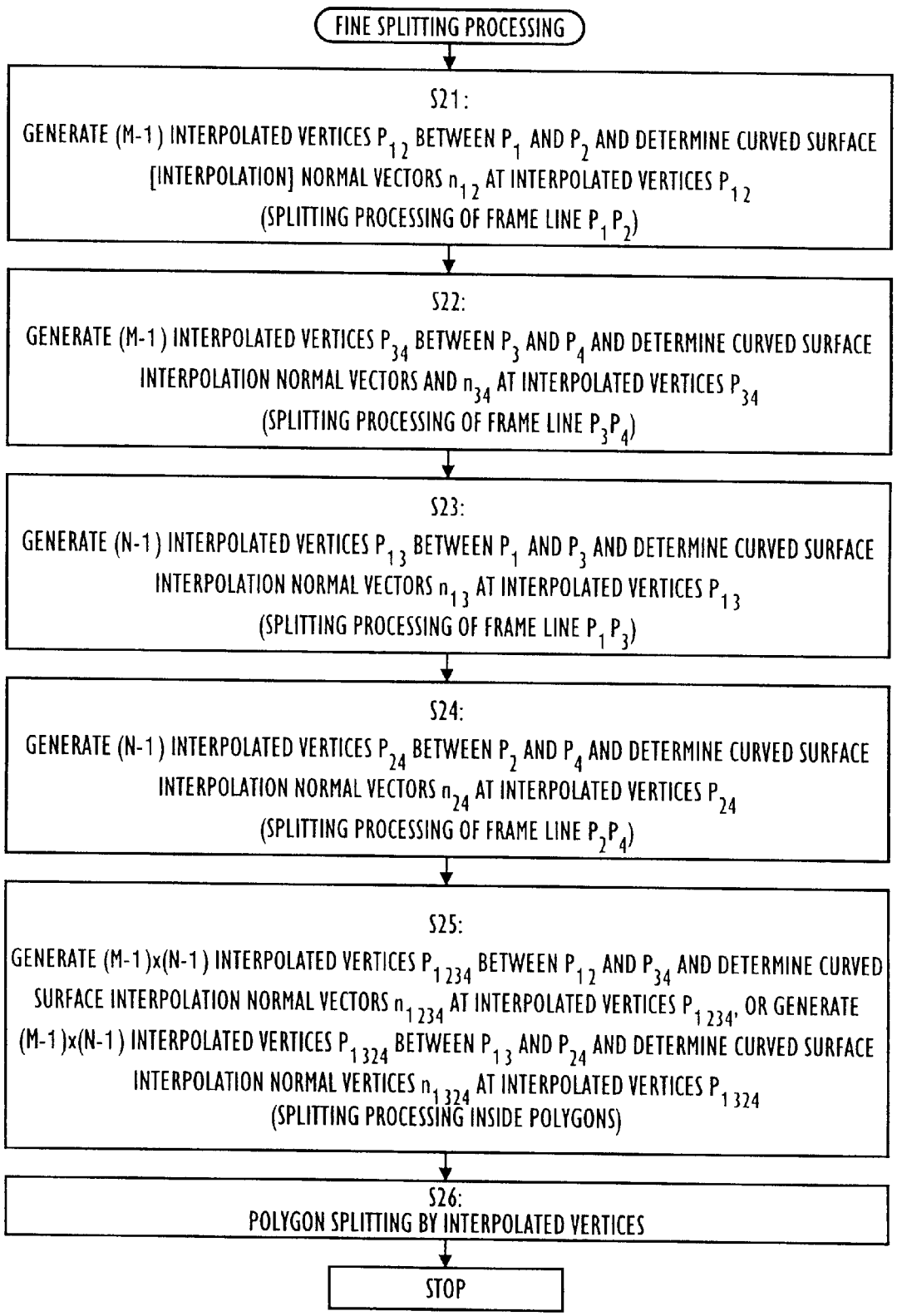
FIG. 27 is a flowchart for explaining fine splitting processing.

Referring to the flowchart in FIG. 27, we describe the fine splitting processing performed on polygons in splitting processing unit 14.

Figure 28:
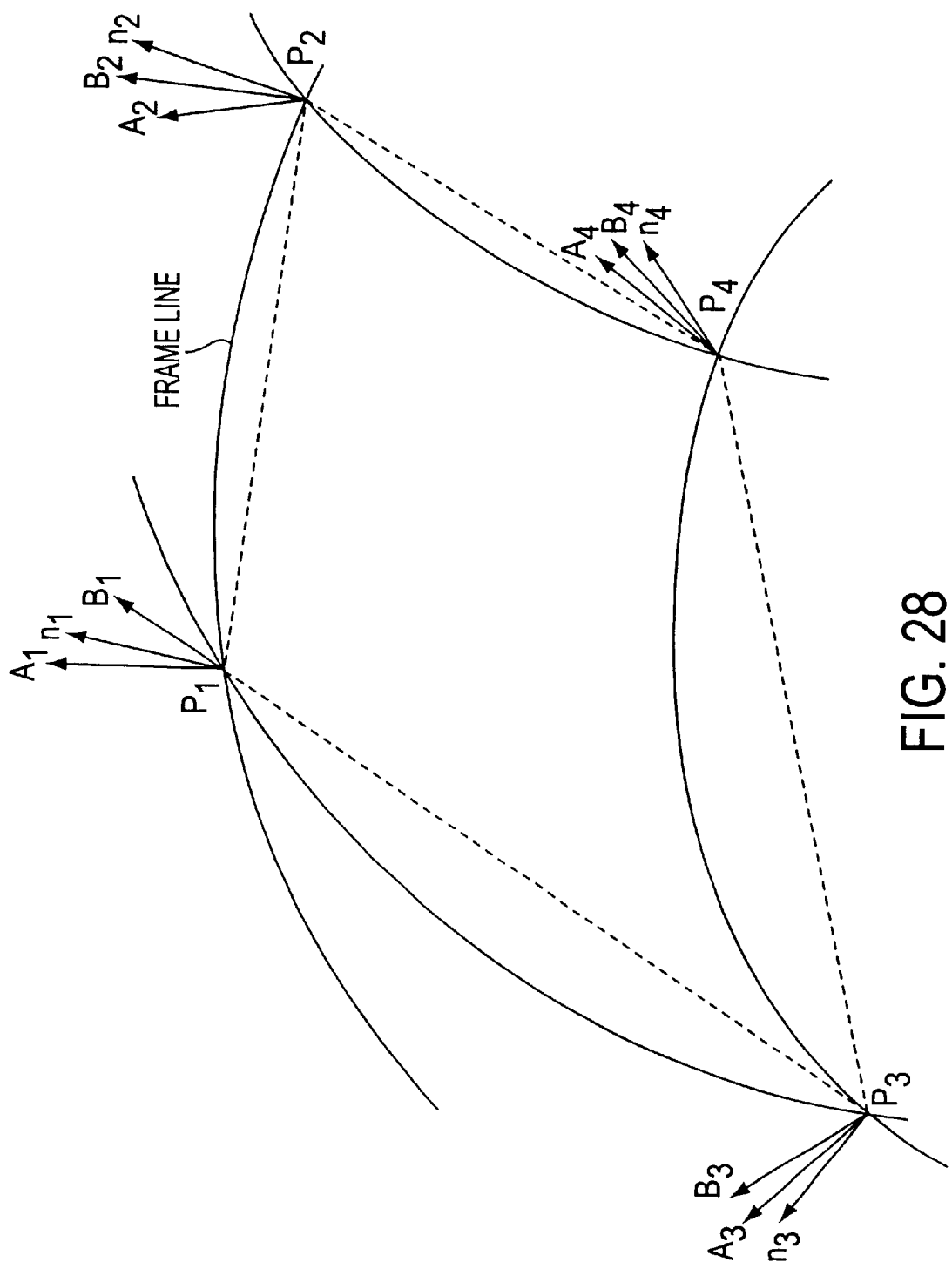
FIG. 28 is a diagram for explaining fine splitting processing.

Here, for example a quadrilateral polygon $P_1P_2P_4P_3$ as shown in FIG. 28 is split into M or N parts horizontally or vertically, respectively, thereby making something that is composed of M×N quadrilateral subpolygons (here, for example, the direction of line segment $P_1P_2$ (or $P_3P_4$) of quadrilateral polygon $P_1P_2P_4P_3$ in FIG. 28 is taken as the horizontal direction, and the direction of line segment $P_1P_3$ (or $P_2P_4$) is taken as the vertical direction).

The curved surface interpolation vector at vertex Pi (i=1, 2, 3, 4) of quadrilateral polygon $P_1P_2P_4P_3$ is denoted by $n_i$, the line frame interpolation normal vector for the horizontal frame line at vertex $P_i$ is denoted by $A_i$, and the line frame interpolation normal vector for the vertical frame line is denoted by $B_i$.

In this case, in fine splitting processing, first, in step S21, fine splitting processing of frame line $P_1P_2$ is done. That is, in step S21, M−1 interpolated points $P_{12}$ are set between vertices $P_1$ and $P_2$, and a curved surface interpolation normal vector $n_{12}$ is determined at each of these M−1 interpolated points $P_{12}$.

Then one proceeds to step S22, where splitting processing of frame line $P_3P_4$ is done. That is, in step S22, M−1 interpolated points $P_{34}$ are set between vertices $P_3$ and $P_4$, and a curved surface interpolation normal vector $n_{34}$ is determined at each of these M−1 interpolated points $P_{34}$.

Thereafter, one proceeds in sequence to steps S23 and S24, where splitting processing of frame line $P_1P_3$ and splitting processing of frame line $P_2P_4$ is done. That is, in step S23, N−1 interpolated points $P_{13}$ are set between vertex $P_1$ and vertex $P_3$, and a curved surface interpolation normal vector $n_{13}$ is determined at each of these N−1 interpolated points $P_{13}$. And in step S24, N−1 interpolated points $P_{24}$ are set between vertex $P_2$ and vertex $P_4$, and a curved surface interpolation normal vector $n_{24}$ is determined at each of these N−1 interpolated points $P_{24}$.

Then one proceeds to step S25, where splitting processing inside the polygon of quadrilateral polygon $P_1P_2P_4P_3$ is done. That is, in step S25, N−1 interpolated points are set between each of the M−1 interpolated points $P_{12}$ and the corresponding one of the M−1 interpolated points $P_{34}$, thus setting a total of (M−1)×(N−1) interpolated points $P_{1234}$, and a curved surface interpolation normal vector $n_{1234}$ is determined at each of these (M−1)×(N−1) interpolated points $P_{1234}$.

Thereafter, one proceeds to step S26, where quadrilateral polygon $P_1P_2P_4P_3$ is split into M×N quadrilateral subpolygons based on the interpolated points $P_{12}$, $P_{34}$, $P_{13}$, $P_{24}$, and $P_{1234}$ determined in steps S21 through S25, and fine splitting processing is terminated.

Figure 29:
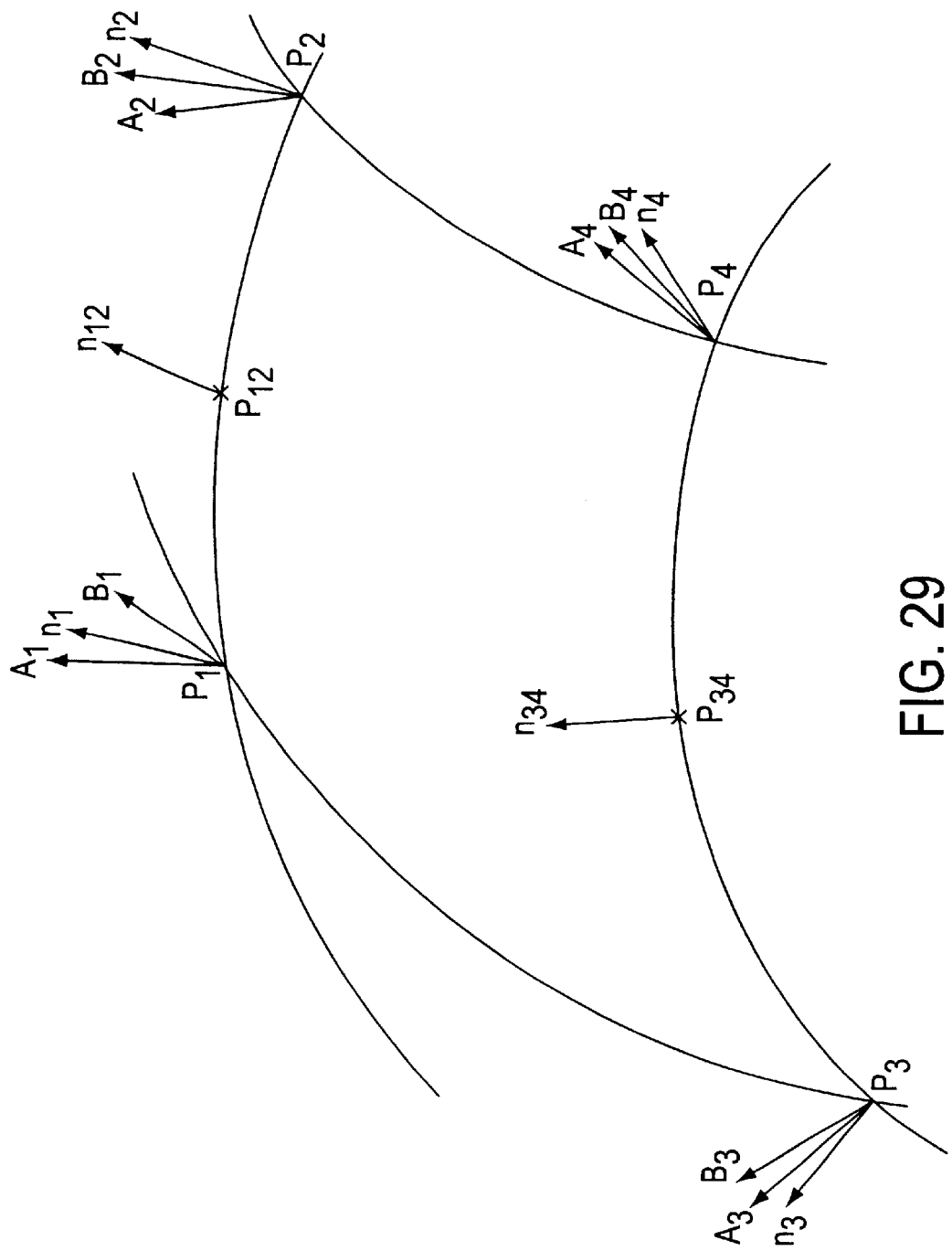
FIG. 29 is a diagram for explaining the processing of steps S21 and S22 in FIG. 27.

For example, assuming now that quadrilateral polygon $P_1P_2P_4P_3$ shown in FIG. 28 is split into 2×2 quadrilateral subpolygons (and therefore M−1=N−1=1), in step S21 of FIG. 27, an interpolated line that coincides with frame line $P_1P_2$ is determined by performing the control point computation processing of FIG. 9 using the coordinates of vertices $P_1$ and $P_2$ and the frame line interpolation normal vectors $A_1$ and $A_2$. And in step S21, interpolated point $P_{12}$, which is one point on interpolated line $P_1P_2$, is determined as shown in FIG. 29, by substituting for example 0.5 for the parameter t in equation (1) of the Bezier curve that represents this interpolated line $P_1P_2$. Also, in step S21, curved surface interpolation normal vector $n_{12}$ at interpolated point $P_{12}$ is determined from curved surface interpolation normal vector $n_1$ or $n_2$ at vertex $P_1$ or $P_2$, respectively, as explained in FIG. 16.

Likewise in step S22, the same processing as in step S21 is done on vertices $P_3$ and $P_4$, thereby determining interpolated point $P_{34}$, which is one point on interpolated line $P_3P_4$, and determining curved surface interpolation normal vector $n_{34}$ at this interpolated point $P_{34}$, as shown in FIG. 29.

Figure 30:
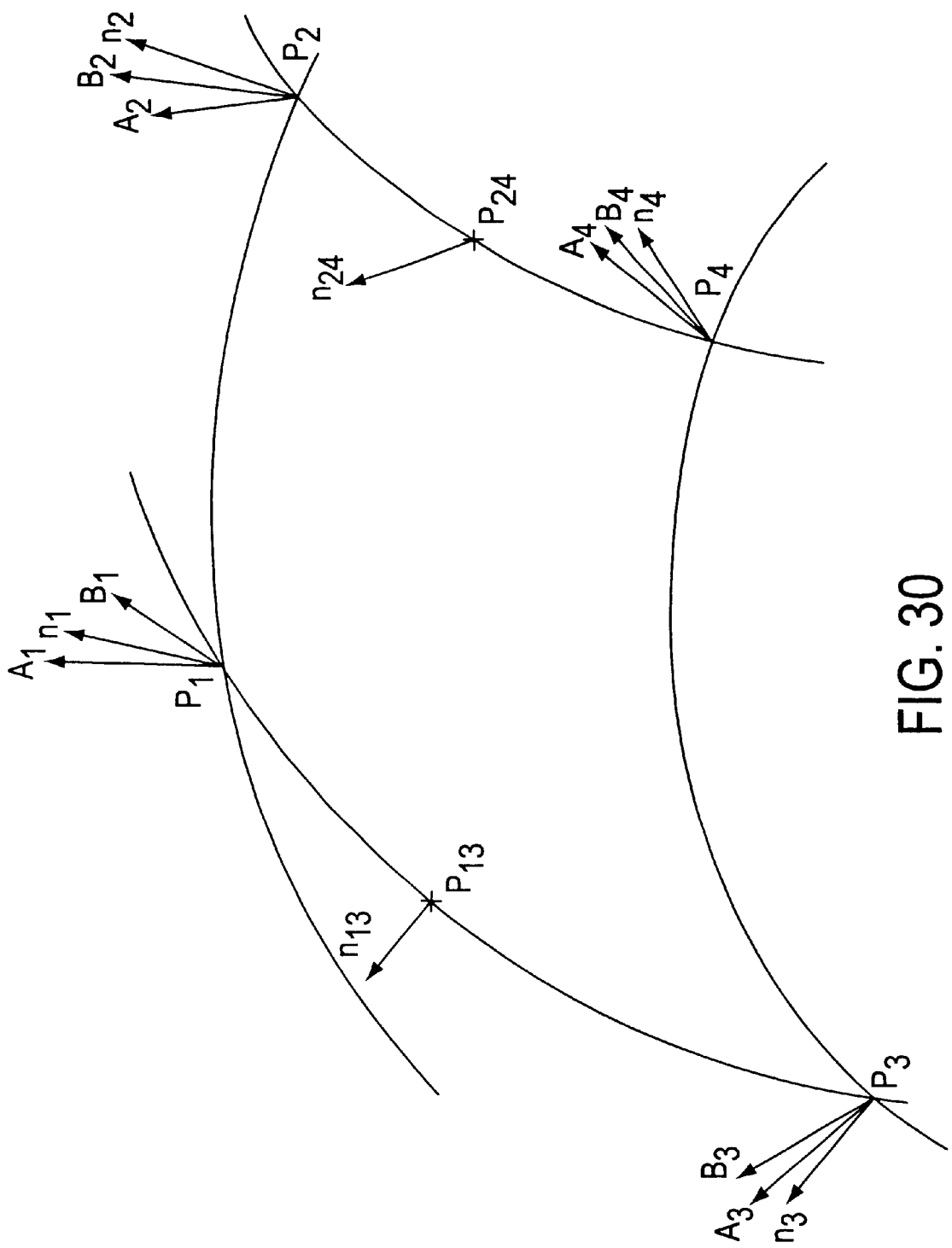
FIG. 30 is a diagram for explaining the processing of steps S23 and S24 in FIG. 27.

In step S23, an interpolated line that coincides with frame line $P_1P_3$ is determined by performing the control point computation processing of FIG. 9 using the coordinates of vertices $P_1$ and $P_3$ and the frame line interpolation normal vectors $B_1$ and $B_3$. In step S23, interpolated point $P_{13}$, which is one point on interpolated line $P_1P_3$, is determined as shown in FIG. 30, by substituting for example 0.5 for the parameter t in equation (1) of the Bezier curve that represents this interpolated line $P_1P_3$. Also, in step S23, curved surface interpolation normal vector $n_{13}$ at interpolated point $P_{13}$ is determined from curved surface interpolation normal vector $n_1$ or $n_3$ at vertex $P_1$ or $P_3$, respectively, as explained in FIG. 16.

Likewise in step S24, the same processing as in step S23 is done on vertices $P_2$ and $P_4$, thereby determining interpolated point $P_{24}$, which is one point on interpolated line $P_2P_4$, and determining curved surface interpolation normal vector $n_{24}$ at this interpolated point $P_{24}$, as shown in FIG. 3O.

Figure 31:
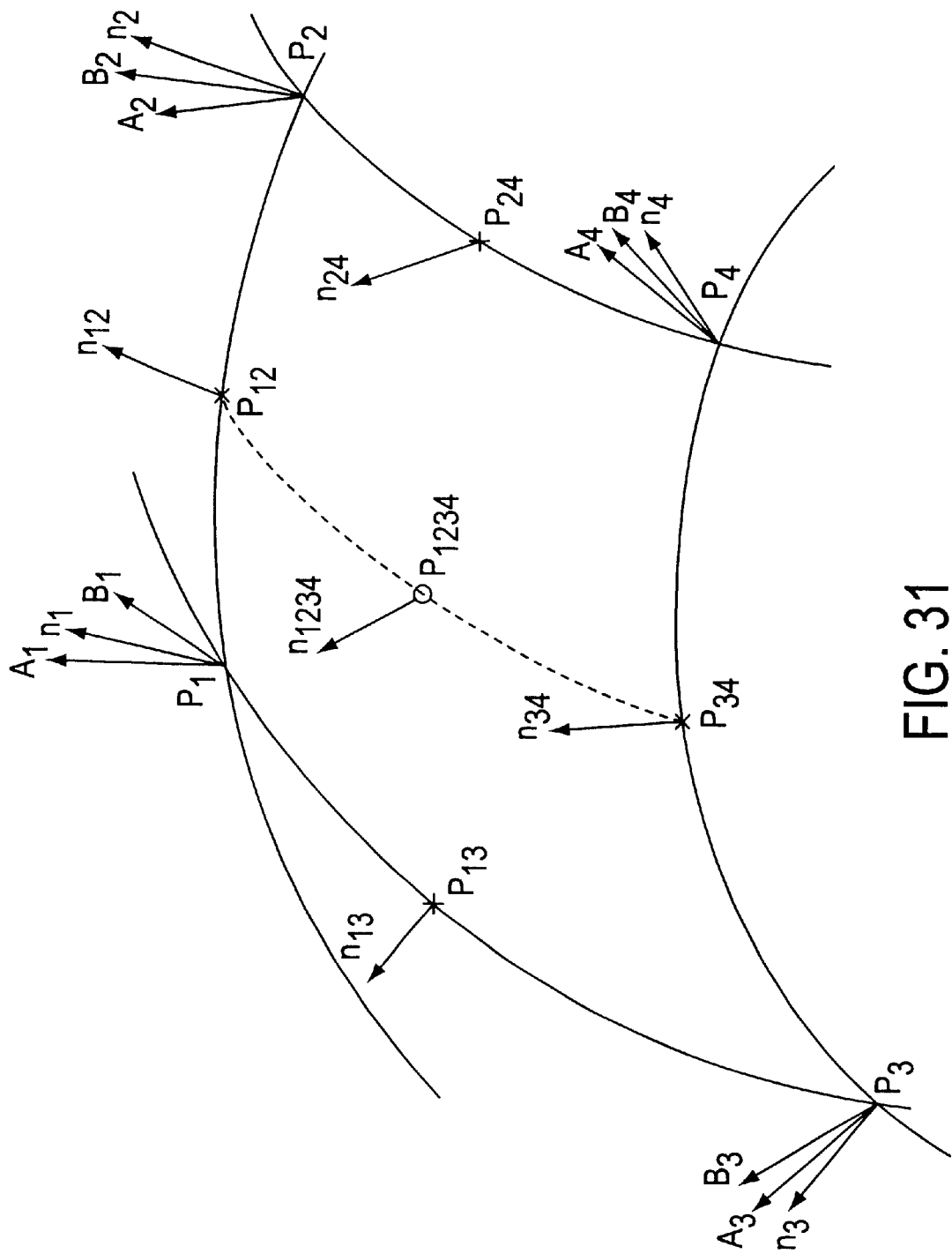
FIG. 31 is a diagram for explaining the processing of step S25 in FIG. 27.
Figure 32:
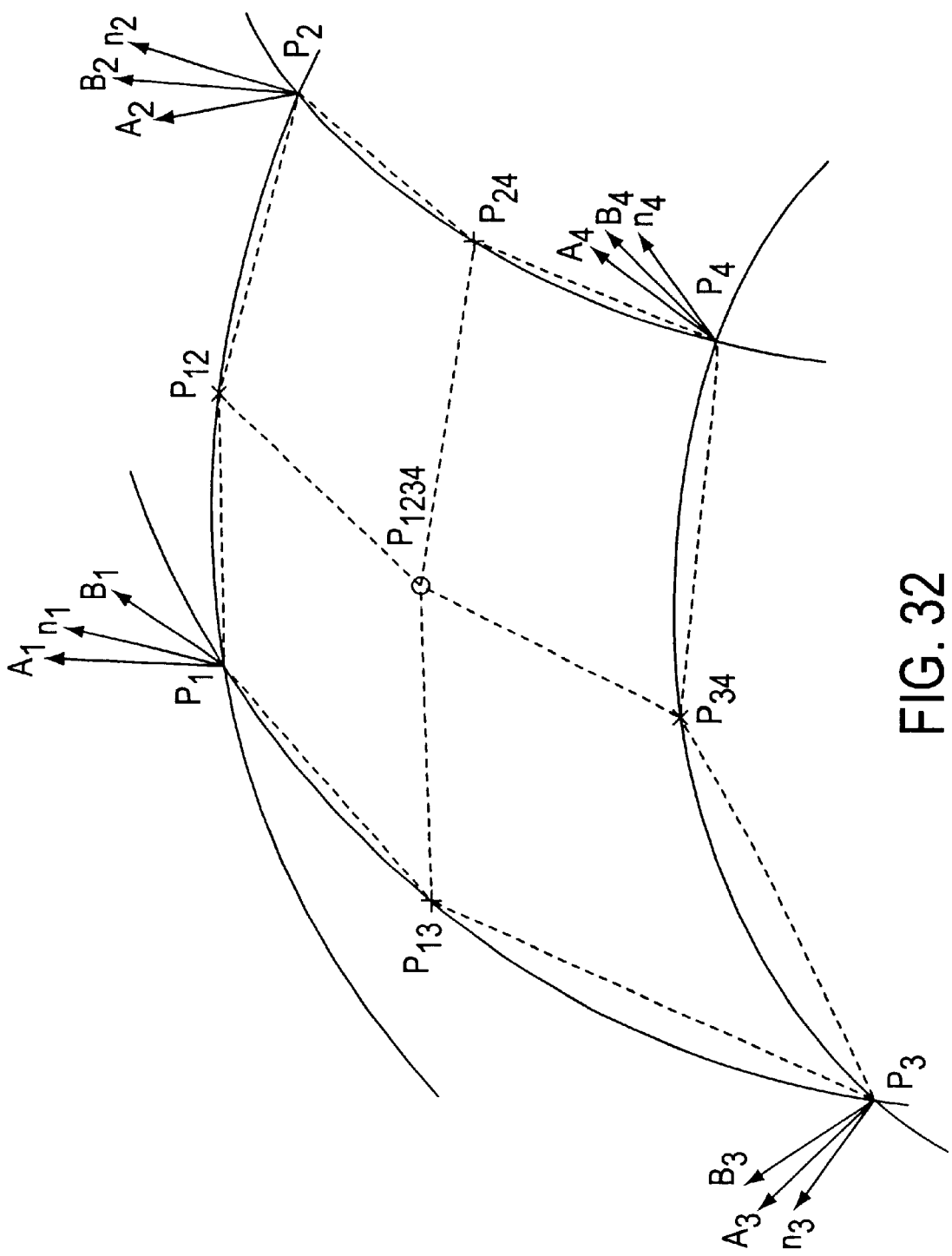
FIG. 32 is a diagram for explaining the processing of step S26 in FIG. 27.

In step S25, interpolated lines are determined that interpolate between corresponding interpolation members of the interpolated points on interpolated line $P_1P_2$ and the interpolated points on interpolated line $P_3P_4$, and on such an interpolated line, the same number of interpolated points are set as the interpolated points set on interpolated line $P_1P_3$ (or interpolated line $P_2P_4$). That is, in the present case, as shown in FIG. 31, interpolated line $P_{12}P_{34}$, which interpolates between interpolated points $P_{12}$ and $P_{34}$, is determined by performing the control point computation processing of FIG. 9 using the coordinates of interpolated points $P_{12}$ and $P_{34}$ and the curved surface interpolation normal vectors $n_{12}$, $n_{34}$. The interpolated point $P_{1234}$, which is one point on interpolated line $P_{12}P_{34}$, is determined as shown in FIG. 31, by substituting for example 0.5 for the parameter t in equation (1) of the Bezier curve that represents this interpolated line $P_{12}P_{34}$. Also, curved surface interpolation normal vector $n_{1234}$ at interpolated point $P_{1234}$ is determined from curved surface interpolation normal vector $n_{12}$ or $n_{34}$ at interpolated point $P_{12}$ or $P_{34}$, respectively, as explained in FIG. 16.

In step S26, quadrilateral polygon $P_1P_2P_4P_3$ is split into 2×2 quadrilateral subpolygons based on the interpolated points $P_{12}$, $P_{34}$, $P_{13}$, $P_{24}$, and $P_{1234}$ determined in steps S21 through S25. That is, quadrilateral polygon $P_1P_2P_4P_3$ shown in FIG. 28 is split into four quadrilateral subpolygons $P_1P_{12}P_{1234}P_{13}$, $P_{12}P_2P_{24}P_{1234}$, $P_{1234}P_{24}P_4P_{34}$, and $P_{13}P_{1234}P_{34}P_3$, thereby realizing a three-dimensional shape that is smoother than in the case of just quadrilateral polygon $P_1P_2P_4P_3$.

In the above case, in step S25, interpolated lines are determined that interpolate between corresponding interpolation members of the interpolated points on interpolated line $P_1P_2$ and the interpolated points on interpolated line $P_3P_4$, and on such an interpolated line, the same number of interpolated points are set as the interpolated points set on interpolated line $P_1P_3$ (or interpolated line $P_2P_4$), but otherwise it suffices to determine interpolated lines that interpolate between corresponding interpolation members of the interpolated points on interpolated line $P_1P_3$ and the interpolated points on interpolated line $P_2P_4$, and on such an interpolated line, the same number of interpolated points are set as the interpolated points set on interpolated line $P_1P_2$ (or interpolated line $P_3P_4$).

Figure 33:
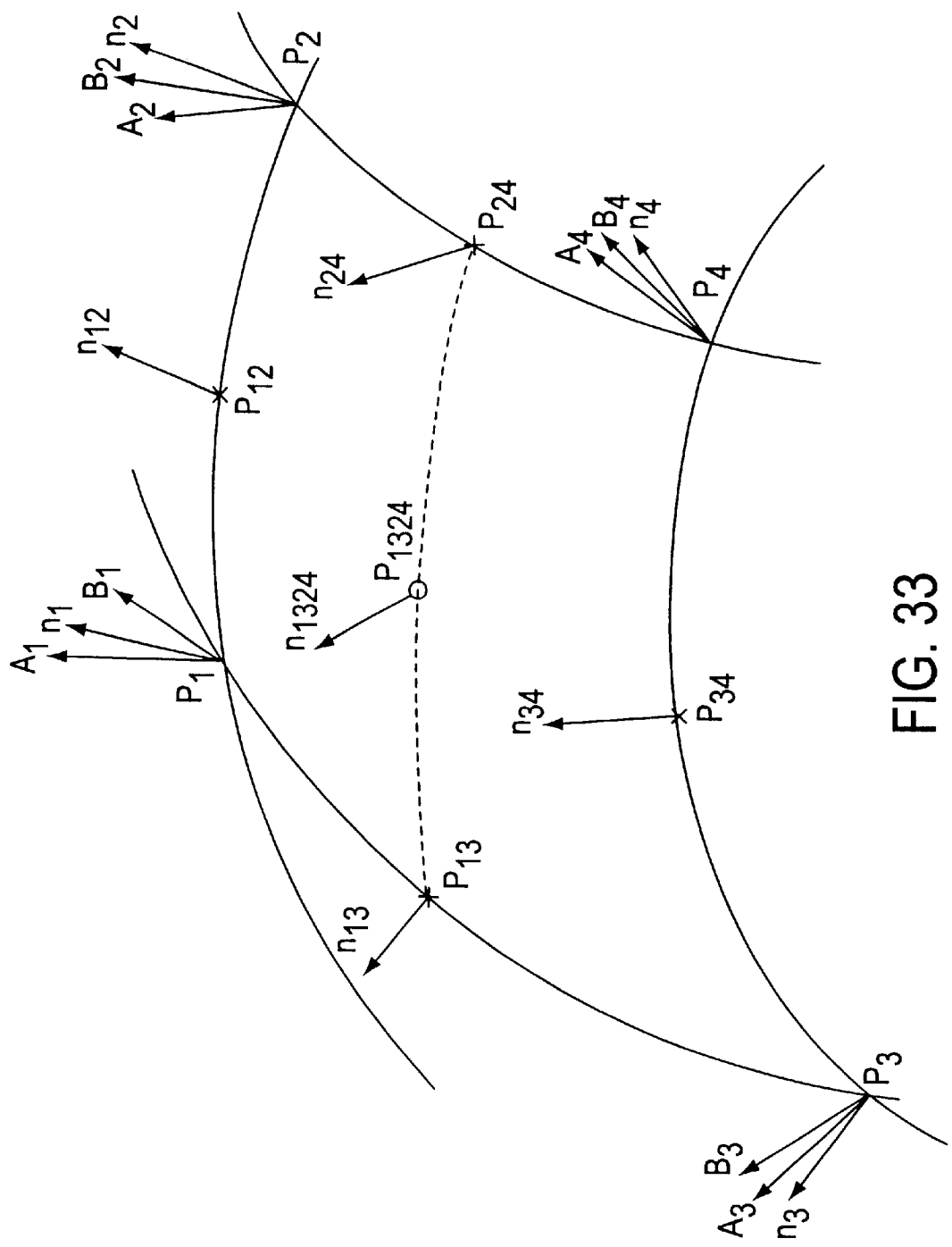
FIG. 33 is a diagram for explaining the processing of step S25 in FIG. 27.

That is, if for example quadrilateral polygon $P_1P_2P_4P_3$ shown in FIG. 28 is to be split into 2×2 quadrilateral subpolygons, in step S25, as shown in FIG. 33, interpolated line $P_{13}P_{24}$ that interpolates between interpolated points $P_{13}$ and $P_{24}$ is determined by performing the control point computation processing of FIG. 9 using the coordinates of interpolated points $P_{13}$ and $P_{24}$ and the curved surface interpolation normal vectors $n_{13}$ and $n_{24}$. In step S25, interpolated point $P_{1324}$, which is one point on interpolated line $P_{12}P_{34}$, is determined by substituting for example 0.5 for the parameter t in equation (1) of the Bezier curve that represents this interpolated line $P_{13}P_{24}$, and curved surface interpolation normal vector $n_{1324}$ at interpolated point $P_{1324}$ is determined from curved surface interpolation normal vector $n_{13}$ or $n_{24}$ at interpolated point $P_{13}$ or $P_{24}$, respectively, as explained in FIG. 16.

In this case, quadrilateral polygon $P_1P_2P_4P_3$ in FIG. 28 is split into four quadrilateral subpolygons $P_1P_{12}P_{1324}P_{13}$, $P_{12}P_2P_{24}P_{1324}$, $P_{1324}P_{24}P_4P_{34}$, and $P_{13}P_{1324}P_{34}P_3$.

Here it is possible in step S25 to determine both interpolated points $P_{1234}$ (FIG. 31) and $P_{1324}$ (FIG. 33) and set the final interpolated point to the point that is expressed by, say, the average value of their coordinates. In this case, the curved surface interpolation normal vector at the final interpolated point is set to, say, the average value of curved surface interpolation normal vectors $n_{1234}$ and $n_{1324}$.

The subpolygons obtained by the above fine splitting processing are supplied from splitting processing unit 14 to rendering unit 15 and are drawn by rendering processing being performed. That is, rendering unit 15 for example performs rendering on the subpolygons and converts them to the screen coordinate system. The shading of the subpolygons is done using the curved surface interpolation normal vector at each vertex. Rendering unit 15 determines the final RGB values of each pixel that constitutes display unit 16, such as by calculating the texture addresses for texture mapping using the texture data stored in texture database 17, and outputs them to display unit 16. In this way, the three-dimensional image consisting of the subpolygons is displayed on display unit 16.

And if there are no problems in the three-dimensional image displayed on display unit 16, the producer operates input unit 11 so as to supply the stored content of splitting database 13 to transmission/recording device 18. In response to this, the splitting polygon data stored in splitting database 13 is supplied to transmission/recording device 18. When it receives the splitting polygon data, transmission/according device 18 reads the texture data from texture database 17, multiplexes it with the splitting polygon data, and transmits it via transmission medium 2 or records it on recording medium 3.

If there is any problem with the three-dimensional image displayed on display unit 16, the producer corrects the splitting polygon data by operating input unit 11.

Figure 34:
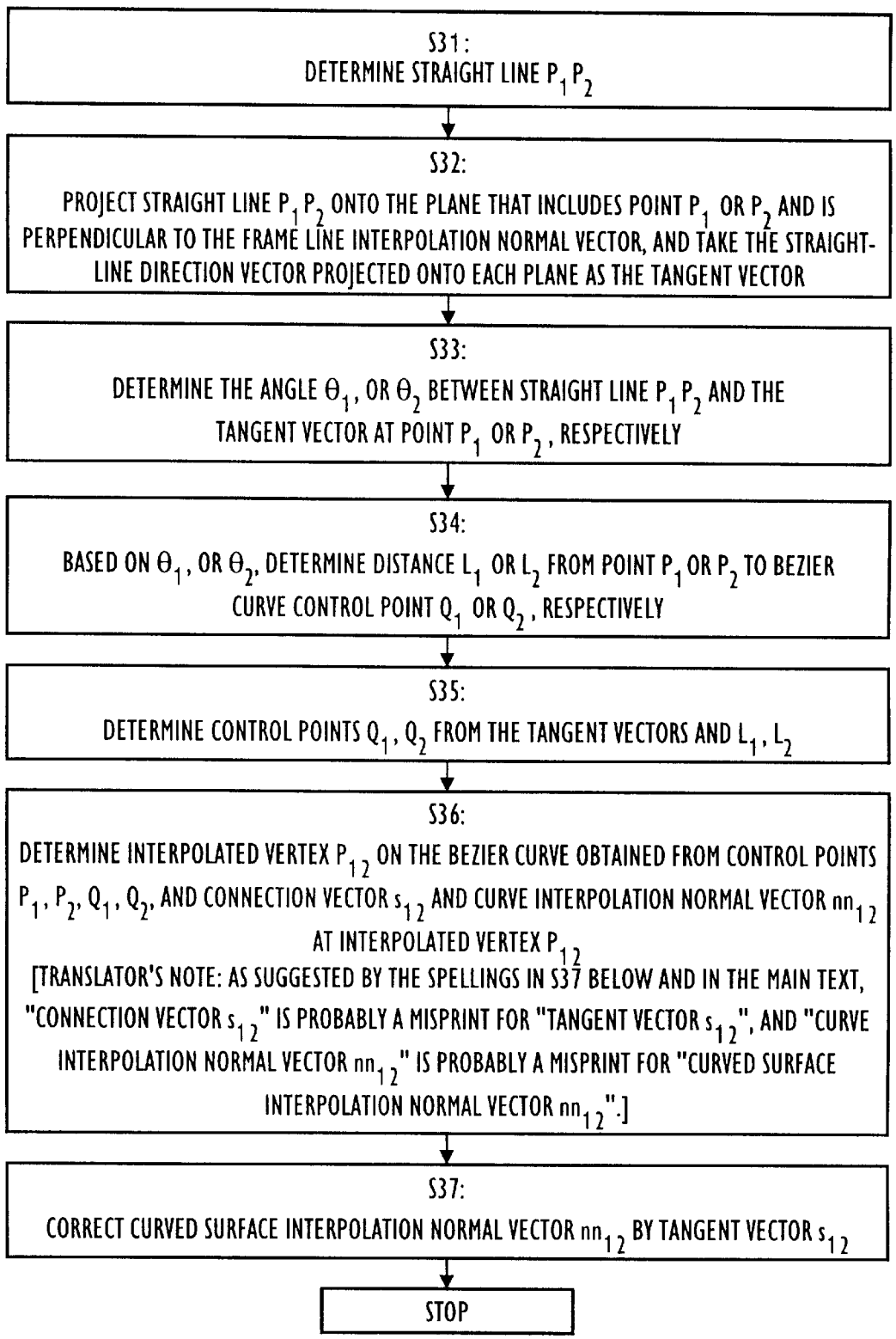
FIG. 34 is a flowchart for explaining splitting processing of frame lines.

Next, referring to the flowchart in FIG. 34, we further describe the frame line splitting processing in steps S21 through S24 in FIG. 27. Here one vertex that constitutes the polygon is denoted by $P_1$, and another vertex that is adjacent to this vertex $P_1$ is denoted by $P_2$. Also, the frame line interpolation vector at vertex $P_1$ or $P_2$ for frame line $P_1P_2$ between vertices $P_1$ and $P_2$ is denoted by $A_1$ or $A_2$, respectively, and the curved surface interpolation normal vector at vertex $P_1$ or $P_2$ is denoted by $n_1$ or $n_2$, respectively.

In frame line splitting processing, first, in step S31, straight line (line segment) $P_1P_2$ is determined, one proceeds to step S32, straight line $P_1P_2$ is orthogonally projected onto the plane that includes vertex $P_1$ or $P_2$ and is perpendicular to frame line interpolation normal vector $A_1$ or $A_2$, respectively, the unit vector in the straight-line direction projected onto each plane is determined, and each is taken as the tangent vector at vertex $P_1$ or $P_2$, respectively.

One then proceeds to step S33, which determines the angle $\theta_1$ or $\theta_2$ that straight line $P_1P_2$ forms with the tangent vector at vertex $P_1$ or $P_2$, respectively. Then one proceeds in sequence to steps S34 and S35, where a third-order Bezier curve is determined as the interpolation line that coincides with frame line $P_1P_2$, as in the case in FIG. 9.

That is, in step S34, based on angles $\theta_1$ and $\theta_2$ and the coordinates of vertices $P_1$ and $P_2$, one determines control edge length $L_1$ or $L_2$, which is the distance from control point $P_1$ or $P_2$ to another control point $Q_1$ or $Q_2$, respectively.

And in step S35, control point $Q_1$ or $Q_2$ is determined from control edge length $L_1$ or $L_2$, respectively, and thereby a three-dimensional Bezier curve is specified as the interpolated line that coincides with frame line $P_1P_2$.

Proceeding in sequence to steps S36 and S37, interpolated points $P_{12}$ are set on interpolated line $P_1P_2$, which is a Bezier curve, curved surface interpolation normal vectors $n_{12}$ at these interpolated points $P_{12}$ are determined, and frame line splitting processing is terminated.

That is, in step S36, an interpolated point $P_{12}$ is determined by substituting a specified value into parameter t in equation (1) that expresses interpolated line $P_1P_2$, which is a Bezier curve. And in step S36, tangent vector $s_{12}$ at interpolated point $P_{12}$ of interpolated line $P_1P_2$ is determined as explained in FIG. 16, and vector $nn_{12}$ described in FIG. 16 is determined by doing linear interpolation using curved surface interpolation normal vectors $n_1$ and $n_2$. And in step S37, vector $nn_{12}$ is corrected by tangent vector $s_{12}$ as explained in FIG. 16, and the result of the correction is determined as final curved surface interpolation normal vector $n_{12}$ at interpolated point $P_{12}$.

Figure 35:
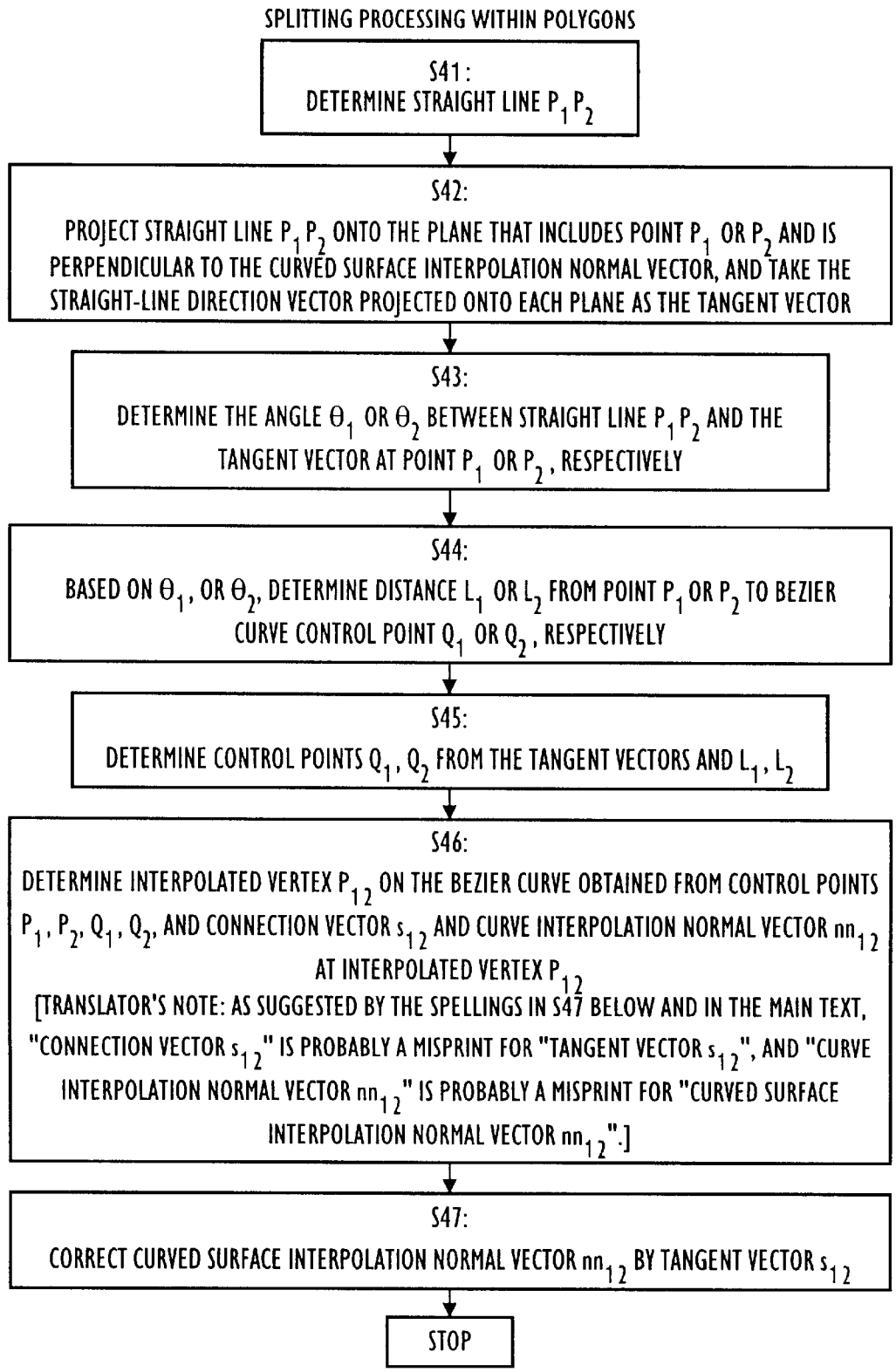
FIG. 35 is a flowchart for explaining splitting processing in the interior of a polygon.

Next, referring to the flowchart in FIG. 35, we further describe the splitting processing inside polygons in step S25 of FIG. 27. Here, one interpolated point on the frame line obtained by frame line splitting processing is denoted by $P_1$, and the interpolated point on the frame line that is opposite this frame line and corresponds to interpolated point $P_1$ is denoted by $P_2$. Also, in the frame line splitting processing for determining interpolated point $P_1$ or $P_2$, the curved surface interpolation normal vector determined together with interpolated points $P_1$ and $P_2$ is denoted by $n_1$ or $n_2$, respectively.

In splitting processing of the interior of polygons, the same processing is done in steps 41 through S47 as in the case of steps S31 through S37 in FIG. 34 -except that in step S42 the tangent vector at interpolated point $P_1$ or $P_2$ is determined using not the frame line interpolation normal vector but curved surface interpolation vector $n_1$ or $n_2$, respectively—and the interpolated points on the Bezier curve as the interpolated line that interpolates between interpolated points $P_1$ and $P_2$, and curved surface interpolation normal vector $n_{12}$ at these interpolated points are determined.

If, as above, a vertex has both a frame line interpolation normal vector and a curved surface interpolation normal vector, then an interpolated point that interpolates between vertices of the original polygon on which fine splitting processing is done is determined using the frame line interpolation normal vectors, and an interpolated point that interpolates between interpolated points is determined using the curved surface interpolation normal vectors. But if the bending of the interpolated line (frame line) as stated above is not a problem, then an interpolated point may be determined using only the curved surface interpolation normal vectors, even if the vertices have both frame line interpolation normal vectors and curved surface interpolation normal vectors.

With the aforesaid fine splitting processing, subpolygons that constitute a smooth three-dimensional shape can be generated from splitting polygon data concerning rough polygons.

Figure 36:
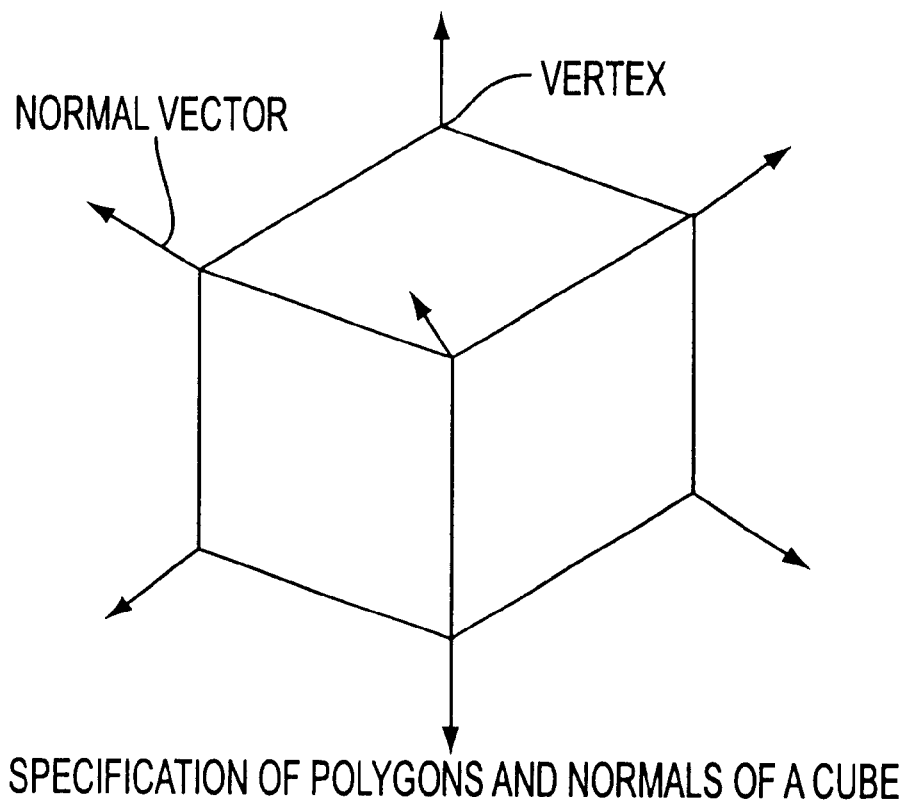
FIG. 36 is a diagram that shows polygons that constitute a cube to be subjected to fine splitting processing.
Figure 37:
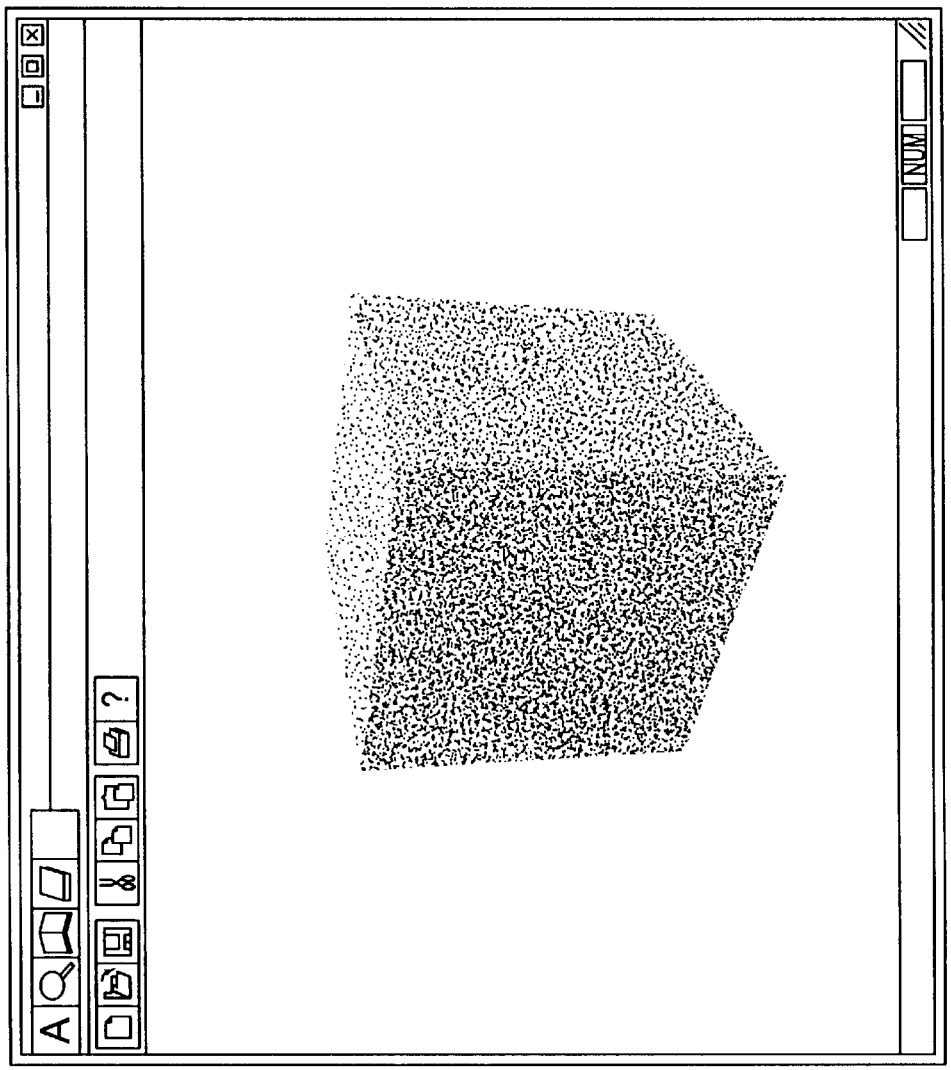
FIG. 37 is a photograph of a halftone image appearing on a display that shows the drawing results if fine splitting processing is not done on the polygons of FIG. 36.
Figure 38:
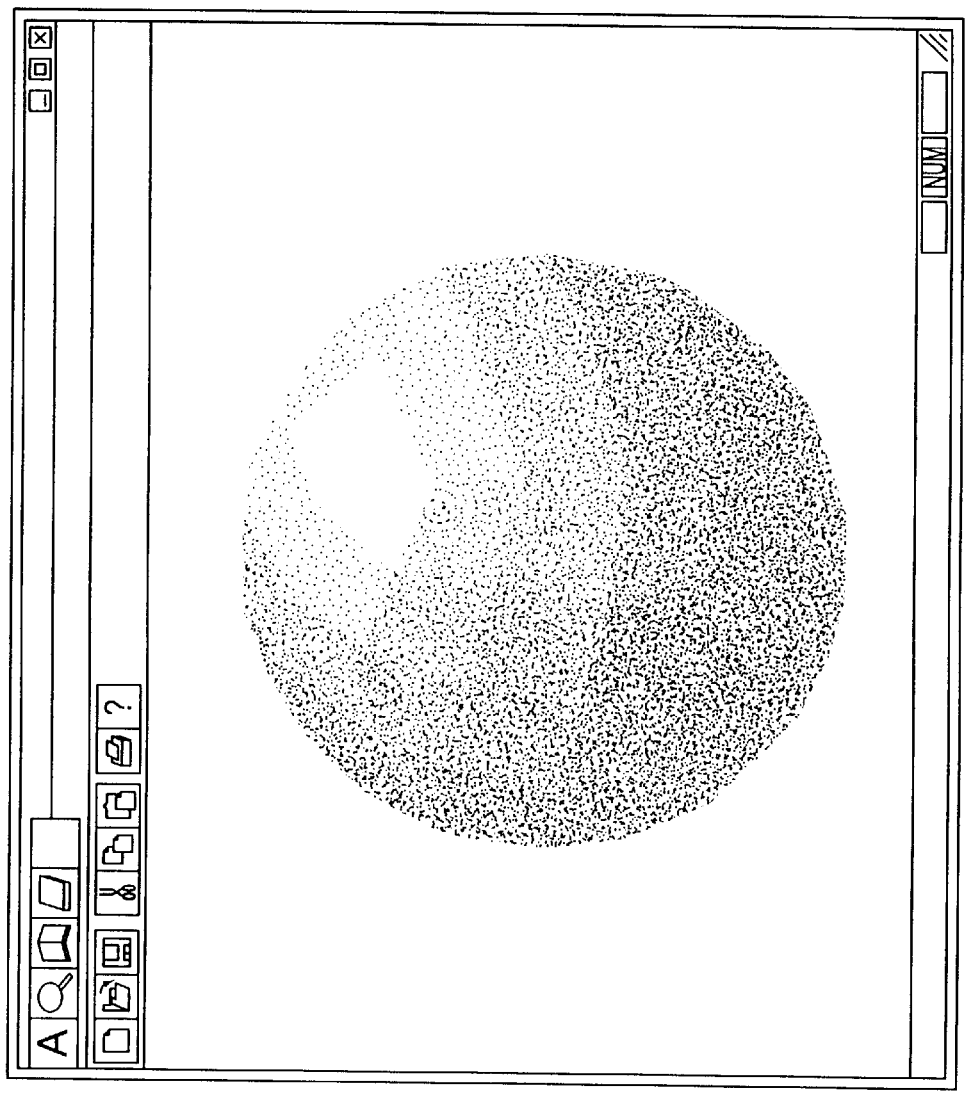
FIG. 38 is a photograph of a halftone image appearing on a display that shows the drawing results if fine splitting processing is done on the polygons of FIG. 36.

That is, for example the cube shown in FIG. 36 consists of six quadrilateral (square) polygons constituting its six faces, and if drawing is done without performing any fine splitting processing on these six quadrilateral polygons, what results is, for example, a cube as shown in FIG. 37. In contrast to this, if each vertex of the six quadrilateral polygons is given as an interpolation vector (curved surface interpolation normal vector) a vector that extends radially from the center of the cube, and fine splitting processing is carried out, then what results is, for example, a sphere as shown in FIG. 38. In FIG. 38 (as in FIG. 40 through FIG. 42, which are discussed below), each quadrilateral polygon is split into 5×5 subpolygons.

Figure 39:
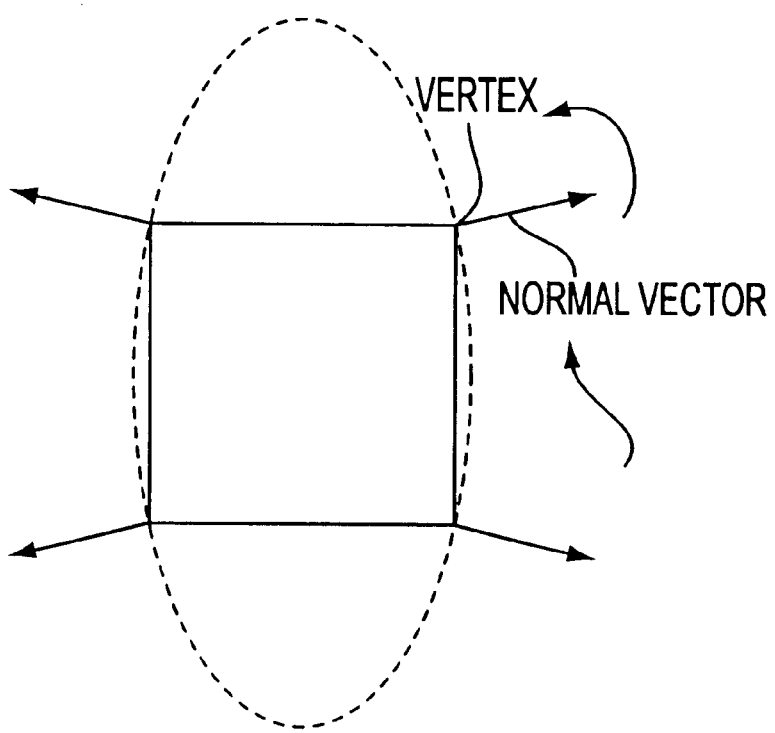
FIG. 39 is a diagram that shows an example of generation of a squashed sphere (side views) at the state in which the interpolation normal vectors assigned to a cube to be subjected to fine splitting processing are modified.

Furthermore, by changing the interpolation vectors given at each vertex of the six quadrilateral polygons from those shown in FIG. 36 to, for example, ones that are tilted as shown in the side view in FIG. 39, the six quadrilateral polygons, by fine splitting processing, are split into subpolygons that comprise a distorted sphere as indicated by the dotted line in this diagram. That is, by just changing the interpolation vectors assigned to the six quadrilateral polygons that constitute the cube, one can obtain a, so to speak, egg-shaped three-dimensional shape as shown in FIG. 40 or FIG. 41.

Figure 40:
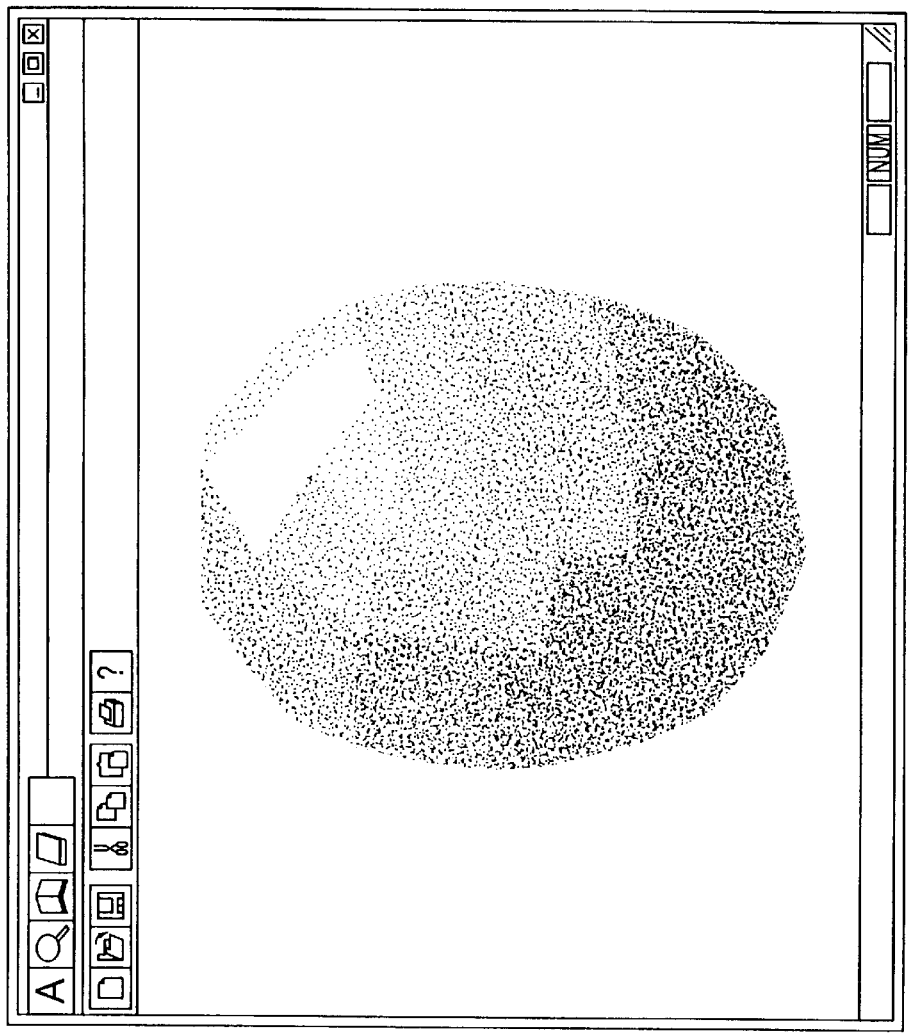
FIG. 40 is a photograph of a halftone image appearing on a display that shows the drawing results if fine splitting processing is done on the polygons of FIG. 36.
Figure 41:
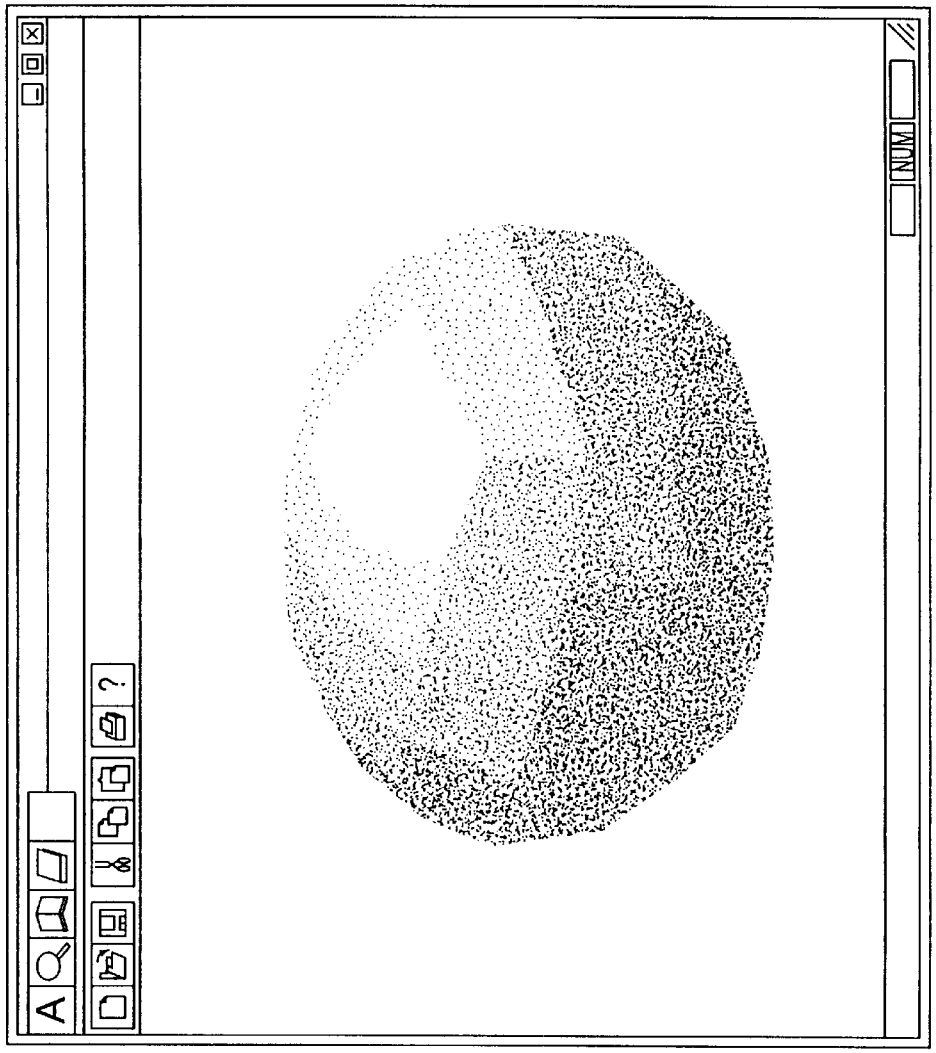
FIG. 41 is a photograph of a halftone image appearing on a display that shows the drawing results if fine splitting processing is done on the polygons of FIG. 36.

Here the three-dimensional shapes shown in FIG. 38, FIG. 40, and FIG. 41 can be realized by using as interpolation vectors only the curved surface interpolation normal vectors.

Figure 42:
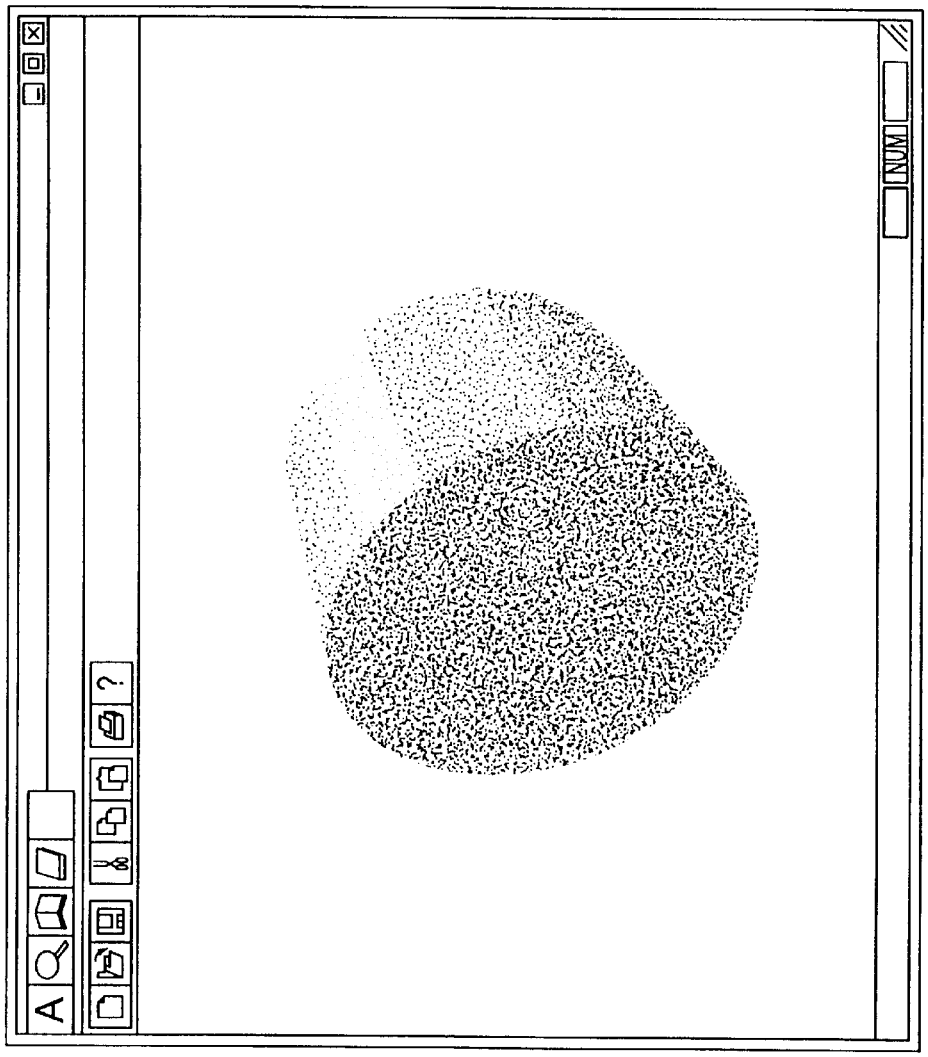
FIG. 42 is a photograph of a halftone image appearing on a display that shows the drawing results if fine splitting processing is done on the polygons of FIG. 36.

Also, for example, a circular cylinder as shown in FIG. 42 can be realized through fine splitting processing by assigning to the vertices of those of the six quadrilateral polygons comprising the cube shown in FIG. 36 that will constitute the side faces of the circular cylinder the normal vectors of these quadrilateral polygons as frame line interpolation normal vectors or curved surface interpolation normal vectors, assigning to the vertices of the quadrilateral polygons that will comprise the circle that is to be the base of the circular cylinder, as frame line interpolation normal vectors, normal vectors in a direction extending radially from the center of this circle, and assigning normal-direction vectors of (the surface of) this circle as curved surface interpolation normal vectors.

Since, as described above, fine splitting processing makes it possible to generate subpolygons that constitute a smooth three-dimensional shape from splitting polygon data concerning rough polygons, the producer is given the ability to compose a complex three-dimensional shape even without setting detailed parameters concerning the three-dimensional shape.

Next, referring to the flowchart in FIG. 43, the processing of user terminal 4 in FIG. 3 will be described.

With user terminal 4, reception/playback device 21 receives data transmitted via transmission medium 2 or plays back data recorded on recording medium 3, and among this data, the splitting polygon data is supplied to and recorded in splitting database 22, and the texture data is supplied to and recorded in texture database 27.

Figure 43:
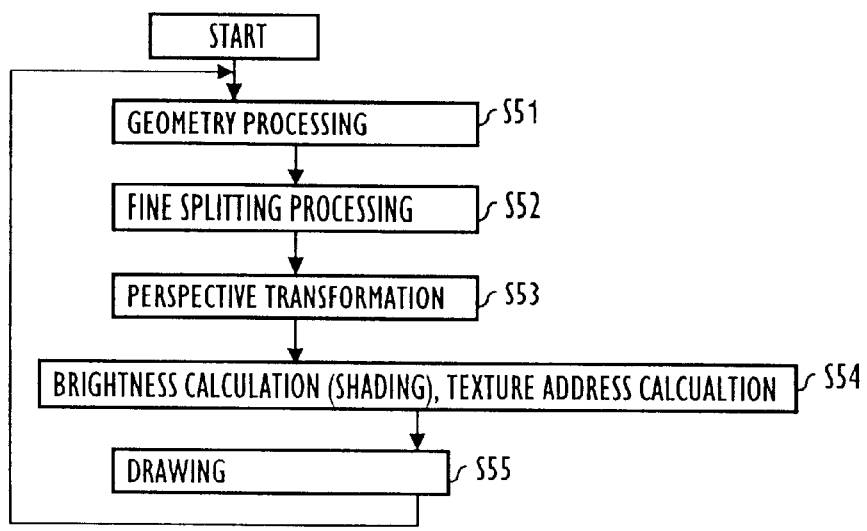
FIG. 43 is a flowchart for explaining the processing of user terminal in FIG. 3.

The splitting polygon data recorded in splitting database 22 is read, for example in one-frame units, by geometry processing unit 23, and in step S51 of FIG. 43, geometry processing unit 23 performs geometry processing (such as coordinate transformations according to the viewpoint) on this splitting polygon data in response to operation by the user of input unit 28, and supplies the result to splitting processing unit 24. In step S52, splitting processing unit 24 performs fine splitting processing on the splitting polygon data in the same way as in splitting processing unit 14 of data provision device 1, and the resulting subpolygons are supplied to rendering unit 25. In step S53, rendering unit 25 performs a perspective transformation (perspective projection transformation) on the subpolygons from splitting processing unit 14, and proceeds to step S54. In step S54, brightness calculation (shading (for example, Gouraud shading or Phong shading)) is done on the transformed data, and texture address calculation, etc. is done, thereby determining the RGB values of each pixel. In step S55, in rendering unit 25 the RGB values of each pixel are written to a frame buffer that is not shown in the diagram, and one returns to step S51 to wait for splitting polygon data concerning the next frame to be read from splitting database 22. The three-dimensional image as RGB values written into the frame buffer is read out with the prescribed timing and is displayed on display unit 26.

Therefore, with user terminal 4 too, as in the case of data provision device 1, subpolygons that constitute a smooth three-dimensional shape can be generated from splitting polygon data concerning rough polygons.

Figure 44:
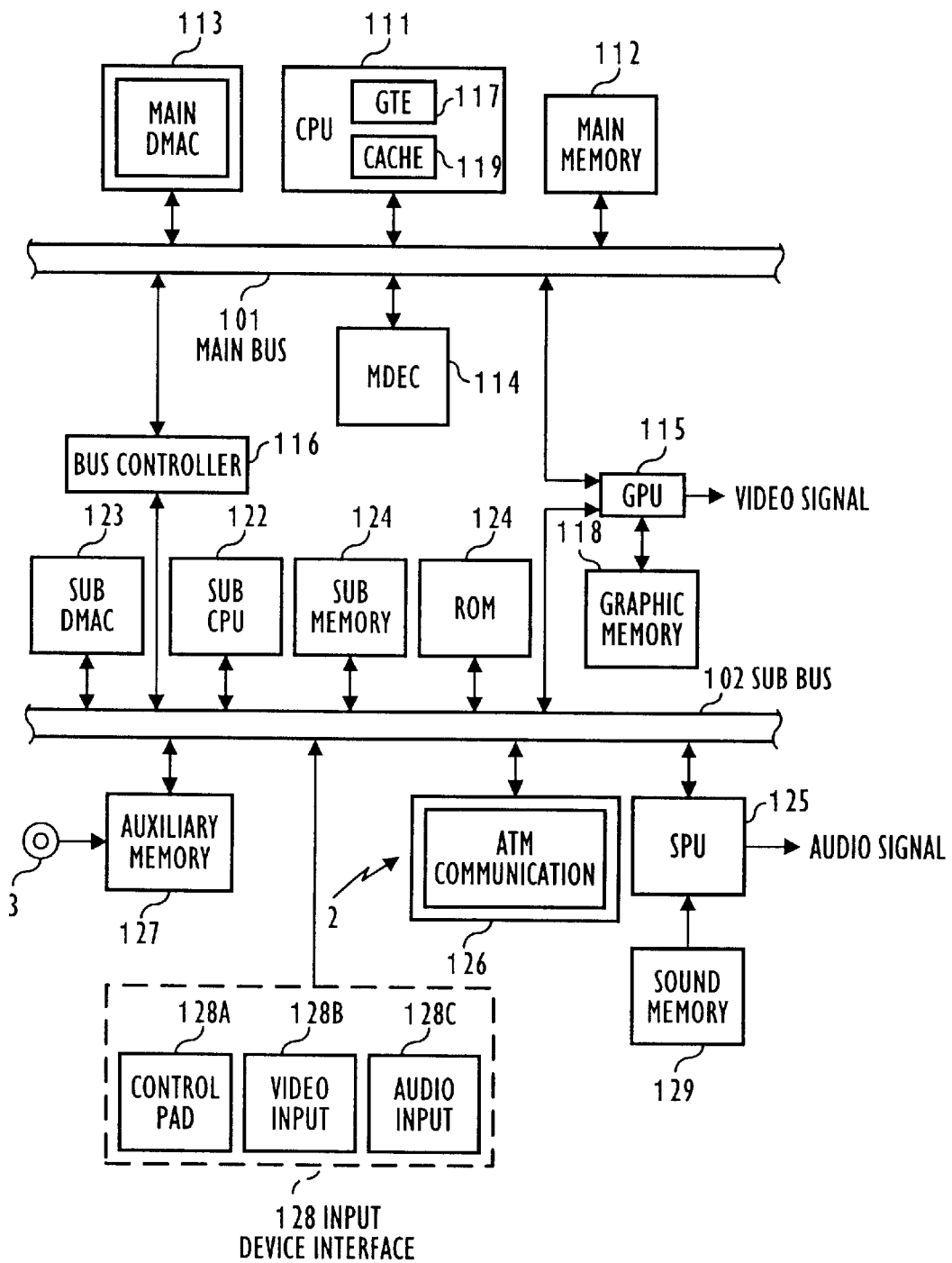
FIG. 44 is a block diagram that shows an example of the electric configuration if the user terminal is configured as a video game machine.

Next, FIG. 44 shows an example of the configuration if user terminal 4 is, say, a video game machine. And if user terminal 4 is a video game machine, in addition to data for displaying three-dimensional images, game programs (computer programs), etc. are also provided to user terminal 4 from data provision device 1 via transmission medium 2 or recording medium 3.

This video game machine has two kinds of buses for exchanging data among the blocks, main bus 101 and sub bus 102; main bus 101 and sub bus 102 are connected via bus controller 116.

Connected to main bus 101, besides bus controller 116, are, for example, main CPU (central processing unit) 111, which consists of subprocessors, etc., main memory 112, which for example consists of RAM (random access memory), main DMAC (direct memory access controller) 113, MDEC (MPEG (Moving Picture Experts Group) decoder) MDEC 114; and GPU (graphic processor unit) 115.

Connected to sub bus 102, besides bus controller 116, are GPU 115, sub CPU 121, which for example is configured in the same way as main CPU 111, sub memory 122, which for example is configured in the same way as main memory 112, sub DMAC 123, ROM (read only memory) 124, which holds the operating system, etc., SPU (sound processing unit) 125, ATM (asynchronous transmission mode) communication unit 126, auxiliary memory unit 127, and input device interface I/F 128.

Here, data is exchanged at high speed by main bus 101 and at low speed by sub bus 102. That is, the high-speed performance of main bus 101 is assured by using sub bus 102 for data that can be exchanged at low speed.

Bus controller 116 is made so as to disconnect main bus 101 and sub bus 102 and connect main bus 101 and sub bus 102. If main bus 101 and sub bus 102 are disconnected, only devices connected to main bus 101 can be accessed from main bus 101, and only devices connected to sub bus 102 can be accessed from sub bus 102, but if sub bus 102 is connected to main main bus 101, any device can be accessed from either main bus 101 or sub bus 102. And in the initial state, such as immediately after the power to the device has been turned on, bus controller 116 is in open state (the state in which main bus 101 and sub bus 102 are connected).

Main CPU 111 performs various processing in accordance with programs stored in main memory 112. That is, main CPU 111, for example when the device is activated, reads via bus controller 116 the booting program from ROM 124 (connected to sub bus 102), which is on sub bus 102, and executes it. In this way, main CPU 111 causes the application programs (here, the game programs and programs for performing the aforementioned fine splitting processing, etc.) and necessary data to be loaded from auxiliary memory device 127 into main memory 112 and sub memory 122. Then main CPU 111 executes the programs it has thus caused to be loaded into main memory 112.

Main CPU 111 includes a built-in GTE (Geometry Transfer Engine) 117; this GTE 117 has for example a parallel operation mechanism which executes multiple operations in parallel, and in accordance with requests from main CPU 111 performs high-speed arithmetic processing for such geometry processing as coordinate system transformations, etc. Thus, by carrying out processing (geometry processing) in accordance with requests from main CPU 111, GTE 117 generates and supplies to main CPU 111 the data for the polygons that constitute the three-dimensional image to be displayed. When main CPU 111 receives the polygon data from GTE 117, it transfers it to GPU 115 via main bus 101.

Main CPU 111 also includes a built-in cache memory 119; processing can be speeded up by accessing this cache memory 119 instead of accessing main memory 112.

As described above, main memory 112, besides storing programs, also stores data, etc. that is necessary for processing by main CPU 111. Main DMAC 113 controls DMA transfers to devices on main bus 101. However, when bus controller 116 is in open state, main DMAC 113 also controls devices on sub bus 102. MDEC 114, which is an I/O device that can operate in parallel with main CPU 111, functions as an image expansion engine. That is, MDEC 114 decodes image data which was compressed by MPEG encoding.

GPU 115 functions as a rendering processor. That is, GPU 115 receives data, including splitting polygon data, transmitted from main CPU 111 and splits it into subpolygons by performing fine splitting processing. Also GPU 115, by performing perspective projection transformations on the subpolygons, converts it to data in a two-dimensional plane (screen coordinate system), and computes and writes (draws) to graphic memory 118 the pixel data that constitutes the polygons based on, for example, color data for the vertices of the polygons (although not stated above, color data is also included in the splitting polygon data) and Z values that indicate their depth (depth from the viewpoint). Also, GPU 115 reads out the pixel data that has been written into graphic memory 118 and outputs it as a video signal. In addition, GPU 115, as necessary, receives splitting polygon data also from main DMAC 113 or devices on sub bus 102 and performs similar processing in accordance with the data.

Figure 45:
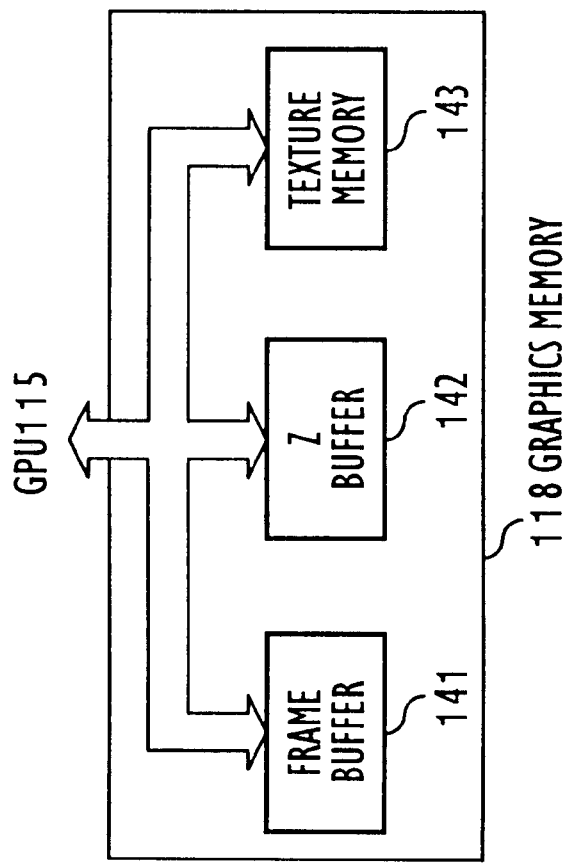
FIG. 45 is a block diagram that shows an example of the configuration of the graphic memory in FIG. 44.

Graphic memory 118 consists of, for example, DRAM, and has frame memory 141, Z buffer 142, and texture memory 143, as shown in FIG. 45. Frame memory 141 stores the pixel data to be displayed on the screen, for example the portion for one frame. Z buffer 142 stores the Z value of the polygon that is nearest to the viewer in the image to be displayed on screen; it has enough memory capacity to store, for example, the Z values for one frame. Texture memory 143 stores data on the texture to be attached to the polygons.

GPU 115 performs processing using frame memory 141, Z buffer 142, and texture memory 143. That is, GPU 115 causes the Z value of the subpolygon constituting the three-dimensional image that is nearest to the viewer to be stored, and based on the values stored in this Z buffer 142, it is decided whether to draw the pixel data (RGB values) to frame buffer 141. If the pixel data is to be drawn, texture data is read from texture memory 143, and this data is used to determine the pixel data to be drawn, and drawing is done to frame memory 141.

Returning to FIG. 44, sub CPU 121 performs various processing by reading and executing programs stored in sub memory 122. Stored in sub memory 122, as in main memory 112, are programs and the required data. Sub DMAC 123 controls DMA transfers to devices on sub bus 102. Also, sub DMAC 123 acquires bus rights only when bus controller 116 is in closed state (when main bus 101 and sub bus 102 are disconnected). ROM 124, as described above, stores the booting program and the operating system, etc. Also stored in ROM 124 are programs for both main CPU 111 and sub CPU 121. ROM 124 here has a slow access speed, and therefore it is on sub bus 102.

SPU 125 receives packets transmitted from sub CPU 121 or sub DMAC 123 and reads audio data from sound memory 129 according to the sound commands laid out in these packets. Then SPU 125 outputs the read-out audio data to a speaker not shown. ATM communication unit 126 performs control (ATM communication control) of the communication that is done via, for example, transmission medium 2. In this way a video game machine user can compete with other video game machine users by exchanging data either directly or via data provision device 1, a server on the Internet, or a so-called personal computer communications center.

Auxiliary memory device 127 plays back information (programs, data) stored on recording medium 3 by, for example, a disk drive. Input device interface 128 consists of control pad 128A for giving various input and interface, and 128B or 128C, etc. for receiving external input such as images or audio played pack by other devices; it outputs to sub bus 102 signals that respond to input from outside. Sound memory 129 stores audio data.

In user terminal 4 in FIG. 3, reception/playback device 21 corresponds to ATM communication unit 126 and auxiliary memory device 127 of FIG. 44, splitting database 22 corresponds to main memory 112 of FIG. 44, geometry processing unit 23 corresponds to GTE 117 in FIG. 44, splitting processing unit 24 and rendering unit 25 correspond to GPU 115 in FIG. 44, texture database 27 corresponds to texture memory 143 in FIG. 45, and input unit 28 corresponds to control pad 128A in FIG. 44.

In a game machine configured as described above, when the power to the device is turned on, by the booting program being read from ROM 124 and executed in main CPU 111, programs and data are read by ATM communication unit 126 via transmission medium 2, or programs and data are read by auxiliary memory device 127 via recording medium 3, and are expanded into main memory 112 and sub memory 122. In main CPU 111 or sub CPU 121, respectively, the program expanded into main memory 112 or sub memory 122 is executed, thereby playing back the game images (here assumed to be moving images) and sound.

That is, for example, in main CPU 111 geometry processing is done on the splitting polygon data stored in main memory 112, and is supplied to GPU 115 via main bus 101.

Upon receiving splitting polygon data from main CPU 111, GPU 115 splits it into subpolygons by performing fine splitting processing. GPU 115 also performs a perspective transformation on the subpolygons, and draws the transformed subpolygons to frame memory 141 using Z buffer 142. The results of drawing to frame memory 141 are appropriately read in GPU 115 and output as a video signal. In this way, three-dimensional images for the game are displayed on, for example, display unit 26 (FIG. 3) as a two-dimensional output device.

Meanwhile, in sub CPU 121, sound commands that direct the generation of audio are generated in accordance with the data stored in sub memory 122. These sound commands are packetized and supplied to SPU 125 via sub bus 102. SPU 125 reads audio data from sound memory 129 and outputs it in accordance with the sound commands from sub CPU 121. In this way, background music for the game and other sounds are output.

As described above, interpolated lines that interpolate between one vertex and another are determined from the coordinates of the vertices of a polygon and interpolation vectors at the vertices, and interpolated points on the interpolated lines are determined as vertices of subpolygons, so it is possible to realize a smooth three-dimensional shape just by given data on polygons that are to some extent rough.

Since a smooth three-dimensional shape can be realized with data concerning rough polygons, that is, with a small amount of data, data can be efficiently stored and transmitted if three-dimensional images are to be provided on, for example, the World Wide Web (WWW), which has been constructed on the Internet. That is, the splitting polygon data can be provided to user terminal 4 using a relatively small-capacity transmission medium 2 or recording medium 3.

From the standpoint of processing efficiency in, for example, video game machines or other graphic systems in which real-time display of three-dimensional images is important, the processing of polygons can be minimized by finely displaying three-dimensional shapes that are near to the viewpoint and coarsely displaying three-dimensional shapes that are far from the viewpoint. When doing so, the level of fineness (coarseness) of the three-dimensional shape, indicating how finely (or coarsely) the three-dimensional shape is to be made, is known as its level of detail (LOD), and three-dimensional shapes of the appropriate fineness (coarseness) can be displayed by determining according to the level of detail the number of partitionings of polygons when fine splitting processing is to be done.

If a three-dimensional shape composed of polygons is to be enlarged, the coarsening of the three-dimensional shape due to its enlargement can be prevented by doing fine partitioning and splitting the polygons into a number of subpolygons that depends on the enlargement ratio. That is, in this case, a three-dimensional shape of fixed smoothness can be presented regardless of the enlargement ratio.

Also, because the splitting polygon data obtained by splitting polygon data generation processing includes the coordinates of the vertices of the polygons and the normal vectors at each polygon that are conventionally used for display of three-dimensional images (the curved surface interpolation normal vector conventionally coincides with the normal vector assigned to a vertex), this data can be handled even on an existing low-speed video game machine or other graphics system, and three-dimensional shapes can be displayed, although they will be coarse.

Since the quantity of splitting polygon data is small, the amount of calculation in geometry processing and the like can be kept small by making sure that geometry processing for deformation or rotation of a three-dimensional shape, as well as the processing up to just before division by the Z value for perspective transformation (perspective division), are done prior to doing fine splitting processing, and by carrying out division by the Z value for perspective transformation on the subpolygons that are obtained after fine splitting processing.

Also, in this embodiment it is considered ideal for an interpolated line to be equal to the arc of a circle or ellipse that passes through the two points interpolated by the interpolated line, and because such interpolated lines are determined, polygons that constitute a sphere, body of revolution, or similar shape can be represented with a smaller quantity of data than, for example, the case in which a sphere, body of revolution, or similar shape is represented by spline curves or Bezier curves.

The foregoing discussion concerns data provision systems or video game machines to which this invention applies, but this invention also is applicable to devices that perform computer graphics processing, such as effectors that give special effects to images, or CAD. Moreover, this invention is also applicable to, for example, a recording and playback device or transmission device that encodes natural images taken with a video camera and records and plays back or transmits and receives. That is, splitting polygon data generation processing can be applied to encoding processing so as to represent with polygons a natural image taken by a video camera or similar device, and fine splitting processing can be applied to decoding processing in which splitting polygon data obtained by such encoding is decoded into the original natural image.

This invention is applicable to drawing either moving images or still images.

This embodiment deals with three-dimensional graphics, but this invention is also applicable to, for example, two-dimensional graphics as well. That is, the present invention makes it easy to draw circles and ellipses just by prescribing, for example, a few points (at least two) by which an arc of a circle or ellipse can be formed, along with interpolation vectors at these points. Since the curvature of curves obtained in this way varies smoothly as is evident from FIG. 10 through FIG. 13, it is possible to obtain curves that vary smoothly.

The number of partitions of polygons by fine splitting processing, besides being determined according to the level of detail or the enlargement ratio as discussed above, can be determined, for example, according to the processing capacity of the hardware that performs the fine splitting processing, or randomly using a random number. If the number of partitions of polygons is determined according to the processing capacity of the hardware that performs the fine splitting processing, one can display a three-dimensional shape of a smoothness appropriate to its processing capacity. If the number of partitions of polygons is determined randomly, the pattern that appears on the surface of a three-dimensional shape (the pattern composed by the boundary lines between polygons) can be varied randomly.

Also, in this embodiment it is considered ideal for an interpolated line to be equal to the arc of a circle or ellipse that passes through the two points interpolated by the interpolated line, but an interpolated line is not limited to this. That is, an interpolated line may be determined so as to minimize the square error with the curve, (frame line) along the three-dimensional shape to be realized, that passes through the two points that the interpolated line interpolates between.

In this embodiment, cos θ' is approximated as shown in equation (10), but cos θ' may also be determined accurately, without performing such an approximation. Also, in this embodiment the determination is made by calculating the control edge length ratios $L_1/K$ and $L_2/K$ of the third-order Bezier curve from $\theta_1$ and $\theta_2$, but in order to speed up this calculation, one may first prepare a correspondence table that discretizes from $(\theta_1, \theta_2)$ to $(L_1/K, L_2/K)$, and determine $L_1/K$, $L_2/K$ using this correspondence table.

Also, this embodiment adopts third-order Bezier curves as interpolated lines, but the interpolated lines may be Bezier curves of order other than three, or parametric curves other than Bezier curves.

If the three-dimensional shape composed by subpolygons obtained by fine splitting processing is allowed to be an arbitrary shape, then it suffices to have only curved surface interpolation normal vectors as the interpolation vectors, with no need for frame line interpolation normal vectors.

Also, this embodiment adopts normal vectors of frame lines as vectors that express the direction of the frame line at a vertex, but as vectors that express the direction of the frame line at a vertex one may also adopt tangent vectors of the frame line, as stated above. But because this tangent vector differs in its orientation by just 90 degrees from the normal vector of the frame line, it often differs from the curved surface interpolation normal vector as well, so in step S18 in FIG. 20 they will often not be coalesced into a single vector, thus increasing the quantity of data in the splitting polygon data.

A computer program for performing the above-described fine splitting processing can be provided, along with the splitting polygon data, to user terminal 4 via transmission medium 2 or recording medium 3. Similarly, a computer program for performing fine splitting processing or splitting polygon data generation processing can be provided to data provision device 1 via optical disk, optomagnetic disk, or other recording medium, or may be provided via Internet, satellite circuit, or other transmission medium.

Splitting polygon data generation processing or fine splitting processing, besides being done by having a processor execute a computer program, may be done on dedicated hardware.

In this embodiment, the three-dimensional image is displayed on display unit 16 (display unit 26), which is a CRT, liquid crystal display, or the like, but this invention also applies to cases in which, for example, the three-dimensional image is printed by a printer (two-dimensional output device).

To summarize the effects of the present invention it should be noted that with the image processing device image processing method and program distribution medium of the present invention, interpolated lines which are lines that interpolate between two vertices are determined from interpolation vectors used for determining lines that interpolate between a given vertex and another vertex in the vertices of a unit graphic form, and from the coordinates of the vertices, and interpolated points which are points on interpolated lines are determined as vertices of sub-unit graphic forms. Therefore, for example, sub-unit graphic forms that constitute a smooth shape can be obtained from rough unit graphic forms.

The image processing device splits a unit graphic form into multiple sub-unit graphic forms by processing an image defined by a combination of unit graphic forms, and has an interpolated line computation means (for example, program processing steps S31 through S35 in FIG. 34, or program processing steps S41 through S45 in FIG. 35) which determines the interpolated line that is the line that interpolates between two vertices from the interpolation vector used for determining the line that interpolates between a given vertex and another vertex in the vertices of the unit graphic forms and from the coordinates of the vertices, and an interpolated point computation means (for example, program processing step S36 in FIG. 34, or program processing steps S46 in FIG. 35) that determines, as the vertices of sub-unit graphic forms, interpolated points that are points on an interpolated line.

The image processing device further has an interpolation vector computation means (for example, program processing step S36 in FIG. 34) that determines the interpolation vectors at interpolated points on interpolated line 1 from interpolation vectors at vertices 1 and 2 and determines interpolation vectors at interpolated points on interpolated line 2 from interpolation vectors at vertices 3 and 4, and the interpolated line computation means determines interpolated line 5 from interpolation vectors at interpolated points on interpolated lines 1 and 2 and from the coordinates of the interpolated points.

That image processing device further comprises an interpolation vector computation means (for example, program processing step S36 in FIG. 34) which determines, from interpolation vectors at the vertices, the interpolation vector to be used for determining the line that interpolates between one interpolated point and another interpolated point among the interpolated points.

The image processing device of that embodiment further comprises a correction means (for example, program processing step S37 in FIG. 34) that corrects the interpolation vector at an interpolated point determined by the interpolation vector computation means.

If the image is a tree-dimensional image the image processing device has a rendering means (for example, rendering unit 25 in FIG. 3) that renders sub-unit graphic forms.

With the image being a three-dimensional image, the interpolated line computation means has an angle computation means (for example, program processing steps S31 through S33 in FIG. 34) which determines angle 1 or 2 formed by the straight line that joins one vertex and another vertex interpolated by an interpolated line, which is a Bezier curve, and each projection of the straight line onto a plane perpendicular to the interpolation vector at the one vertex or other vertex, which is a plane that includes the one vertex or the other vertex; a distance computation means (for example, program processing step S34 in FIG. 34) that determines, based on angles 1 and 2, a control edge length 1 or 2, which is the distance from the one vertex or the other vertex to control point 1 or 2 of the Bezier curve; and a Bezier curve computation means (for example, program processing step S35 in FIG. 34) that determines the Bezier curve as the interpolated line that interpolates between the one vertex and the other vertex by determining, based on control edge length 1 or 2, each control point 1 and 2.

If the coordinates of the vertices of the unit graphic forms and the interpolation vectors are recorded on a recording medium, the device further has a playback means (for example, reception/playback device 21 in FIG. 3) that plays back from the recording medium the coordinates of the vertices and the interpolation vectors.

If the coordinates of the vertices of the unit graphic forms and the interpolation vectors are transmitted via a transmission route, it further has a reception means (for example, reception/playback device 21 in FIG. 3) that receives the coordinates of the vertices and the interpolation vectors that are transmitted via the transmission route.

If the image is a three-dimensional image, and the device further comprises an operation means (for example, input unit 28 in FIG. 3) that is operated when a prescribed input is given, a geometry processing means (for example, geometry processing unit 23 in FIG. 3) that reads data concerning unit graphic forms from a recording medium and performs geometry processing on the data in accordance with the input from the operation means, a conversion means (for example, rendering unit 25 in FIG. 3) that converts sub-unit graphic forms obtained by splitting the unit graphic forms resulting after said geometry processing into ones in the coordinate system of a two-dimensional output device, and a rendering means (for example, rendering unit 25 in FIG. 3) that renders the sub-unit graphic forms converted by the conversion means.

With the image processing device the image processing method and the program distribution medium of another embodiment of the present invention as described above, interpolation vectors are generated which are used for determining interpolated lines that are lines which interpolate between a given vertex and another vertex in the vertices of a unit graphic form input by an operation means being operated. Therefore, for example, smooth shapes can be constituted by using these interpolation vectors.

This image processing device, which is an image processing device that processes images defined by a combination of unit graphic forms, includes an operation means (for example, input unit 11 in FIG. 2) that is operated when unit graphic forms are input; an interpolation vector generation means (for example, data processing unit 12 in FIG. 2) that generates interpolation vectors used for determining the interpolated line that is the line that interpolates between a given vertex and another vertex in the vertices of the unit graphic forms that are input by operation of the operation means; and a provision means (for example, transmission/recording device 18 in FIG. 2) for providing the coordinates of the vertices of the unit graphic forms and the interpolation vectors.

The image processing device of another embodiment further includes a splitting means (for example, splitting processing unit 14 in FIG. 2) that splits a unit graphic form into multiple sub-unit graphic forms based on the coordinates of the vertices and the interpolation vectors, and a rendering means (for example, rendering unit 15 in FIG. 2) that renders the sub-unit graphic forms. The splitting means includes an interpolated line computation means (for example, program processing steps S31 through S35 in FIG. 34, or program processing steps S41 through S45 in FIG. 35) that determines interpolated lines based on the coordinates of the vertices and the interpolation vectors, and an interpolated point computation means (for example, program processing step S36 in FIG. 34, or program processing step S46 in FIG. 35) that determines, as the vertices of the sub-unit graphic forms, interpolated points that are points along the interpolated lines. The splitting means further has an interpolation vector computation means (for example, program processing step S36 in FIG. 34) that determines, from the interpolation vectors at the vertices, interpolation vectors to be used for determining the line that interpolates between a given interpolated point and another interpolated point among the interpolated points. The splitting means further has a correction means (for example, program processing step S37 in FIG. 34) that corrects the interpolation vectors at interpolated points determined by the interpolation vector computation means.

With the data distribution medium of the present invention there are provided at least, as data concerning the image, the coordinates of the vertices and interpolation vectors at the vertices that are obtained by generating interpolation vectors used for determining interpolated lines that are lines that interpolate between a given vertex and another vertex in the vertices of a unit graphic form if the unit graphic form is input. Therefore, for example, smooth shapes can be constituted by using these interpolation vectors and the coordinates of the vertices.

With the image processing device of yet another embodiment of this invention as described above, interpolation vectors are generated which are used for determining interpolated lines which are lines that interpolate between a given vector and another vector in the vertices of a unit graphic form input by an operation means being operated. The interpolated lines are determined from the coordinates of the vertices and the interpolation vectors of the unit graphic forms, and the interpolated points that are points on interpolated lines arc determined as sub-unit graphic forms. Therefore, for example, sub-unit graphic forms that constitute smooth shapes can be obtained from rough unit graphic forms.

The image processing device of this yet another embodiment has a provision device that provides data concerning images and a client device that receives data from the provision device and splits unit graphic forms into multiple sub-unit graphic forms; the provision device has an operation means (for example, input unit 11 in FIG. 2) that is operated when unit graphic forms are input, an interpolation vector generation means (for example, data processing unit 12 in FIG. 2) that generates interpolation vectors used for determining the interpolated line that is the line that interpolates between a given vertex and another vertex among the vertices of the unit graphic forms input by operation of the operation means, and a provision means (for example, transmission/recording device 18 in FIG. 2) that provides to the client terminal the coordinates of the vertices of unit graphic forms and the interpolation vectors; and the client device has an interpolated line computation means (for example, splitting processing unit 24 in FIG. 3) that determines interpolated lines from the coordinates of the vertices of unit graphic forms and interpolation vectors, an interpolated point computation means (for example, splitting processing unit 24 in FIG. 3) that determines, as the vertices of the sub-unit graphic forms, interpolated points that are points along the interpolated lines, a conversion means (for example, rendering unit 25 in FIG. 3) that converts sub-unit graphic forms into ones in the coordinate system of a two-dimensional output device, and a rendering means (for example, rendering unit 25 in FIG. 3) that renders the sub-unit graphic forms converted by the conversion means.

What is claimed is:

1. An image processing device which by processing an image defined by a combination of unit graphic forms splits said unit graphic forms into multiple sub-unit graphic forms, the image processing device comprising:

an interpolated line computation means for determining an interpolated line which is the line that interpolates a space between two vertices from an interpolation vector used for determining a line that interpolates a space between a given vertex and another vertex of vertices of said unit graphic forms and from coordinates of said vertices; and an interpolated point computation means for determining as vertices of said sub-unit graphic forms, interpolated points which are points on said interpolated line, wherein:

if a unit graphic form has vertices 1 through 4, a line segment which joins vertices 1 and 2 of said vertices 1 through 4 and a line segment that joins vertices 3 and 4 of said vertices 1 through 4 lie opposite each other, and a line segment which joins said vertices 1 and 3 and a line segment that joins said vertices 2 and 4 lie opposite each other;

said interpolated line computation means determines an interpolated line 1 which interpolates a space between said vertices 1 and 2, an interpolated line 2 which interpolates said vertices 3 and 4, an interpolated line 3 which interpolates a space between said vertices 1 and 3, and an interpolated line 4 which interpolates said vertices 2 and 4, and also determines an interpolated line 5 which interpolates a space between an interpolated point on said interpolated line 1 and an interpolated point on said interpolated line 2;

said interpolated point computation means determines interpolated points on said interpolated lines 1 through 5 as vertices of said sub-unit graphic forms; and any one pair of vertices among pairs defined as said vertices 1 and 2, said vertices 3 and 4, said vertices 1 and 3, or said vertices 2 and 4 are the same vertices, said one pair not having an interpolated line.

2. An image processing device which by processing an image defined by a combination of unit graphic forms splits said unit graphic forms into multiple sub-unit graphic forms, the image processing device comprising:

an interpolated line computation means for determining an interpolated line which is the line that interpolates a space between two vertices from an interpolation vector used for determining a line that interpolates a space between a given vertex and another vertex of vertices of said unit graphic forms and from coordinates of said vertices; and an interpolated point computation means for determining as vertices of said sub-unit graphic forms, interpolated points which are points on said interpolated line, wherein said interpolation vectors at the vertices of said unit graphic forms are interpolated line direction vectors which define directions of said interpolated lines at said vertices, and if said interpolated line is touched by a line onto which is projected a line segment which joins said vertex and another vertex in a prescribed plane which includes said vertex, said interpolated line direction vectors are normal-direction vectors in said prescribed plane.

3. An image processing device which by processing an image defined by a combination of unit graphic forms splits said unit graphic forms into multiple sub-unit graphic forms, the image processing device comprising:

an interpolated line computation means for determining an interpolated line which is the line that interpolates a space between two vertices from an interpolation vector used for determining a line that interpolates a space between a given vertex and another vertex of vertices of said unit graphic forms and from coordinates of said vertices; and an interpolated point computation means for determining as vertices of said sub-unit graphic forms, interpolated points which are points on said interpolated line, wherein said interpolated line is a Bezier curve, said image is a three-dimensional image; and said interpolated line computation means includes:

an angle computation means for determining an angle 1 or 2 formed by a straight line which joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex, a distance computation means for determining, based on said angles 1 and 2, a control edge length 1 or 2, which is a distance from said one vertex or other vertex to a control point 1 or 2 of said Bezier curve, and a Bezier curve computation means for determining said Bezier curve as the interpolated line which interpolates the space between said one vertex and other vertex by determining, based on said control edge length 1 or 2, each said control point 1 and 2.

4. The image processing device as described in claim 1, wherein
if the coordinates of the vertices of said unit graphic forms and the interpolation vectors are recorded on a recording medium, the image processing device further comprises a playback means for playing back from the recording medium the coordinates of said vertices and the interpolation vectors.

5. The image processing device as described in claim 1, wherein
if the coordinates of the vertices of said unit graphic forms and the interpolation vectors are transmitted via a transmission route, the image processing device further comprises a reception means for receiving the coordinates of said vertices and the interpolation vectors transmitted via the transmission route.

6. The image processing device as described in claim 1, wherein
said image is a three-dimensional image, and the image processing device further comprising:
an operation means which is operated when a prescribed input is given;
a geometry processing means for reading data concerning said unit graphic forms from a recording medium and performing with respect to the data, geometry processing that corresponds to input from said operation means,
a conversion means for converting said sub-unit graphic forms obtained by splitting said unit graphic forms resulting after said geometry processing into ones in the coordinate system of a two-dimensional output device, and
a rendering means for rendering said sub-unit graphic forms converted by said conversion means.

7. An image processing method for an image processing device which by processing an image defined by a combination of unit graphic forms, splits said unit graphic forms into multiple sub-unit graphic forms,
the image processing method comprising:
an interpolated line computation step of determining an interpolated line which is a line that interpolates a space between two vertices from an interpolation vector used for determining a line that interpolates a space between a given vertex and another vertex of vertices of said unit graphic forms and from coordinates of said vertices; and
an interpolated point computation step of determining, as the vertices of said sub-unit graphic forms, interpolated points which are points on said interpolated line,
wherein if a unit graphic form has vertices 1 through 4, a line segment which joins vertices 1 and 2 of said vertices 1 through 4 and a line segment that joins vertices 3 and 4 of said vertices 1 through 4 lie opposite each other, and a line segment that joins said vertices 1 and 3 and a line segment that joins said vertices 2 and 4 lie opposite each other,
said interpolated line computation step determines an interpolated line 1 that interpolates a space between said vertices 1 and 2, an interpolated line 2 that interpolates said vertices 3 and 4, an interpolated line 3 that interpolates the space between said vertices 1 and 3, and an interpolated line 4 that interpolates said vertices 2 and 4, and also determines an interpolated line 5 that interpolates a space between an interpolated point on said interpolated line 1 and an interpolated point on said interpolated line 2,
said interpolated point computation step determines the interpolated points on said interpolated lines 1 through 5 as vertices of said sub-unit graphic forms, and
any one pair of vertices among pairs defined as said vertices 1 and 2, said vertices 3 and 4, said vertices 1 and 3, or said vertices 2 and 4 are the same vertices, said one pair not having an interpolated line.

8. An image processing method for an image processing device which by processing an image defined by a combination of unit graphic forms, splits said unit graphic forms into multiple sub-unit graphic forms,
the image processing method comprising:
an interpolated line computation step of determining an interpolated line which is a line that interpolates a space between two vertices from an interpolation vector used for determining a line that interpolates a space between a given vertex and another vertex of vertices of said unit graphic forms and from coordinates of said vertices; and
an interpolated point computation step of determining, as the vertices of said sub-unit graphic forms, interpolated points which are points on said interpolated line, wherein
said interpolation vectors at the vertices of said unit graphic forms are interpolated line direction vectors which define directions of said interpolated lines at said vertices, and
if, in a prescribed plane that includes said vertices, said interpolated line is touched by a line onto which is projected a line segment that joins a given vertex and another vertex, said interpolated line direction vectors are normal-direction vectors in said prescribed plane.

9. An image processing method for an image processing device which by processing an image defined by a combination of unit graphic forms, splits said unit graphic forms into multiple sub-unit graphic forms,
the image processing method comprising:
an interpolated line computation step of determining an interpolated line which is a line that interpolates a space between two vertices from an interpolation vector used for determining a line that interpolates a space between a given vertex and another vertex of vertices of said unit graphic forms and from coordinates of said vertices; and
an interpolated point computation step of determining, as the vertices of said sub-unit graphic forms, interpolated points which are points on said interpolated line, wherein
said interpolated line is a Bezier curve,
said image is a three-dimensional image, and wherein
said interpolated line computation step includes:
an angle computation step of determining an angle 1 or 2 formed by a straight line that joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex,
a distance computation step of determining, based on said angles 1 and 2, a control edge length 1 or 2, which is the distance from said one vertex or other vertex to control point 1 or 2 of said Bezier curve, and a Bezier curve computation step of determining said Bezier curve as the interpolated line that interpolates the space between said one vertex and other vertex by determining, based on said control edge length 1 or 2, each said control point 1 and 2.

10. The image processing method as described in claim 7, wherein if the coordinates of the vertices of said unit graphic forms and the interpolation vectors are recorded on a recording medium, the image processing method further comprises a playback step of playing back from the recording medium the coordinates of said vertices and the interpolation vectors.

11. The image processing method as described in claim 7, wherein if the coordinates of the vertices of said unit graphic forms and the interpolation vectors are transmitted via a transmission route, the image processing method further comprises a reception step of receiving the coordinates of said vertices and the interpolation vectors transmitted via the transmission route.

12. The image processing method as described in claim 7, wherein said image is a three-dimensional image, and said image processing device includes an operation means which is operated when a prescribed input is given, and the image processing method further comprising:

a geometry processing step of reading data concerning said unit graphic forms from a recording medium and performing with respect to the data, geometry processing that corresponds to input from said operation means, a conversion step of converting said sub-unit graphic forms obtained by splitting said unit graphic forms resulting after said geometry processing into ones in the coordinate system of a two-dimensional output device, and a rendering step of rendering said sub-unit graphic forms converted by said conversion step.

13. A program distribution medium for providing a computer program to cause a computer to do processing that, by processing an image defined by a combination of unit graphic forms, splits said unit graphic forms into multiple sub-unit graphic forms, said computer program comprising:

an interpolated line computation step that determines the interpolated line that is the line that interpolates a space between two vertices from an interpolation vector used for determining the line that interpolates a space between a given vertex and another vertex of the vertices of said unit graphic forms and from coordinates of said vertices, and an interpolated point computation step that determines, as the vertices of said sub-unit graphic forms, interpolated points that are points on said interpolated line, wherein if a unit graphic form has vertices 1 through 4, a line segment which joins vertices 1 and 2 of said vertices 1 through 4 and a line segment that joins vertices 3 and 4 of said vertices 1 through 4 lie opposite each other, and a line segment that joins said vertices 1 and 3 and the line segment that joins said vertices 2 and 4 lie opposite each other, said interpolated line computation step determines an interpolated line 1 that interpolates a space between said vertices 1 and 2, an interpolated line 2 that interpolates said vertices 3 and 4, an interpolated line 3 that interpolates a space between said vertices 1 and 3, and an interpolated line 4 that interpolates said vertices 2 and 4, and also determines an interpolated line 5 that interpolates a space between an interpolated point on said interpolated line 1 and an interpolated point on said interpolated line 2, said interpolated point computation step determines the interpolated points on said interpolated lines 1 through 5 as vertices of said sub-unit graphic forms, and any one pair of vertices among pairs defined as said vertices 1 and 2, said vertices 3 and 4, said vertices 1 and 3, or said vertices 2 and 4 are the same vertices, said one pair not having an interpolated line.

14. A program distribution medium for providing a computer program to cause a computer to do processing that, by processing an image defined by a combination of unit graphic forms, splits said unit graphic forms into multiple sub-unit graphic forms, said computer program comprising:

an interpolated line computation step that determines the interpolated line that is the line that interpolates a space between two vertices from an interpolation vector used for determining the line that interpolates a space between a given vertex and another vertex of the vertices of said unit graphic forms and from coordinates of said vertices, and an interpolated point computation step that determines, as the vertices of said sub-unit graphic forms, interpolated points that are points on said interpolated line, wherein said interpolation vectors at the vertices of said unit graphic forms are interpolated line direction vectors which define a direction of said interpolated lines at said vertices, and if, in a prescribed plane that includes said vertices, said interpolated line is touched by a line onto which is projected a line segment which joins a given vertex and another vertex, said interpolated line direction vectors are normal-direction vectors in said prescribed plane.

15. A program distribution medium for providing a computer program to cause a computer to do processing that, by processing an image defined by a combination of unit graphic forms, splits said unit graphic forms into multiple sub-unit graphic forms, said computer program comprising:

an interpolated line computation step that determines the interpolated line that is the line that interpolates a space between two vertices from an interpolation vector used for determining the line that interpolates a space between a given vertex and another vertex of the vertices of said unit graphic forms and from coordinates of said vertices, and an interpolated point computation step that determines, as the vertices of said sub-unit graphic forms, interpolated points that are points on said interpolated line, wherein said interpolated line is a Bezier curve, said image is a three-dimensional image; and said interpolated line computation step includes:

an angle computation step that determines angle 1 or 2 formed by a straight line that joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex, a distance computation step that determines, based on said angles 1 and 2, a control edge length 1 or 2, which is the distance from said one vertex or other vertex to control point 1 or 2 of said Bezier curve, and a Bezier curve computation step that determines said Bezier curve as the interpolated line that interpolates the space between said one vertex and other vertex by determining, based on said control edge length 1 or 2, each said control point 1 and 2.

16. The program distribution medium as described in 13, wherein if the coordinates of the vertices of said unit graphic forms and the interpolation vectors are recorded on a recording medium, said computer program further includes a playback step which plays back from the recording medium the coordinates of said vertices and the interpolation vectors.

17. The program distribution medium as described in claim 13, wherein if the coordinates of the vertices of said unit graphic forms and the interpolation vectors are transmitted via a transmission route, said computer program further includes a reception step that receives the coordinates of said vertices and the interpolation vectors transmitted via the transmission route.

18. The program distribution medium as described in claim 13, wherein said image is a three-dimensional image, said computer has an operation means which is operated when a prescribed input is given, and said computer program further includes:

a geometry processing step that reads data concerning said unit graphic forms from a recording medium and with respect to the data performs geometry processing that corresponds to an input from said operation means, a conversion step that converts said sub-unit graphic forms obtained by splitting said unit graphic forms resulting after said geometry processing into ones in the coordinate system of a two-dimensional output device, and a rendering step that renders said sub-unit graphic forms converted by said conversion step.

19. An image processing device for processing an image defined by a combination of unit graphic forms, comprising:

an operation means which is operated when said unit graphic forms are input thereto, an interpolation vector generation means for generating interpolation vectors used for determining an interpolated line that is the line that interpolates a space between a given vertex and another vertex in vertices of said unit graphic forms input by said operation means when said operation means are operated, and a provision means for providing coordinates of the vertices of said unit graphic forms and the interpolation vectors, wherein said interpolation vector generation means generates as said interpolation vectors interpolated line direction vectors which define the direction of said interpolated lines at said vertices, and if, in a prescribed plane that includes said vertices, said interpolated line is touched by a line onto which is projected a line segment that joins a given vertex and another vertex, said interpolated line direction vectors are normal-direction vectors in said prescribed plane.

20. An image processing device for processing an image defined by a combination of unit graphic forms, comprising:

an operation means which is operated when said unit graphic forms are input thereto, an interpolation vector generation means for generating interpolation vectors used for determining an interpolated line that is the line that interpolates a space between a given vertex and another vertex in vertices of said unit graphic forms input by said operation means when said operation means are operated, a provision means for providing coordinates of the vertices of said unit graphic forms and the interpolation vectors, a splitting means for splitting said unit graphic forms into multiple sub-unit graphic forms based on the coordinates of said vertices and the interpolation vectors; and a rendering means for rendering said sub-unit graphic forms, wherein said splitting means includes:

an interpolated line computation means for determining said interpolated lines based on the coordinates of said vertices and said interpolation vectors, and an interpolated point computation means for determining, as the vertices of said sub-unit graphic forms, interpolated points that are points on said interpolated line, and wherein said interpolated line is a Bezier curve, said image is a three-dimensional image, and said interpolated line computation means includes:

an angle computation means that determines an angle 1 or 2 formed by a straight line that joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex, a distance computation means that determines, based on said angles 1 and 2, a control edge length 1 or 2, which is the distance from said one vertex or other vertex to control point 1 or 2 of said Bezier curve, and a Bezier curve computation means that determines said Bezier curve as the interpolated line that interpolates the space between said one vertex and other vertex by determining, based on said control edge length 1 or 2, each said control point 1 and 2.

21. An image processing method for an image processing device that processes an image defined by a combination of unit graphic forms, said image processing device including an operation means which is operated when said unit graphic forms are input, the image processing method comprising:

an interpolation vector generation step of generating interpolation vectors used for determining an interpolated line which is the line that interpolates a space between a given vertex and another vertex in vertices of said unit graphic forms input by said operation means when said operation means is operated; and a provision step of providing coordinates of the vertices of said unit graphic forms and the interpolation vectors, wherein said interpolation vector generation step generates as said interpolation vectors interpolated line direction vectors which define the direction of said interpolated lines at said vertices, and if, in a prescribed plane that includes said vertices, said interpolated line is touched by a line onto which is projected a line segment that joins a given vertex and another vertex, then said interpolated line direction vectors are normal-direction vectors in said prescribed plane.

22. An image processing method for an image processing device that processes an image defined by a combination of unit graphic forms, said image processing device including an operation means which is operated when said unit graphic forms are input, the image processing method comprising:

an interpolation vector generation step of generating interpolation vectors used for determining an interpolated line which is the line that interpolates a space between a given vertex and another vertex in vertices of said unit graphic forms input by said operation means when said operation means is operated;

a provision step of providing coordinates of the vertices of said unit graphic forms and the interpolation vectors;

a splitting step of splitting said unit graphic forms into multiple sub-unit graphic forms based on the coordinates of said vertices and the interpolation vectors; and a rendering step of rendering said sub-unit graphic forms, wherein said splitting step includes:

an interpolated line computation step of determining said interpolated lines based on the coordinates of said vertices and said interpolation vectors, and an interpolated point computation step of determining, as the vertices of said sub-unit graphic forms, interpolated points that are points on said interpolated line, and wherein said interpolated line is a Bezier curve, said image is a three-dimensional image, and said interpolated line computation step has an angle computation step that determines angle 1 or 2 formed by the straight line that joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex, a distance computation step that determines, based on said angles 1 and 2, a control edge length 1 or 2, which is the distance from said one vertex or other vertex to control point 1 or 2 of said Bezier curve, and a Bezier curve computation step that determines said Bezier curve as the interpolated line that interpolates the space between said one vertex and other vertex by determining, based on said control edge length 1 or 2, each said control point 1 or 2.

23. A program distribution medium which provides a computer program to cause a computer to process an image defined by a combination of unit graphic forms, said computer including an operation means which is operated when unit graphic forms are input thereto, and the computer program provided by the program distribution medium comprising an interpolation vector generation step which generates interpolation vectors used for determining an interpolated line that is the line that interpolates a space between a given vertex and another vertex in vertices of said unit graphic forms input by said operation means when said operation means is operated, and a provision step of providing coordinates of the vertices of said unit graphic forms and the interpolation vectors, wherein said interpolation vector generation step generates as said interpolation vectors interpolated line direction vectors which define directions of said interpolated lines at said vertices, and if, in a prescribed plane that includes said vertices, said interpolated line is touched by a line onto which is projected a line segment that joins a given vertex and another vertex, said interpolated line direction vectors are normal-direction vectors in said prescribed plane.

24. A program distribution medium which provides a computer program to cause a computer to process an image defined by a combination of unit graphic forms, said computer including an operation means which is operated when unit graphic forms are input thereto, and the computer program provided by the program distribution medium comprising an interpolation vector generation step which generates interpolation vectors used for determining an interpolated line that is the line that interpolates a space between a given vertex and another vertex in vertices of said unit graphic forms input by said operation means when said operation means is operated, a provision step of providing coordinates of the vertices of said unit graphic forms and the interpolation vectors, a splitting step that splits said unit graphic forms into multiple sub-unit graphic forms based on the coordinates of said vertices and the interpolation vectors, and a rendering step that renders said sub-unit graphic forms, wherein said splitting step includes an interpolated line computation step which determines said interpolated lines based on the coordinates of said vertices and said interpolation vectors, and an interpolated point computation step that determines, as the vertices of said sub-unit graphic forms, interpolated points that are points on said interpolated line, wherein said interpolated line is a Bezier curve, said image is a three-dimensional image, and said interpolated line computation step includes:

an angle computation step that determines an angle 1 or 2 formed by a straight line that joins one vertex and another vertex interpolated by said interpolated line, which is said Bezier curve, and each projection of the straight line onto a plane perpendicular to the interpolation vector at said one vertex or other vertex, which is a plane that includes said one vertex or other vertex, a distance computation step that determines, based on said angles 1 and 2, a control edge length 1 or 2, which is the distance from said one vertex or other vertex to control point 1 or 2 of said Bezier curve, and a Bezier curve computation step that determines said Bezier curve as the interpolated line that interpolates the space between said one vertex and other vertex by determining, based on said control edge length 1 or 2, each said control point 1 and 2.

* * * * *